(12) United States Patent
Huang

(10) Patent No.: US 10,571,661 B2
(45) Date of Patent: Feb. 25, 2020

(54) IMAGE CAPTURING OPTICAL ASSEMBLY, IMAGING APPARATUS AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 113 days.

(21) Appl. No.: 15/868,380

(22) Filed: Jan. 11, 2018

(65) Prior Publication Data

US 2019/0056568 A1 Feb. 21, 2019

(30) Foreign Application Priority Data

Aug. 18, 2017 (TW) .............................. 106128159 A

(51) Int. Cl.
*G02B 3/02* (2006.01)
*G02B 13/18* (2006.01)
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .... G02B 13/0035; G02B 13/18; G02B 13/04; G02B 13/06; G02B 13/16; G02B 13/0045; G02B 13/006; G02B 9/12; Y10T 29/49826

USPC ........ 359/641, 648–650, 672–706, 708, 716, 359/745, 748, 749, 754, 784
See application file for complete search history.

(56) References Cited

U.S. PATENT DOCUMENTS

| | | | |
|---|---|---|---|
| 2,638,034 A | 5/1953 | Wreathall |
| 4,235,508 A | 11/1980 | Kaprelian |
| 4,364,644 A | 12/1982 | Ikemori |
| 4,682,862 A | 7/1987 | Moskovich |
| 4,770,513 A | 9/1988 | Fujie et al. |
| 4,776,681 A | 10/1988 | Moskovich |
| 5,015,076 A | 5/1991 | Ueda |
| 5,048,940 A | 9/1991 | Ueda et al. |
| 5,066,113 A | 11/1991 | Nakajima et al. |
| 5,212,597 A | 5/1993 | Yamada |
| 5,237,456 A | 8/1993 | Yoshioka |

(Continued)

FOREIGN PATENT DOCUMENTS

| | | |
|---|---|---|
| CN | 101315458 B | 6/2010 |
| CN | 107085285 A | 8/2017 |

(Continued)

*Primary Examiner* — William R Alexander
*Assistant Examiner* — Tamara Y. Washington
(74) *Attorney, Agent, or Firm* — McClure, Qualey & Rodack, LLP

(57) ABSTRACT

An image capturing optical assembly includes, in order from an object side to an image side, a first lens group, a second lens group and a third lens group, wherein the first lens group includes a first lens element and a second lens element, the second lens group includes a third lens element, a fourth lens element and a fifth lens element, and the third lens group includes a sixth lens element, a seventh lens element and an eighth lens element. At least one surface of at least one of the lens elements of each lens group is aspheric. At least one surface of at least one of the lens elements includes at least one inflection point.

33 Claims, 34 Drawing Sheets

(56) References Cited

U.S. PATENT DOCUMENTS

| | | |
|---|---|---|
| 5,270,866 A | 12/1993 | Oizumi et al. |
| 5,353,156 A | 10/1994 | Chung |
| 5,371,628 A | 12/1994 | Shimoda et al. |
| 5,404,246 A | 4/1995 | Kaneko et al. |
| 5,440,429 A | 8/1995 | Kim |
| 5,455,713 A | 10/1995 | Kreitzer |
| 5,493,446 A | 2/1996 | Nakajima |
| 5,572,364 A | 11/1996 | Toide et al. |
| 5,642,229 A | 6/1997 | Kaneko et al. |
| 6,025,959 A | 2/2000 | Moskovich |
| 6,995,922 B2 * | 2/2006 | Mihara ............... G02B 15/177 359/676 |
| 9,523,841 B1 | 12/2016 | Chen |
| 9,835,822 B2 | 12/2017 | Huang |
| 2014/0092271 A1 | 4/2014 | Katou et al. |
| 2017/0045714 A1 | 2/2017 | Huang |
| 2017/0329108 A1 | 11/2017 | Hashimoto et al. |
| 2018/0180856 A1 | 6/2018 | Jung et al. |
| 2018/0329179 A1 | 11/2018 | Chang et al. |
| 2019/0033557 A1 | 1/2019 | Chang et al. |
| 2019/0033558 A1 | 1/2019 | Chang et al. |
| 2019/0107690 A1 | 4/2019 | Wenren et al. |

FOREIGN PATENT DOCUMENTS

| | | |
|---|---|---|
| CN | 207164344 U | 3/2018 |
| JP | 56075613 A | 6/1981 |
| JP | 01124810 A | 5/1989 |
| JP | 02196207 A | 8/1990 |
| JP | 03067210 A | 3/1991 |
| JP | 03095512 A | 4/1991 |
| JP | 05034593 A | 2/1993 |
| JP | 05072472 A | 3/1993 |
| JP | 05224119 A | 9/1993 |
| JP | 06027370 A | 2/1994 |
| JP | 06258575 A | 9/1994 |
| JP | 07043608 A | 2/1995 |
| JP | 07063987 A | 3/1995 |
| JP | 08271788 A | 10/1996 |
| JP | 09090219 A | 4/1997 |
| JP | 10339844 A | 12/1998 |
| JP | 2007333790 A | 12/2007 |
| JP | 2012230133 A | 11/2012 |
| JP | 2012230340 A | 11/2012 |
| JP | 2013011831 A | 1/2013 |
| JP | 2013186458 A | 9/2013 |
| JP | 2014074742 A | 4/2014 |
| JP | 2017049572 A | 3/2017 |
| JP | 2017116594 A | 6/2017 |
| TW | I553341 B | 10/2016 |
| TW | 201901225 A | 1/2019 |

* cited by examiner

IMAGE CAPTURING OPTICAL ASSEMBLY, IMAGING APPARATUS AND ELECTRONIC DEVICE

RELATED APPLICATIONS

This application claims priority to Taiwan Application Serial Number 106128159, filed Aug. 18, 2017, which is herein incorporated by reference.

BACKGROUND

Technical Field

The present disclosure relates to an image capturing optical assembly and an imaging apparatus. More particularly, the present disclosure relates to an image capturing optical assembly and an imaging apparatus with compact size applicable to electronic devices.

Description of Related Art

With the expanding application of photographing modules, installation of photographing modules in various electronic products and portables electronic devices is becoming a major trend in developments for the future technology. In addition to the size requirement of photographing modules for various products, the demand for imaging quality enhancement is also rising with current developments of improved image sensors and image processing by software, thus conventional lens assemblies cannot satisfy demands of developments for the future technology.

SUMMARY

According to one aspect of the present disclosure, an image capturing optical assembly includes, in order from an object side to an image side, a first lens group, a second lens group and a third lens group, wherein the first lens group includes, in order from the object side to the image side, a first lens element and a second lens element; the second lens group includes, in order from the object side to the image side, a third lens element, a fourth lens element and a fifth lens element; and the third lens group includes, in order from the object side to the image side, a sixth lens element, a seventh lens element and an eighth lens element. Each of the first lens element, the second lens element, the third lens element, the fourth lens element, the fifth lens element, the sixth lens element, the seventh lens element, and the eighth lens element has an object-side surface facing towards the object side and an image-side surface facing towards the image side. At least one surface of at least one of the lens elements of the first lens group is aspheric, at least one surface of at least one of the lens elements of the second lens group is aspheric, and at least one surface of at least one of the lens elements of the third lens group is aspheric. At least one surface of the first lens element, the second lens element, the third lens element, the fourth lens element, the fifth lens element, the sixth lens element, the seventh lens element, and the eighth lens element includes at least one inflection point. Each of at least two of the eight lens elements has an Abbe number smaller than 23.0. When a maximum of refractive indexes of all the lens elements of the image capturing optical assembly is Nmax, a minimum of refractive indexes of all the lens elements of the image capturing optical assembly is Nmin, a focal length of the image capturing optical assembly is f, and an entrance pupil diameter of the image capturing optical assembly is EPD, the following conditions are satisfied:

$1.30 < Nmax < 1.75;$ $1.20 < Nmin < 1.60;$ and $1.0 < f/EPD < 1.70.$

According to another aspect of the present disclosure, an image capturing optical assembly includes, in order from an object side to an image side, a first lens group, a second lens group and a third lens group, wherein the first lens group includes, in order from the object side to the image side, a first lens element and a second lens element; the second lens group includes, in order from the object side to the image side, a third lens element, a fourth lens element and a fifth lens element; and the third lens group includes, in order from the object side to the image side, a sixth lens element, a seventh lens element and an eighth lens element. Each of the first lens element, the second lens element, the third lens element, the fourth lens element, the fifth lens element, the sixth lens element, the seventh lens element, and the eighth lens element has an object-side surface facing towards the object side and an image-side surface facing towards the image side. At least one surface of at least one of the lens elements of the first lens group is aspheric, at least one surface of at least one of the lens elements of the second lens group is aspheric, and at least one surface of at least one of the lens elements of the third lens group is aspheric. At least one surface of the first lens element, the second lens element, the third lens element, the fourth lens element, the fifth lens element, the sixth lens element, the seventh lens element, and the eighth lens element includes at least one inflection point. At least one of the eight lens elements has an Abbe number smaller than 24.0. When a maximum of refractive indexes of all the lens elements of the image capturing optical assembly is Nmax, a minimum of refractive indexes of all the lens elements of the image capturing optical assembly is Nmin, a focal length of the image capturing optical assembly is f, an entrance pupil diameter of the image capturing optical assembly is EPD, and an axial distance between the object-side surface of the first lens element and an image surface is TL, the following conditions are satisfied:

$1.30 < Nmax < 1.95;$ $1.20 < Nmin < 1.60;$ $1.0 < f/EPD \leq 1.63;$ and $TL/f < 1.60.$ According to another aspect of the present disclosure, an image capturing optical assembly includes, in order from an object side to an image side, a first lens group, a second lens group and a third lens group, wherein the first lens group includes, in order from the object side to the image side, a first lens element and a second lens element; the second lens group includes, in order from the object side to the image side, a third lens element, a fourth lens element and a fifth lens element; and the third lens group includes, in order from the object side to the image side, a sixth lens element, a seventh lens element and an eighth lens element. Each of the first lens element, the second lens element, the third lens element, the fourth lens element, the fifth lens element, the sixth lens element, the seventh lens element, and the eighth lens element has an object-side surface facing towards the object side and an image-side surface facing towards the image side. At least one surface of at least one of the lens elements of the first lens group is aspheric, at least one surface of at least one of the lens elements of the second lens group is aspheric, and at least one surface of at least one of the lens elements of the third lens group is aspheric. At least one of the seventh lens element and the eighth lens element includes at least one inflection point. At least one of the fourth lens element, the fifth lens element, the sixth lens element, the seventh lens element and the eighth lens element has an Abbe number smaller than 23.0. When a maximum of refractive indexes of all the lens elements of the image capturing optical assembly is Nmax, a minimum of refractive indexes of all the lens elements of the image capturing optical assembly is Nmin, an entrance pupil diameter of the image capturing optical assembly is EPD, and an axial distance between the object-side surface of the first lens element and an image surface is TL, the following conditions are satisfied:

$1.30 < N\text{max} < 1.95;$ $1.20 < N\text{min} < 1.60;$ and $1.0 < TL/EPD < 2.27.$ According to another aspect of the present disclosure, an imaging apparatus includes the image capturing optical assembly of the aforementioned aspect and an image sensor, wherein the image sensor is disposed on the image surface of the image capturing optical assembly.

According to another aspect of the present disclosure, an electronic device includes the imaging apparatus of the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
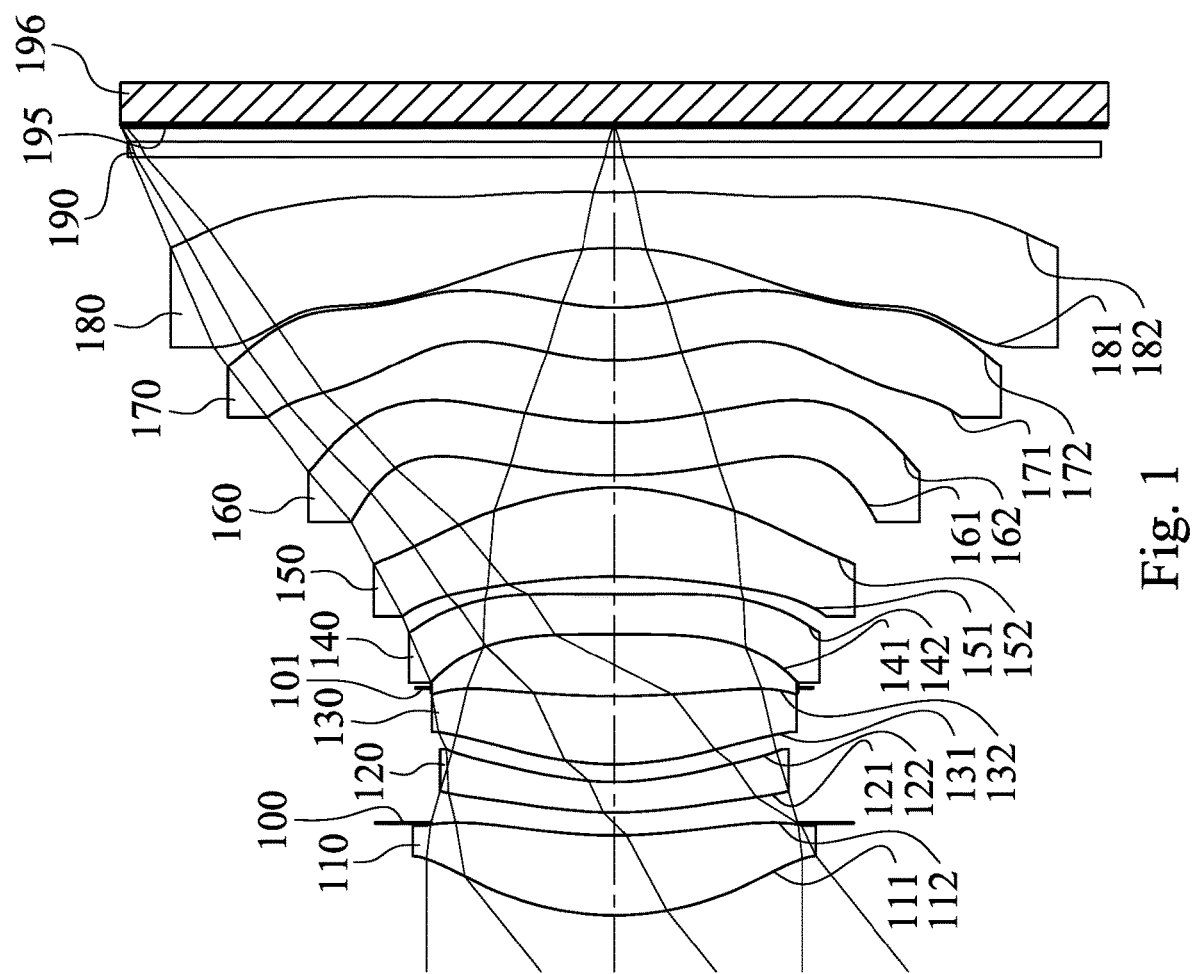
FIG. 1 is a schematic view of an imaging apparatus according to the 1st embodiment of the present disclosure.

An image capturing optical assembly includes, in order from an object side to an image side, a first lens group, a second lens group and a third lens group, wherein the first lens group includes, in order from the object side to the image side, a first lens element and a second lens element; the second lens group includes, in order from the object side to the image side, a third lens element, a fourth lens element and a fifth lens element; and the third lens group includes, in order from the object side to the image side, a sixth lens element, a seventh lens element and an eighth lens element. Therefore, configuration of the parameters may be more flexible by the arrangement of three lens groups, and it is favorable for balancing the ability of light refraction by properly matching the characteristics of the lens elements so as to satisfy the demand of developments for the future technology.

Each of the first lens element, the second lens element, the third lens element, the fourth lens element, the fifth lens element, the sixth lens element, the seventh lens element, and the eighth lens element has an object-side surface facing towards the object side and an image-side surface facing towards the image side.

At least one surface of at least one of the lens elements of the first lens group is aspheric, at least one surface of at least one of the lens elements of the second lens group is aspheric, and at least one surface of at least one of the lens elements of the third lens group is aspheric. Therefore, it is favorable for correcting off-axis aberrations, such as coma aberration, astigmatism etc., and obtaining sufficient image quality with fewer lens elements.

At least one surface of the first lens element, the second lens element, the third lens element, the fourth lens element, the fifth lens element, the sixth lens element, the seventh lens element, and the eighth lens element includes at least one inflection point. Therefore, it is favorable for correcting off-axis aberrations and reducing total track length thereof. Preferably, at least one of the seventh lens element and the eighth lens element can include at least one inflection point.

According to the image capturing optical assembly of the present disclosure, there is an air gap between every adjacent lens elements of the first lens element, the second lens element, the third lens element, the fourth lens element, the fifth lens element, the sixth lens element, the seventh lens element and the eighth lens element. That is, each of the first through eighth lens elements is a single and non-cemented lens element, and every two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element, the fifth lens element, the sixth lens element, the seventh lens element and the eighth lens element of the image capturing optical assembly, there is a gap in a paraxial region between every pair of lens elements that are adjacent to each other. In particular, a cementing surface of one lens element and a cementing surface of the following lens element need to have accurate curvature to ensure these two lens elements will be highly cemented. However, during the cementing process, those two lens elements might not be highly cemented due to displacements and it is thereby not favorable for image quality of the image capturing optical assembly. Therefore, according to the image capturing optical assembly of the present disclosure, having an air gap in a paraxial region between every adjacent lens elements of the first lens element, the second lens element, the third lens element, the fourth lens element, the fifth lens element, the sixth lens element the seventh lens element and the eighth lens element of the present disclosure avoids the problems of the cemented lens elements.

The object-side surface of the first lens element can include at least one inflection point. Therefore, it is favorable for correcting spherical aberrations generated by the incident light from large field of view in the image capturing optical assembly.

The second lens element can have negative refractive power, so that chromatic aberration can be corrected and aberrations generated from the first lens element can be moderated. The object-side surface of the second lens element can be convex, and the image-side surface of the second lens element can be concave. Therefore, the astigmatism can be corrected so as to allow light converging from sagittal direction and tangential direction.

The seventh lens element can have negative refractive power, which is favorable for adjusting and balancing the refractive power close to the image side of the image capturing optical assembly so as to enhance the image quality. The seventh lens element can have the object-side surface being convex and the image-side surface being concave. Therefore, it is favorable for correcting the field curvature so as to avoid defocus in the off-axis field.

The eighth lens element can have negative refractive power, and it is favorable for controlling the back focal length effectively so as to avoid the total track length of the image capturing optical assembly being too long.

When a maximum of refractive indexes of all the lens elements of the image capturing optical assembly is Nmax, the following condition is satisfied: $1.30<Nmax<1.95$. Therefore, the manufacturing of lens elements can be more flexible so as to calibrate certain parts of lens elements for better image quality. Preferably, the following condition can be satisfied: $1.30<Nmax<1.75$. More preferably, the following condition can be satisfied: $1.55<Nmax<1.70$.

When a minimum of refractive indexes of all the lens elements of the image capturing optical assembly is Nmin, the following condition is satisfied: $1.20<Nmin<1.60$. Therefore, it is favorable for balancing lens materials of the image capturing optical assembly so as to maintain sufficient refraction power and proper differences among lens elements. Preferably, the following condition can be satisfied: $1.35<Nmin<1.58$.

When a focal length of the image capturing optical assembly is f, and an entrance pupil diameter of the image capturing optical assembly is EPD, the following condition is satisfied: $1.0<f/EPD<1.70$. Therefore, it is favorable for increasing incident light so as to enhance image illumination and the image quality. Preferably, the following condition can be satisfied: $1.0<f/EPD\leq1.63$.

At least one of the first lens element, the second lens element, the third lens element, the fourth lens element, the fifth lens element, the sixth lens element, the seventh lens element and the eighth lens element has an Abbe number smaller than 24.0. Therefore, it is favorable for obtaining better dispersion ability so as to compensate excessive refraction of the short wavelength light in the off-axis region. Preferably, each of at least two of the eight lens elements has the Abbe number smaller than 23.0. More preferably, at least one of the fourth lens element, the fifth lens element, the sixth lens element, the seventh lens element, and the eighth lens element has the Abbe number smaller than 23.0. Further preferably, at least one of the eight lens elements has the Abbe number smaller than 20.

When the focal length of the image capturing optical assembly is f, and an axial distance between the object-side surface of the first lens element and an image surface is TL, the following condition is satisfied: $TL/f<1.60$. Therefore, it is favorable for balancing the field of view and total track length of the image capturing optical assembly effectively in various applications.

When the entrance pupil diameter of the image capturing optical assembly is EPD, and the axial distance between the object-side surface of the first lens element and the image surface is TL, the following condition is satisfied: 1.0<TL/EPD<2.27. Therefore, it is favorable for satisfying market demands by arranging both of a large aperture and a short total track length of the image capturing optical assembly.

When an axial distance between the aperture stop and the image-side surface of the eighth lens element is SD, and an axial distance between the object-side surface of the first lens element and the image-side surface of the eighth lens element is TD, the following condition is satisfied: 0.70<SD/TD<1.10. Therefore, the location of the aperture stop is proper for obtaining a sufficient view angle, and balancing the total track length of the image capturing optical assembly and the angle of the incident light on the image surface. Preferably, the aperture stop can be disposed at the object side (or at a position closest to the object side) in the first lens group. Therefore, it is favorable for controlling the angle of the incident light on the image surface, so as to avoid insufficient illumination of the image periphery while reducing the total track length.

When an Abbe number of the first lens element is V1, an Abbe number of the second lens element is V2, and an Abbe number of the sixth lens element is V6, the following condition is satisfied: (V2+V6)/V1<1.0. Therefore, it is favorable for balancing proper corrections of chromatic aberration between the object side and the image side.

When the focal length of the image capturing optical assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, a focal length of i-th lens element is fi, and a maximum of |f/fi| is |f/fi|max, the following condition is satisfied: |f/fi|max<1.50, wherein i=1~8. Therefore, it is favorable for obtaining sufficient view angle by controlling the refractive power of the image capturing optical assembly effectively. Preferably, the following condition can be satisfied: |f/fi|max<1.0, wherein i=1~8.

When the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, at least one of the lens elements (the first lens element through the eighth lens element) satisfies the following condition: |f/Rf|+|f/Rr|<0.60. Therefore, it is favorable for reducing aberrations by controlling refractive power of the lens elements, and improving the image quality by adjusting the light path according to different fields of view. Preferably, at least one of the lens elements satisfies the following condition: |f/Rf|+|f/Rr|<0.40. More preferably, at least one of the lens elements satisfies the following condition: |f/Rf|+|f/Rr|<0.20.

When an axial distance between the object-side surface of the first lens element and the image surface is TL, the following condition is satisfied: TL<12.0 mm. Therefore, it is favorable for reducing the total track length of the image capturing optical assembly so as to control the dimensions thereof.

When half of a maximum field of view of the image capturing optical assembly is HFOV, the following condition is satisfied: 30.0 degrees<HFOV<50.0 degrees. Therefore, it is favorable for obtaining proper imaging range of the image capturing optical assembly so as to satisfy the required field of view in applications. Preferably, the following condition can be satisfied: 35.0 degrees<HFOV<45.0 degrees.

When the axial distance between the object-side surface of the first lens element and the image surface is TL, a maximum image height of the image capturing optical assembly is ImgH, the focal length of the image capturing optical assembly is f, and the entrance pupil diameter of the image capturing optical assembly is EPD, the following condition is satisfied: 2.0<TL/ImgH+f/EPD<3.20. Therefore, it is favorable for controlling the total track length and the aperture size of the image capturing optical assembly so as to fit in compact electronic devices and obtain high image brightness. Preferably, the following condition can be satisfied: 2.0<TL/ImgH+f/EPD≤3.10.

When a total number of inflection points on the object-side surfaces and the image-side surfaces of all the lens elements (the first lens element through the eighth lens element) of the image capturing optical assembly is Ninf., the following condition is satisfied: 20<Ninf.<55. Therefore, it is favorable for correcting image distortion in the off-axis region thereof so as to enhance the peripheral image quality.

When the axial distance between the object-side surface of the first lens element and the image surface is TL, and the maximum image height of the image capturing optical assembly is ImgH, the following condition is satisfied: 0.80<TL/ImgH<1.65. Therefore, it is favorable for the image capturing optical assembly having a compact configuration while effectively reducing the total track length thereof with desirable image dimensions. Preferably, the following condition can be satisfied: 0.90<TL/ImgH<1.60.

When a maximum of axial distances between every adjacent lens elements of the image capturing optical assembly is ATmax, and the maximum image height of the image capturing optical assembly is ImgH, the following condition is satisfied: ATmax/ImgH<0.30. Therefore, it is favorable for balancing the lens arrangement and image size so as to improve space usage while obtaining the sufficient image size for receiving enough light.

When the focal length of the image capturing optical assembly is f, a focal length of the second lens element is f2, and a focal length of the third lens element is f3, the following condition is satisfied: 0.05<(f/f2)+(f/f3)<0.50. Therefore, it is favorable for balancing the refractive power of the second lens element and the third lens element so as to enhance aberration corrections and reduce the sensitivity. Preferably, the following condition can be satisfied: 0.05<(f/f2)+(f/f3)<0.35.

When half of a maximum field of view of the image capturing optical assembly is HFOV, the focal length of the image capturing optical assembly is f, and the entrance pupil diameter of the image capturing optical assembly is EPD, the following condition is satisfied: 24.0<HFOV×EPD/f<35.0. Therefore, the field of view and the aperture size can be balanced and enhanced while maintaining sufficient image illumination.

When the entrance pupil diameter of the image capturing optical assembly is EPD, and a sum of central thicknesses of all the lens elements of the image capturing optical assembly is ΣCT, the following condition is satisfied: 0.80<EPD/ΣCT<2.0. Therefore, it is favorable for controlling thicknesses of the lens elements effectively so as to avoid the deformation caused by pressing upon an overly thin lens element or from uneven molding shrinkage due to excessively thick lens element.

When a curvature radius of the object-side surface of the sixth lens element is R11, and a curvature radius of the image-side surface of the sixth lens element is R12, the following condition is satisfied: $0<(R11-R12)/(R11+R12)<0.80$. Therefore, astigmatism and Petzval's sum of the image capturing optical assembly can be corrected.

When the focal length of the image capturing optical assembly is f, and the focal length of the second lens element is f2, the following condition is satisfied: $-0.55<f/f2<0.55$. Therefore, it is favorable for avoiding excessive aberrations by moderating the refractive power of the second lens element.

When the axial distance between the object-side surface of the first lens element and the image surface is TL, the maximum image height of the image capturing optical assembly is ImgH, and the entrance pupil diameter of the image capturing optical assembly is EPD, the following condition is satisfied: $TL^2/(ImgH \times EPD)<3.40$. Therefore, it is favorable for enhancing the image illumination and reducing the total track length of the image capturing optical assembly. Preferably, the following condition can be satisfied: $TL^2/(ImgH \times EPD)<3.25$.

Each of relative distances between every adjacent lens elements of the first lens element, the second lens element, the third lens element, the fourth lens element, the fifth lens element, the sixth lens element, the seventh lens element and the eighth lens element is a constant value. Therefore, it is favorable for simplifying the assembling of the image capturing optical assembly, reducing the costs, and increasing the yield rate.

When the entrance pupil diameter of the image capturing optical assembly is EPD, and an axial distance between the image-side surface of the eighth lens element and the image surface is BL, the following condition is satisfied: $2.0<EPD/BL<6.2$. Therefore, it is favorable for balancing the back focal length and the aperture size so as to increase the image illumination and control the back focal length for disposing additional optical elements.

When a maximum optical effective radius of the object-side surface of the first lens element is Y11, and a maximum optical effective radius of the image-side surface of the eighth lens element is Y82, the following condition is satisfied: $0.20<Y11/Y82<0.70$. Therefore, it is favorable for maintaining fine appearance by controlling the size of the lens element on the object side of the image capturing optical assembly, and reducing the size while enlarging the field of view so as to satisfy specifications of various applications.

At least one of the object-side surface and the image-side surface of the eighth lens element includes at least one critical point. When the focal length of the image capturing optical assembly is f, a vertical distance of the critical point on the object-side surface of the eighth lens element and an optical axis is Yc81, and a vertical distance of the critical point on the image-side surface of the eighth lens element and the optical axis is Yc82, at least one of the following conditions is satisfied: $0.01<Yc81/f<0.90$; and $0.01<Yc82/f<0.90$. Therefore, it is favorable for controlling the shape variation of the lens element close to the image side of the image capturing optical assembly so as to correct off-axis aberrations before light projecting on the image surface. Preferably, the image-side surface of the eighth lens element can include at least one critical point, and the following condition can be satisfied: $0.01<Yc82/f<0.90$. Furthermore, the vertical distance of the critical point on the object-side surface or the image-side surface of the eighth lens element and the optical axis is Yc8, the following condition can be satisfied: Yc8=Yc81 or Yc8=Yc82.

When the Abbe number of the first lens element is V1, an Abbe number of the fourth lens element is V4, an Abbe number of the fifth lens element is V5, and the Abbe number of the sixth lens element is V6, the following condition is satisfied: $1.0<(V4+V5+V6)/V1<2.80$. Therefore, it is favorable for controlling the material arrangement of the lens elements in the middle portion of the image capturing optical assembly so as to obtain sufficient light refractive ability and reduce the total track length.

When the focal length of the image capturing optical assembly is f, and a curvature radius of the image-side surface of the eighth lens element is R16, the following condition is satisfied: $0.3<f/R16<5.0$. Therefore, it is favorable for avoiding excessive total track length by controlling the back focal length of the image capturing optical assembly effectively. Preferably, the following condition can be satisfied: $1.0<f/R16<4.5$.

When a maximum of axial distances between every adjacent lens elements of the image capturing optical assembly is ATmax, and a minimum of central thicknesses of all the lens elements of the image capturing optical assembly is CTmin, the following condition is satisfied: $0.1<ATmax/CTmin<5.0$. Therefore, the surface variation can be more flexible by controlling the gaps between adjacent lens elements and the lens thicknesses, so as to obtain better off-axis aberration corrections. Preferably, the following condition can be satisfied: $0.3<ATmax/CTmin<3.5$.

The focal length of the image capturing optical assembly is f, a focal length of the first lens group is fG1, a focal length of the second lens group is fG2, and a focal length of the third lens group is fG3, the following conditions are satisfied: $0.1<f/fG1<1.5$; $-0.4<f/fG2<1.5$; and $-1.5<f/fG3<0.5$. Therefore, it is favorable for satisfying the specifications of various devices by controlling the refractive power of the lens groups.

At least one of the object-side surface and the image-side surface of the seventh lens element includes at least one critical point. When the focal length of the image capturing optical assembly is f, a vertical distance of the critical point on the object-side surface of the seventh lens element and an optical axis is Yc71, and a vertical distance of the critical point on the image-side surface of the seventh lens element and the optical axis is Yc72, at least one of the following conditions is satisfied: $0.01<Yc71/f<0.90$; and $0.01<Yc72/f<0.90$. Therefore, it is favorable for controlling the shape variation of the lens element close to the image side so as to provide better corrections of each off-axis field of view at different locations. Preferably, the image-side surface of the seventh lens element can include at least one critical point, and the following condition can be satisfied: $0.01<Yc72/f<0.90$. Furthermore, the vertical distance of the critical point on the object-side surface or the image-side surface of the seventh lens element and the optical axis is Yc7, the following condition can be satisfied: Yc7=Yc71 or Yc7=Yc72.

At least one surface of at least one of the lens elements of the first lens group includes at least one inflection point, at least one surface of at least one of the lens elements of the second lens group includes at least one inflection point, and at least one surface of at least one of the lens elements of the third lens group includes at least one inflection point. Therefore, it is favorable for correcting the off-axis aberrations so as to reduce the total track length and enhance the image quality.

The first lens group can have positive refractive power, the second lens group can have positive refractive power, and the third lens group can have negative refractive power. Therefore, the refractive power of front portion, middle portion and rear portion of the image capturing optical assembly can be distributed effectively so as to enhance the light converging ability on the object side and reduce the total track length thereof.

The image capturing optical assembly can further include a filter disposed between the eighth lens element and the image surface, wherein a central thickness of the filter is CTf, the following condition is satisfied: CTf<0.25 mm. Therefore, it is favorable for arranging the elements of the image capturing optical assembly closely and increasing space utilization. Preferably, the following condition can be satisfied: CTf<0.14 mm.

When the Abbe number of the second lens element is V2, an Abbe number of the third lens element is V3, the Abbe number of the fourth lens element is V4, and the Abbe number of the fifth lens element is V5, the following condition is satisfied: 0.01<|(V2−V3)/(V4−V5)|. Therefore, it is favorable for correcting aberrations and chromatic aberration by arranging complementary materials of the adjacent lens elements.

When the focal length of the first lens element is f1, and the focal length of the second lens element is f2, the following condition is satisfied: −0.65<f1/f2<2.0. Therefore, it is favorable for strengthening the refractive power of the first lens element and balancing aberrations generated from the first lens element by the second lens element.

Each of the aforementioned features of the image capturing optical assembly can be utilized in various combinations for achieving the corresponding effects.

According to the image capturing optical assembly of the present disclosure, the lens elements thereof can be made of glass or plastic materials. When the lens elements are made of glass materials, the distribution of the refractive power of the image capturing optical assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the image capturing optical assembly. Therefore, the total track length of the image capturing optical assembly can also be reduced.

According to the image capturing optical assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the image capturing optical assembly of the present disclosure, the refractive power or the focal length of a lens element being positive or negative may refer to the refractive power or the focal length in a paraxial region of the lens element.

According to the image capturing optical assembly of the present disclosure, the image capturing optical assembly can include at least one stop, such as an aperture stop, a glare stop or a field stop. Said glare stop or said field stop is for eliminating the stray light and thereby improving the image resolution thereof.

According to the image capturing optical assembly of the present disclosure, the image surface of the image capturing lens assembly, based on the corresponding image sensor, can be flat or curved. In particular, the image surface can be a concave curved surface facing towards the object side. According to the image capturing optical assembly of the present disclosure, at least one image correcting element (such as a field flattener) can be selectively disposed between the lens element closest to the image side of the image capturing optical assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the image capturing optical assembly of the present disclosure, an aperture stop can be configured as a front stop or a middle stop. A front stop disposed between an object and the first lens element can provide a longer distance between an exit pupil of the image capturing optical assembly and the image surface, and thereby obtains a telecentric effect and improves the image-sensing efficiency of the image sensor, such as CCD or CMOS. A middle stop disposed between the first lens element and the image surface is favorable for enlarging the field of view of the image capturing optical assembly and thereby provides a wider field of view for the same.

According to the image capturing optical assembly of the present disclosure, a critical point is a non-axial point of the lens surface where its tangent is perpendicular to the optical axis, wherein a convex critical point is a critical point located on a convex shape of the lens surface, and a concave critical point is a critical point located on a concave shape of the lens surface.

According to the image capturing optical assembly of the present disclosure, an inflection point is defined as a point where center of curvature is shifted from the object side to the image side (or from the image side to the object side) of a curve on the lens surface from a paraxial region thereof to the off-axis region thereof.

According to the image capturing optical assembly of the present disclosure, the image capturing lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an imaging apparatus is provided. The imaging apparatus includes the aforementioned image capturing optical assembly and an image sensor, wherein the image sensor is disposed on the image side of the aforementioned image capturing optical assembly, that is, the image sensor can be disposed on or near the image surface of the aforementioned image capturing optical assembly. It is favorable for obtaining more flexible parameter variation by the three lens group and balancing light refraction ability by properly arranging characteristics among the lens elements, so as to satisfy the demand of developments for the future technology. Preferably, the imaging apparatus can further include a barrel member, a holder member or a combination thereof.

According to the present disclosure, an electronic device is provided, which includes the aforementioned imaging apparatus. Preferably, the electronic device can further include but not limited to a control unit, a display, a storage unit, a random access memory unit (RAM) or a combination thereof.

According to the above description of the present disclosure, the following 1st-17th specific embodiments are provided for further explanation.

1st Embodiment

Figure 2:
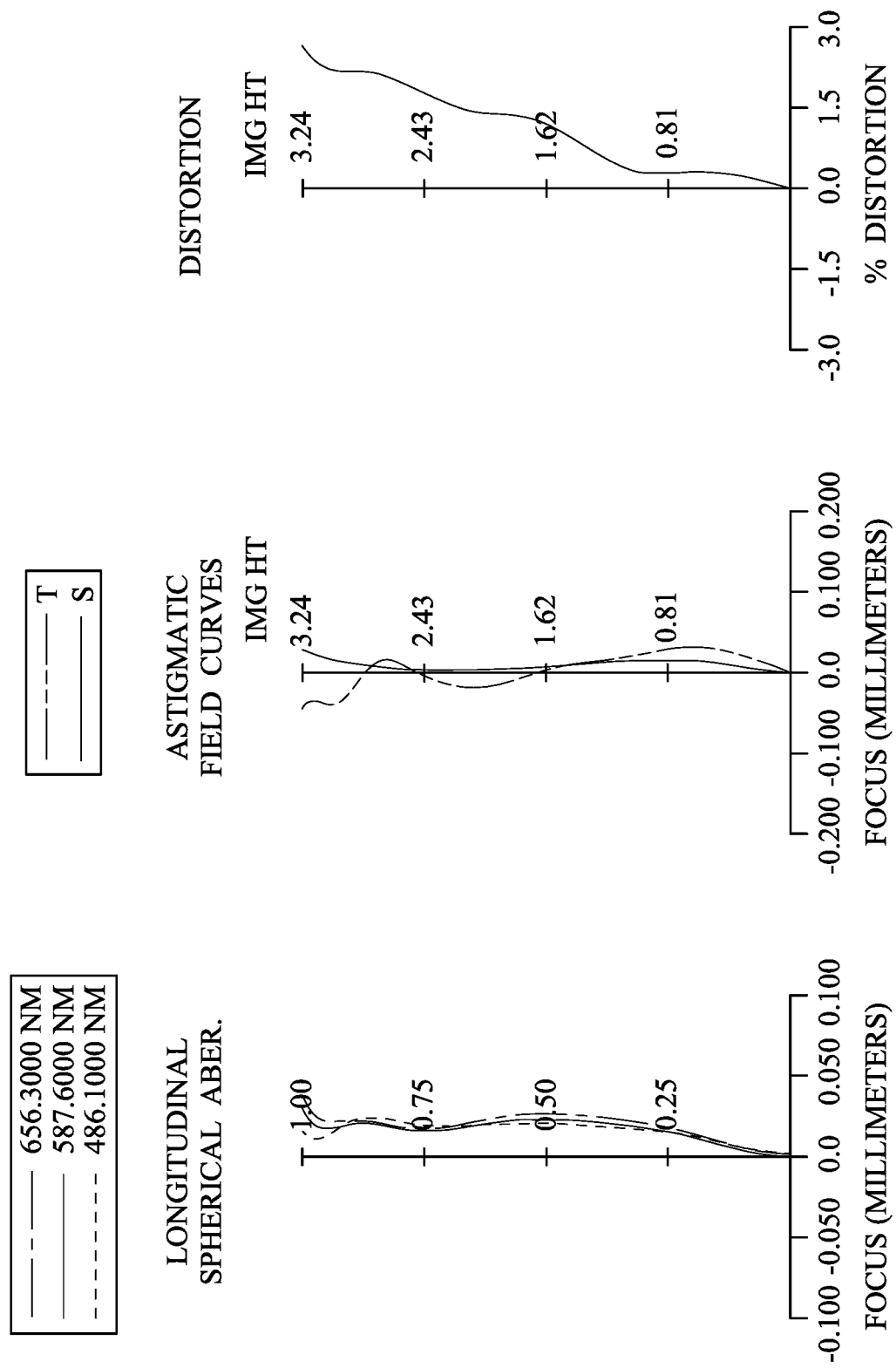
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an image capturing optical assembly (its reference numeral is omitted) and an image sensor 196. The image capturing optical assembly includes, in order from an object side to an image side, a first lens element 110, an aperture stop 100, a second lens element 120, a third lens element 130, a stop 101, a fourth lens element 140, a fifth lens element 150, a sixth lens element 160, a seventh lens element 170, an eighth lens element 180, a filter 190 and an image surface 195, wherein the image sensor 196 is disposed on the image surface 195 of the image capturing optical assembly. The image capturing optical assembly includes eight lens elements (110, 120, 130, 140, 150, 160, 170 and 180) without additional one or more lens elements inserted between the first lens element 110 and the eighth lens element 180, and there is an air gap in a paraxial region between every adjacent lens elements of the image capturing optical assembly. The first lens element 110 and the second lens element 120 belong to a first lens group (its reference numeral is omitted). The third lens element 130, the fourth lens element 140 and the fifth lens element 150 belong to a second lens group (its reference numeral is omitted). The sixth lens element 160, the seventh lens element 170 and the eighth lens element 180 belong to a third lens group (its reference numeral is omitted).

The first lens element 110 with positive refractive power has an object-side surface 111 being convex and an image-side surface 112 being concave. The first lens element 110 is made of a plastic material, and has the object-side surface 111 and the image-side surface 112 being both aspheric. Furthermore, each of the object-side surface 111 and the image-side surface 112 of the first lens element 110 includes at least one inflection point.

The second lens element 120 with negative refractive power has an object-side surface 121 being convex and an image-side surface 122 being concave. The second lens element 120 is made of a plastic material, and has the object-side surface 121 and the image-side surface 122 being both aspheric. Furthermore, the object-side surface 121 of the second lens element 120 includes at least one inflection point.

The third lens element 130 with positive refractive power has an object-side surface 131 being convex and an image-side surface 132 being concave. The third lens element 130 is made of a plastic material, and has the object-side surface 131 and the image-side surface 132 being both aspheric. Furthermore, each of the object-side surface 131 and the image-side surface 132 of the third lens element 130 includes at least one inflection point.

The fourth lens element 140 with negative refractive power has an object-side surface 141 being convex and an image-side surface 142 being concave. The fourth lens element 140 is made of a plastic material, and has the object-side surface 141 and the image-side surface 142 being both aspheric. Furthermore, each of the object-side surface 141 and the image-side surface 142 of the fourth lens element 140 includes at least one inflection point.

The fifth lens element 150 with positive refractive power has an object-side surface 151 being concave and an image-side surface 152 being convex. The fifth lens element 150 is made of a plastic material, and has the object-side surface 151 and the image-side surface 152 being both aspheric. Furthermore, the image-side surface 152 of the fifth lens element 150 includes at least one inflection point.

The sixth lens element 160 with negative refractive power has an object-side surface 161 being convex and an image-side surface 162 being concave. The sixth lens element 160 is made of a plastic material, and has the object-side surface 161 and the image-side surface 162 being both aspheric. Furthermore, each of the object-side surface 161 and the image-side surface 162 of the sixth lens element 160 includes at least one inflection point.

Figure 28:
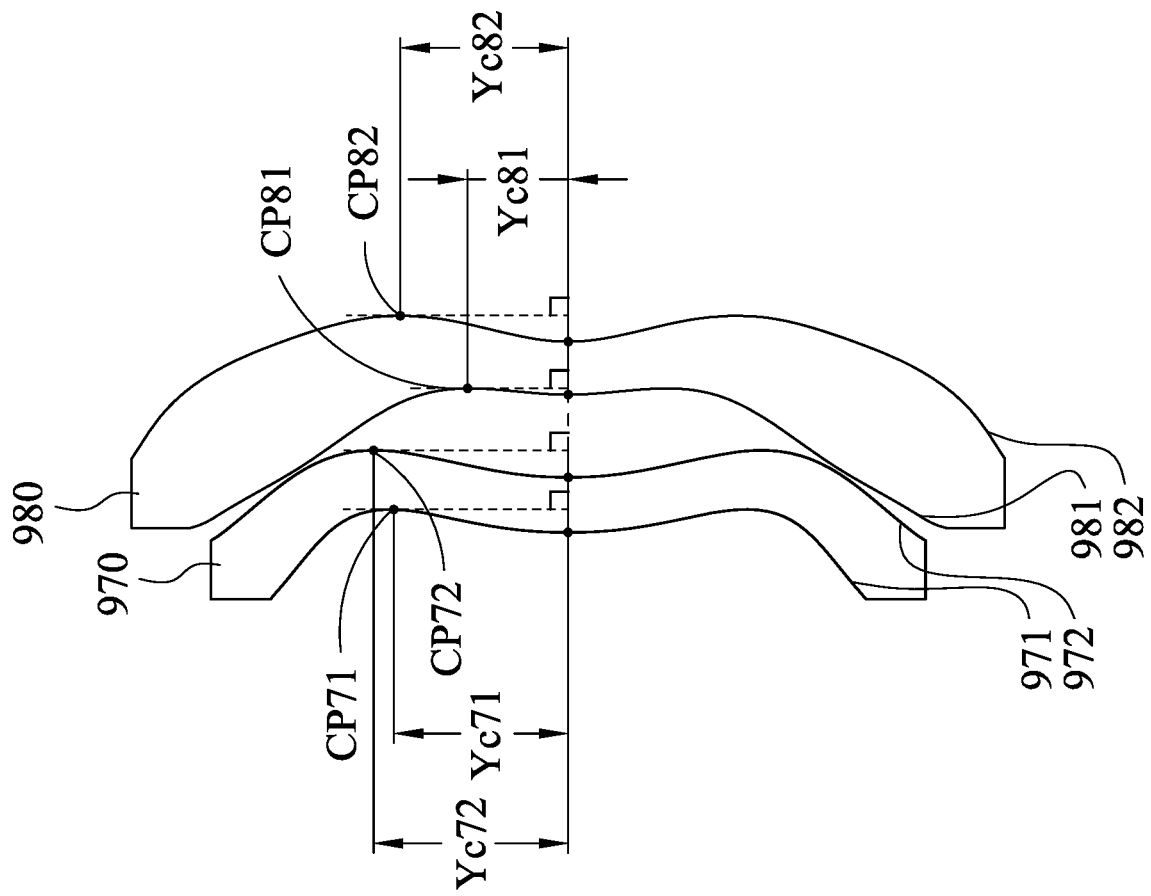
FIG. 28 is a schematic view of critical points and parameters Yc71, Yc72, Yc81 and Yc82 according to the 9th embodiment.

The seventh lens element 170 with positive refractive power has an object-side surface 171 being convex and an image-side surface 172 being concave. The seventh lens element 170 is made of a plastic material, and has the object-side surface 171 and the image-side surface 172 being both aspheric. Furthermore, each of the object-side surface 171 and the image-side surface 172 of the seventh lens element 170 includes at least one inflection point and at least one critical point (as shown in FIG. 28 according to the 9th embodiment).

The eighth lens element 180 with negative refractive power has an object-side surface 181 being concave and an image-side surface 182 being concave. The eighth lens element 180 is made of a plastic material, and has the object-side surface 181 and the image-side surface 182 being both aspheric. Furthermore, each of the object-side surface 181 and the image-side surface 182 of the eighth lens element 180 includes at least one inflection point and at least one critical point (as shown in FIG. 28 according to the 9th embodiment).

The filter 190 is made of a glass material and located between the eighth lens element 180 and the image surface 195, and will not affect the focal length of the image capturing optical assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing optical assembly according to the 1st embodiment, when a focal length of the image capturing optical assembly is f, an f-number of the image capturing optical assembly is Fno, and half of a maximum field of view of the image capturing optical assembly is HFOV, these parameters have the following values: f=3.94 mm; Fno=1.60; and HFOV=38.6 degrees.

In the image capturing optical assembly according to the 1st embodiment, when a maximum of refractive indexes of all the lens elements (that is, the first lens element 110, the second lens element 120, the third lens element 130, the fourth lens element 140, the fifth lens element 150, the sixth lens element 160, the seventh lens element 170, and the eighth lens element 180) of the image capturing optical assembly is Nmax (in the 1st embodiment, which are the second lens element 120, the fourth lens element 140, and the sixth lens element 160), and a minimum of refractive indexes of all the lens elements of the image capturing optical assembly is Nmin (in the 1st embodiment, which is the eighth lens element 180), the following conditions are satisfied: Nmax=1.671; and Nmin=1.535.

In the image capturing optical assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, and an Abbe number of the sixth lens element is V6, the following conditions are satisfied: (V2+V6)/V1=0.70; |(V2−V3)/(V4−V5)|=1.00; and (V4+V5+V6)/V1=1.70.

In the image capturing optical assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, an axial distance between the seventh lens element 170 and the eighth lens element 180 is T78, a maximum of axial distances between every adjacent lens elements of the image capturing optical assembly is ATmax (that is, the maximum among T12, T23, T34, T45, T56, T67 and T78), a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, a central thickness of the seventh lens element 170 is CT7, a central thickness of the eighth lens element 180 is CT8, a minimum of central thicknesses of all the lens elements of the image capturing optical assembly is CTmin (that is, the minimum among CT1, CT2, CT3, CT4, CT5, CT6, CT7 and CT8), and a maximum image height of the image capturing optical assembly is ImgH (half of a diagonal length of an effective photosensitive area of the image sensor 196), the following conditions are satisfied: ATmax/CTmin=2.06; and ATmax/ImgH=0.13.

In the image capturing optical assembly according to the 1st embodiment, when a curvature radius of the object-side surface 161 of the sixth lens element 160 is R11, and a curvature radius of the image-side surface 162 of the sixth lens element 160 is R12, the following condition is satisfied: (R11−R12)/(R11+R12)=0.29.

In the image capturing optical assembly according to the 1st embodiment, when the focal length of the image capturing optical assembly is f, and a curvature radius of the image-side surface 182 of the eighth lens element 180 is R16, the following condition is satisfied: f/R16=0.22.

Figure 27:
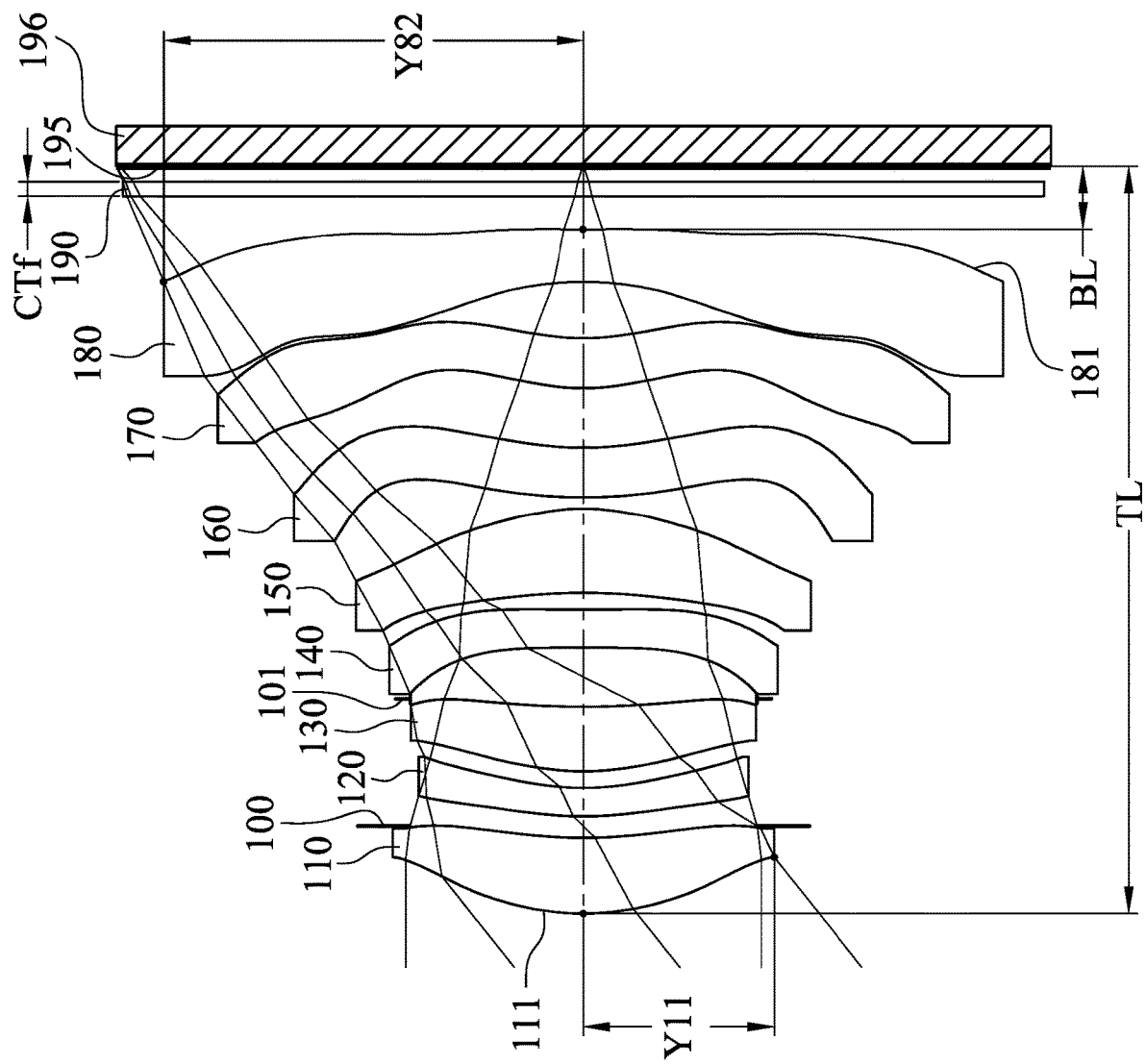
FIG. 27 is a schematic view of parameters of the 1st embodiment of the present disclosure.

FIG. 27 is a schematic view of parameters (including TL and BL) of the 1st embodiment of the present disclosure. In the image capturing optical assembly and FIG. 27 according to the 1st embodiment, when an entrance pupil diameter of the image capturing optical assembly is EPD, a sum of central thicknesses of all the lens elements of the image capturing optical assembly is ΣCT (ΣCT=CT1+CT2+CT3+CT4+CT5+CT6+CT7+CT8), an axial distance between the image-side surface 182 of the eighth lens element 180 and the image surface 195 is BL, an axial distance between the object-side surface 111 of the first lens element 110 and the image surface 195 is TL, the focal length of the image capturing optical assembly is f, the following conditions are satisfied: EPD/ΣCT=0.80; EPD/BL=5.63; TL/EPD=2.11; and f/EPD=1.60.

In the image capturing optical assembly according to the 1st embodiment, when the focal length of the image capturing optical assembly is f, a focal length of the first lens element 110 is f1, and a focal length of the second lens element 120 is f2, the following conditions are satisfied: f1/f2=−0.68; and f/f2=−0.37.

In the image capturing optical assembly according to the 1st embodiment, when the focal length of the image capturing optical assembly is f, the focal length of the first lens element 110 is f1, the focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, a focal length of the eighth lens element 180 is f8, a focal length of i-th lens element is fi, and a maximum of |f/fi| is |f/fi|max, the following condition is satisfied: |f/fi|max=0.93, wherein i=1−8. (that is, |f/fi|max is a maximum absolute value of a ratio between the focal length of the image capturing optical assembly and the focal length of each lens element, and in the 1st embodiment, |f/fi|max=|f/f5|).

In the image capturing optical assembly according to the 1st embodiment, when the focal length of the image capturing optical assembly is f, the focal length of the second lens element 120 is f2, and the focal length of the third lens element 130 is f3, the following condition is satisfied: (f/f2)+(f/f3)=0.36.

In the image capturing optical assembly and FIG. 27 according to the 1st embodiment, when a central thickness of the filter 190 is CTf, the following condition is satisfied: CTf=0.10 mm.

In the image capturing optical assembly according to the 1st embodiment, when the axial distance between the object-side surface 111 of the first lens element 110 and the image surface 195 is TL, the focal length of the image capturing optical assembly is f, the maximum image height of the image capturing optical assembly is ImgH, the following conditions are satisfied: TL=5.19 mm; TL/f=1.32; and TL/ImgH=1.60.

In the image capturing optical assembly according to the 1st embodiment, when an axial distance between the aperture stop 100 and the image-side surface 182 of the eighth lens element 180 is SD, and an axial distance between the object-side surface 111 of the first lens element 110 and the image-side surface 182 of the eighth lens element 180 is TD, the following condition is satisfied: SD/TD=0.87.

In the image capturing optical assembly and FIG. 27 according to the 1st embodiment, when a maximum optical effective radius of the object-side surface 111 of the first lens element 110 is Y11, and a maximum optical effective radius of the image-side surface 182 of the eighth lens element 180 is Y82, the following condition is satisfied: Y11/Y82=0.45.

In the image capturing optical assembly according to the 1st embodiment, when half of a maximum field of view of the image capturing optical assembly is HFOV, the focal length of the image capturing optical assembly is f, and the entrance pupil diameter of the image capturing optical assembly is EPD, the following condition is satisfied: HFOV×EPD/f=24.11.

In the image capturing optical assembly according to the 1st embodiment, when the axial distance between the object-side surface 111 of the first lens element 110 and the image surface 195 is TL, the maximum image height of the image capturing optical assembly is ImgH, the focal length of the image capturing optical assembly is f, and the entrance pupil diameter of the image capturing optical assembly is EPD, the following conditions are satisfied: TL/ImgH+f/EPD=3.20; and TL^2/(ImgH×EPD)=3.37.

In the image capturing optical assembly according to the 1st embodiment, when the focal length of the image capturing optical assembly is f, a focal length of the first lens group is fG1, a focal length of the second lens group is fG2, and a focal length of the third lens group is fG3, the following conditions are satisfied: f/fG1=0.25; f/fG2=1.20; and f/fG3=−1.16. Thus, in the 1st embodiment, the first lens group is positive refractive power, the second lens group is positive refractive power, and the third lens group is negative refractive power.

FIG. 28 is a schematic view of critical points and parameters Yc71, Yc72, Yc81 and Yc82 according to the 9th embodiment, wherein the critical points and the corresponding parameters according to others embodiments can refer to FIG. 28, and will not be drawn again. In the image capturing optical assembly according to the 1st embodiment, each of the object-side surface 171 and the image-side surface 172 of the seventh lens element 170 includes at least one critical point CP71, CP72 (as shown in FIG. 28), the image-side surface 182 of the eighth lens element 180 includes at least one critical point CP82, wherein when a vertical distance of the critical point CP71 on the object-side surface 171 of the seventh lens element 170 and an optical axis is Yc71, a vertical distance of the critical point CP72 on the image-side surface 172 of the seventh lens element 170 and the optical axis is Yc72, and a vertical distance of the critical point CP82 on the image-side surface 182 of the eighth lens element 180 and the optical axis is Yc82, the following conditions are satisfied: Yc71/f=0.23; Yc72/f=0.24; and Yc82/f=0.07, 0.29, 0.38 (three critical points including CP82 on the image-side surface 182 of the eighth lens element 180 in order from the optical axis to an off-axis region thereof).

In the image capturing optical assembly according to the 1st embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 110 through the eighth lens element 180 is stated in the following table, wherein a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 131 of the third lens element 130 is R5, a curvature radius of the image-side surface 132 of the third lens element 130 is R6, a curvature radius of the object-side surface 141 of the fourth lens element 140 is R7, a curvature radius of the image-side surface 142 of the fourth lens element 140 is R8, a curvature radius of the object-side surface 151 of the fifth lens element 150 is R9, a curvature radius of the image-side surface 152 of the fifth lens element 150 is R10, the curvature radius of the object-side surface 161 of the sixth lens element 160 is R11, the curvature radius of the image-side surface 162 of the sixth lens element 160 is R12, a curvature radius of the object-side surface 171 of the seventh lens element 170 is R13, a curvature radius of the image-side surface 172 of the seventh lens element 170 is R14, a curvature radius of the object-side surface 181 of the eighth lens element 180 is R15, the curvature radius of the image-side surface 182 of the eighth lens element 180 is R16.

| 1st Embodiment | | | | |
|---|---|---|---|---|
| \|f/Rf\| + \|f/Rr\| | \|f/R1\| + \|f/R2\| | 3.18 | \|f/Rf\| + \|f/Rr\| \|f/R9\| + \|f/R10\| | 3.33 |
| | \|f/R3\| + \|f/R4\| | 3.77 | \|f/R11\| + \|f/R12\| | 2.54 |
| | \|f/R5\| + \|f/R6\| | 2.72 | \|f/R13\| + \|f/R14\| | 4.69 |
| | \|f/R7\| + \|f/R8\| | 0.44 | \|f/R15\| + \|f/R16\| | 1.61 |

The detailed optical data of the 1st embodiment are shown in Table 1 and the aspheric surface data are shown in Table 2 below.

TABLE 1

1st Embodiment
f = 3.94 mm, Fno = 1.60, HFOV = 38.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.928 | ASP | 0.525 | Plastic | 1.545 | 56.0 | 7.10 |
| 2 | | 3.478 | ASP | 0.081 | | | | |
| 3 | Ape. Stop | Plano | | 0.068 | | | | |
| 4 | Lens 2 | 2.506 | ASP | 0.200 | Plastic | 1.671 | 19.5 | −10.52 |
| 5 | | 1.790 | ASP | 0.116 | | | | |
| 6 | Lens 3 | 1.963 | ASP | 0.446 | Plastic | 1.544 | 56.0 | 5.36 |
| 7 | | 5.527 | ASP | 0.056 | | | | |
| 8 | Stop | Plano | | 0.354 | | | | |

TABLE 1-continued

1st Embodiment
f = 3.94 mm, Fno = 1.60, HFOV = 38.6 deg.

| Surface # | | Curvature Radius | | Thickness | Material | Index | Abbe # | Focal Length |
|---|---|---|---|---|---|---|---|---|
| 9 | Lens 4 | 186.578 | ASP | 0.262 | Plastic | 1.671 | 19.5 | −14.96 |
| 10 | | 9.516 | ASP | 0.118 | | | | |
| 11 | Lens 5 | −4.540 | ASP | 0.584 | Plastic | 1.544 | 56.0 | 4.24 |
| 12 | | −1.600 | ASP | 0.080 | | | | |
| 13 | Lens 6 | 4.352 | ASP | 0.345 | Plastic | 1.671 | 19.5 | −8.65 |
| 14 | | 2.408 | ASP | 0.412 | | | | |
| 15 | Lens 7 | 1.619 | ASP | 0.346 | Plastic | 1.544 | 56.0 | 20.86 |
| 16 | | 1.746 | ASP | 0.388 | | | | |
| 17 | Lens 8 | −2.844 | ASP | 0.369 | Plastic | 1.535 | 55.8 | −4.56 |
| 18 | | 17.810 | ASP | 0.230 | | | | |
| 19 | Filter | Plano | | 0.100 | Glass | 1.517 | 64.2 | — |
| 20 | | Plano | | 0.107 | | | | |
| 21 | Image | Plano | | — | | | | |

Reference wavelength is 587.6 nm (d-line).
Effective radius of the stop on Surface 8 is 1.200 mm.

TABLE 2

Aspheric Coefficients

| Surface # | 1 | 2 | 4 | 5 | 6 | 7 |
|---|---|---|---|---|---|---|
| k = | −7.5558E−02 | 1.8388E−01 | −2.6199E+01 | −1.2691E+01 | −7.7466E+00 | 7.7477E+00 |
| A4 = | 1.9730E−03 | −5.9360E−02 | −6.8861E−03 | −1.7037E−02 | −9.3162E−03 | −3.1641E−02 |
| A6 = | −1.5553E−02 | 3.7091E−02 | 4.0560E−03 | 7.8752E−02 | 7.6992E−02 | 9.5138E−04 |
| A8 = | 5.9626E−03 | −7.6079E−02 | −4.7529E−02 | −1.5539E−01 | −1.5110E−01 | −1.1970E−02 |
| A10 = | 2.7832E−03 | 4.5418E−02 | 3.8138E−03 | 1.4312E−01 | 1.3120E−01 | 1.3892E−03 |
| A12 = | −9.8246E−03 | −9.5835E−03 | 5.1832E−03 | −5.8462E−02 | −8.1055E−02 | −1.3668E−02 |
| A14 = | 2.6039E−03 | | −5.6365E−03 | 1.1309E−02 | 2.4939E−02 | 6.9141E−03 |
| A16 = | | | | | | |
| A18 = | | | | | | |

| Surface # | 9 | 10 | 11 | 12 | 13 | 14 |
|---|---|---|---|---|---|---|
| k = | 9.0000E+01 | 4.6461E+01 | 8.9348E+00 | −1.4561E+00 | 2.4347E+00 | −6.0993E+00 |
| A4 = | −2.2585E−01 | −3.3182E−01 | −2.1600E−01 | 1.6542E−01 | 1.1748E−01 | −6.9686E−02 |
| A6 = | 3.4023E−01 | 9.4694E−01 | 1.2471E+00 | −1.4906E−01 | −2.5447E−01 | 7.9880E−02 |
| A8 = | −8.9321E−01 | −2.0248E+00 | −2.6063E+00 | 3.8163E−02 | 2.6251E−01 | −8.2540E−02 |
| A10 = | 1.2667E+00 | 2.2813E+00 | 2.8342E+00 | 1.8765E−02 | −2.1190E−01 | 3.8046E−02 |
| A12 = | −9.2388E−01 | −1.3710E+00 | −1.7268E+00 | −1.5067E−02 | 1.1213E−01 | −8.7322E−03 |
| A14 = | 3.1985E−01 | 4.1316E−01 | 5.8535E−01 | 4.5369E−03 | −3.5496E−02 | 9.0885E−04 |
| A16 = | −4.0070E−02 | −4.8397E−02 | −1.0137E−01 | −6.0201E−04 | 5.9114E−03 | −2.7497E−05 |
| A18 = | | −1.5452E−04 | 6.8673E−03 | | −3.8549E−04 | |
| A20 = | | | | | | |

| Surface # | 15 | 16 | 17 | 18 |
|---|---|---|---|---|
| k = | −4.1418E+00 | −3.2044E+00 | −1.4099E+01 | −6.9116E+01 |
| A4 = | −1.3863E−01 | −1.9790E−01 | −3.3084E−01 | −2.0709E−01 |
| A6 = | 7.9691E−02 | 1.6085E−01 | 5.0767E−01 | 2.5648E−01 |
| A8 = | −1.6087E−01 | −1.9432E−01 | −3.9883E−01 | −1.4720E−01 |
| A10 = | 1.3947E−01 | 1.4107E−01 | 1.8861E−01 | 4.7769E−02 |
| A12 = | −6.0268E−02 | −5.5445E−02 | −5.5035E−02 | −9.5115E−03 |
| A14 = | 1.4826E−02 | 1.2492E−02 | 9.9004E−03 | 1.1905E−03 |
| A16 = | −2.1253E−03 | −1.6295E−03 | −1.0681E−03 | −9.1817E−05 |
| A18 = | 1.6577E−04 | 1.1495E−04 | 6.3408E−05 | 4.0079E−06 |
| A20 = | −5.4420E−06 | −3.4029E−06 | −1.5944E−06 | −7.6158E−08 |

In Table 1, the curvature radius, the thickness and the focal length are shown in millimeters (mm). Surface numbers 0-21 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, in the 1st embodiment, each of three of the first lens element 110, the second lens element 120, the third lens element 130, the fourth lens element 140, the fifth lens element 150, the sixth lens element 160, the seventh lens element 170, and the eighth lens element 180 has the Abbe number smaller than 24.0, 23.0 and 20; in detail, the three lens elements are the second lens element 120, the fourth lens element 140 and the sixth lens element 160.

In the 1st embodiment, the counts of the inflection points of object-side surfaces and image-side surfaces of the first lens element 110, the second lens element 120, the third lens element 130, the fourth lens element 140, the fifth lens element 150, the sixth lens element 160, the seventh lens element 170, and the eighth lens element 180 are listed in the table below. Also, in the 1st embodiment, a total number of inflection points on the object-side surfaces and the image-side surfaces of all the lens elements of the image capturing optical assembly is Ninf., the following condition is satisfied: Ninf.=30.

| 1st Embodiment - numbers of the inflection points | | | | | | | | |
|---|---|---|---|---|---|---|---|---|
| | 110 | 120 | 130 | 140 | 150 | 160 | 170 | 180 |
| Object-side surface | 1 | 2 | 2 | 1 | 0 | 2 | 3 | 3 |
| Image-side surface | 1 | 0 | 1 | 2 | 2 | 2 | 3 | 5 |

2nd Embodiment

Figure 3:
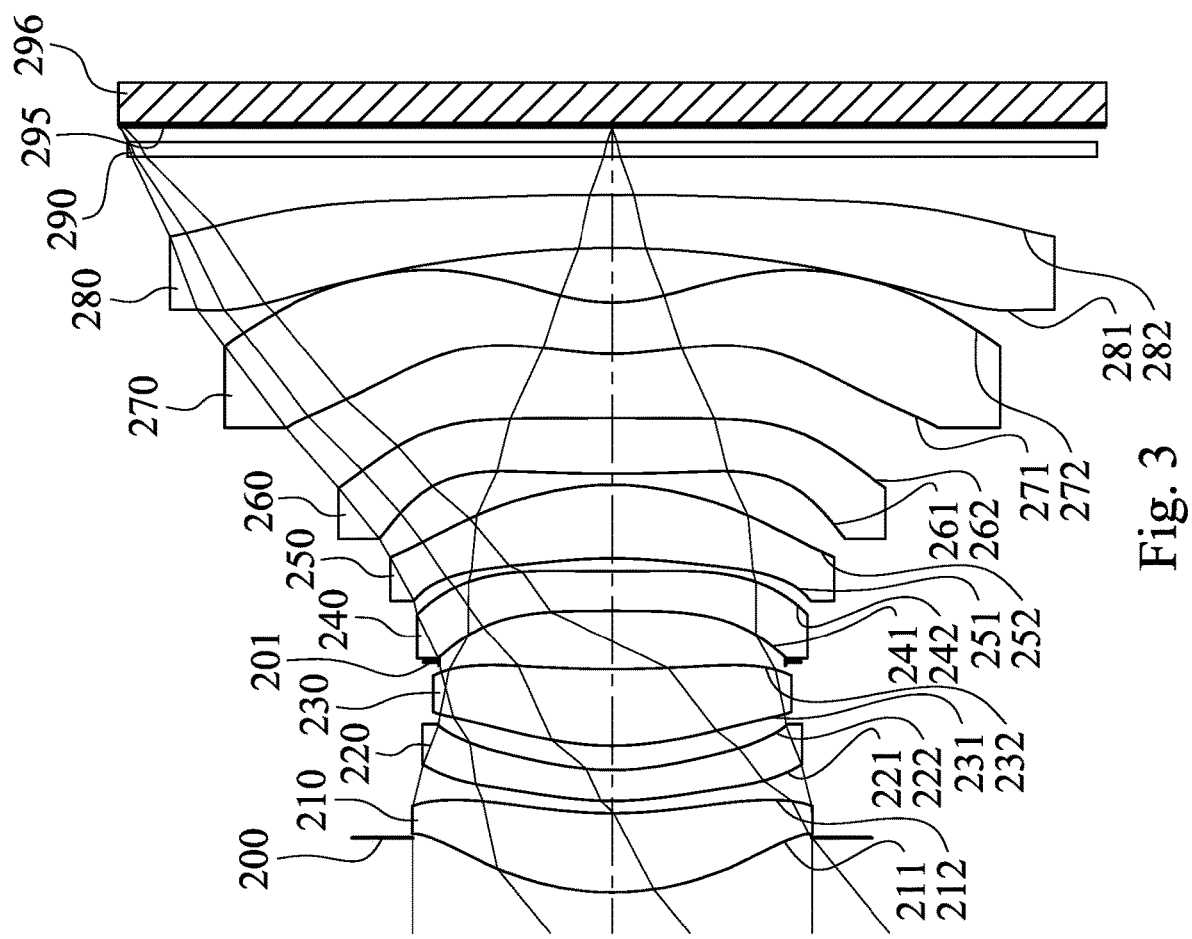
FIG. 3 is a schematic view of an imaging apparatus according to the 2nd embodiment of the present disclosure.
Figure 4:
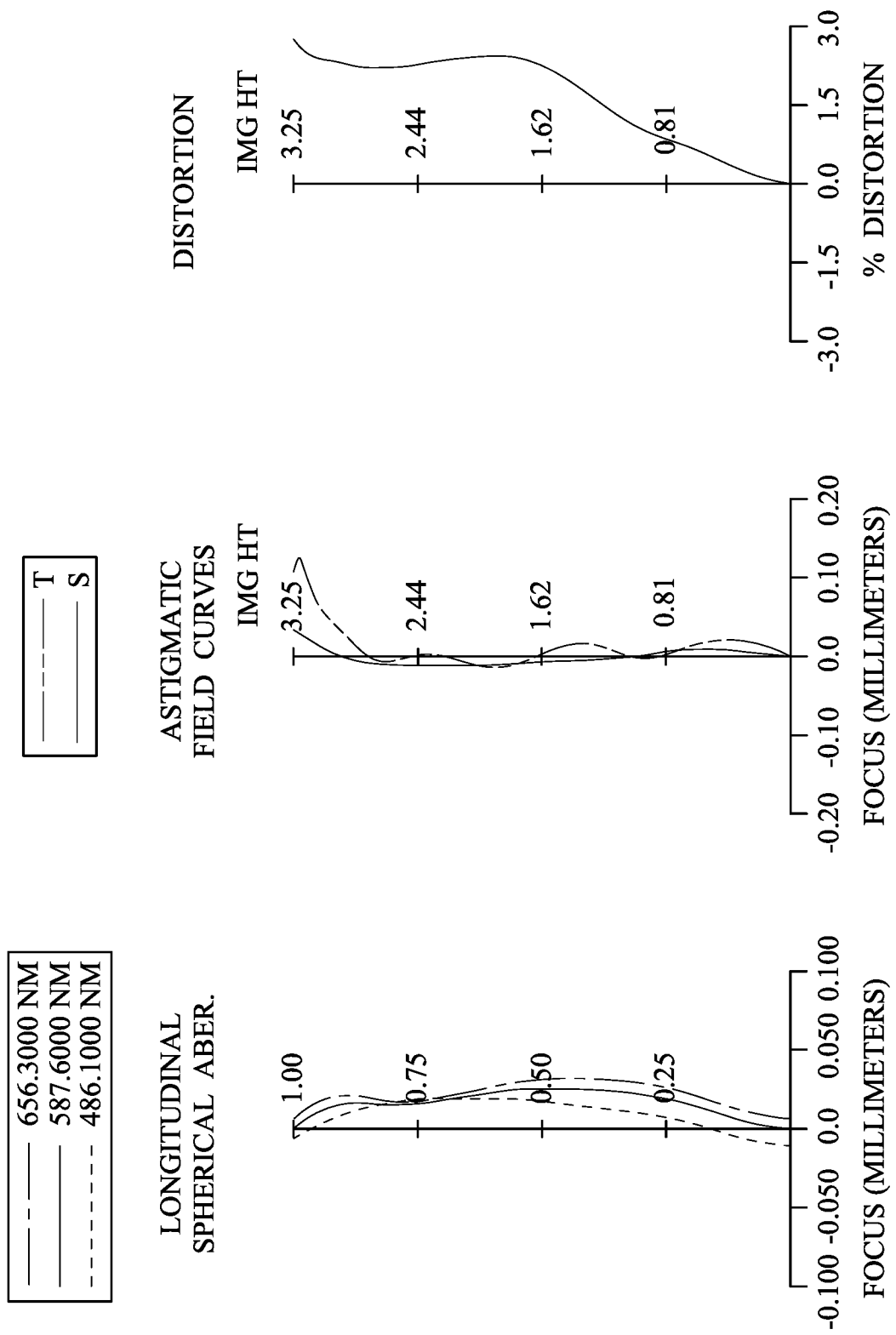
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an image capturing optical assembly (its reference numeral is omitted) and an image sensor 296. The image capturing optical assembly includes, in order from an object side to an image side, an aperture stop 200, a first lens element 210, a second lens element 220, a third lens element 230, a stop 201, a fourth lens element 240, a fifth lens element 250, a sixth lens element 260, a seventh lens element 270, an eighth lens element 280, a filter 290 and an image surface 295, wherein the image sensor 296 is disposed on the image surface 295 of the image capturing optical assembly. The image capturing optical assembly includes eight lens elements (210, 220, 230, 240, 250, 260, 270, and 280) without additional one or more lens elements inserted between the first lens element 210 and the eighth lens element 280, and there is an air gap in a paraxial region between every adjacent lens elements of the image capturing optical assembly. The first lens element 210 and the second lens element 220 belong to a first lens group (its reference numeral is omitted). The third lens element 230, the fourth lens element 240 and the fifth lens element 250 belong to a second lens group (its reference numeral is omitted). The sixth lens element 260, the seventh lens element 270 and the eighth lens element 280 belong to a third lens group (its reference numeral is omitted).

The first lens element 210 with positive refractive power has an object-side surface 211 being convex and an image-side surface 212 being concave. The first lens element 210 is made of a plastic material, and has the object-side surface 211 and the image-side surface 212 being both aspheric. Furthermore, each of the object-side surface 211 and the image-side surface 212 of the first lens element 210 includes at least one inflection point.

The second lens element 220 with negative refractive power has an object-side surface 221 being convex and an image-side surface 222 being concave. The second lens element 220 is made of a plastic material, and has the object-side surface 221 and the image-side surface 222 being both aspheric.

The third lens element 230 with positive refractive power has an object-side surface 231 being convex and an image-side surface 232 being concave. The third lens element 230 is made of a plastic material, and has the object-side surface 231 and the image-side surface 232 being both aspheric. Furthermore, each of the object-side surface 231 and the image-side surface 232 of the third lens element 230 includes at least one inflection point.

The fourth lens element 240 with negative refractive power has an object-side surface 241 being concave and an image-side surface 242 being concave. The fourth lens element 240 is made of a plastic material, and has the object-side surface 241 and the image-side surface 242 being both aspheric. Furthermore, the image-side surface 242 of the fourth lens element 240 includes at least one inflection point.

The fifth lens element 250 with positive refractive power has an object-side surface 251 being concave and an image-side surface 252 being convex. The fifth lens element 250 is made of a plastic material, and has the object-side surface 251 and the image-side surface 252 being both aspheric. Furthermore, the image-side surface 252 of the fifth lens element 250 includes at least one inflection point.

The sixth lens element 260 with positive refractive power has an object-side surface 261 being convex and an image-side surface 262 being convex. The sixth lens element 260 is made of a plastic material, and has the object-side surface 261 and the image-side surface 262 being both aspheric. Furthermore, each of the object-side surface 261 and the image-side surface 262 of the sixth lens element 260 includes at least one inflection point.

The seventh lens element 270 with negative refractive power has an object-side surface 271 being convex and an image-side surface 272 being concave. The seventh lens element 270 is made of a plastic material, and has the object-side surface 271 and the image-side surface 272 being both aspheric. Furthermore, each of the object-side surface 271 and the image-side surface 272 of the seventh lens element 270 includes at least one inflection point and at least one critical point.

The eighth lens element 280 with negative refractive power has an object-side surface 281 being concave and an image-side surface 282 being convex. The eighth lens element 280 is made of a plastic material, and has the object-side surface 281 and the image-side surface 282 being both aspheric. Furthermore, each of the object-side surface 281 and the image-side surface 282 of the eighth lens element 280 includes at least one inflection point, and the object-side surface 281 of the eighth lens element 280 includes at least one critical point.

The filter 290 is made of a glass material and located between the eighth lens element 280 and the image surface 295, and will not affect the focal length of the image capturing optical assembly.

The detailed optical data of the 2nd embodiment are shown in Table 3 and the aspheric surface data are shown in Table 4 below.

TABLE 3

2nd Embodiment
f = 3.86 mm, Fno = 1.47, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.358 | | | | |
| 2 | Lens 1 | 1.873 | ASP | 0.521 | Plastic | 1.545 | 56.0 | 7.20 |
| 3 | | 3.234 | ASP | 0.082 | | | | |
| 4 | Lens 2 | 2.316 | ASP | 0.202 | Plastic | 1.671 | 19.5 | −12.72 |
| 5 | | 1.758 | ASP | 0.160 | | | | |
| 6 | Lens 3 | 2.045 | ASP | 0.503 | Plastic | 1.544 | 56.0 | 5.16 |
| 7 | | 6.865 | ASP | 0.048 | | | | |
| 8 | Stop | Plano | | 0.339 | | | | |
| 9 | Lens 4 | −32.701 | ASP | 0.260 | Plastic | 1.671 | 19.5 | −11.27 |
| 10 | | 9.863 | ASP | 0.085 | | | | |
| 11 | Lens 5 | −4.301 | ASP | 0.484 | Plastic | 1.544 | 56.0 | 5.13 |
| 12 | | −1.760 | ASP | 0.075 | | | | |
| 13 | Lens 6 | 112.292 | ASP | 0.364 | Plastic | 1.671 | 19.5 | 27.69 |
| 14 | | −22.222 | ASP | 0.423 | | | | |
| 15 | Lens 7 | 1.902 | ASP | 0.340 | Plastic | 1.544 | 56.0 | −5.82 |
| 16 | | 1.113 | ASP | 0.359 | | | | |
| 17 | Lens 8 | −6.996 | ASP | 0.350 | Plastic | 1.544 | 56.0 | −13.92 |
| 18 | | −93.135 | ASP | 0.250 | | | | |
| 19 | Filter | Plano | | 0.100 | Glass | 1.517 | 64.2 | — |
| 20 | | Plano | | 0.108 | | | | |
| 21 | Image | Plano | | — | | | | |

Reference wavelength is 587.6 nm (d-line).
Effective radius of the stop on Surface 8 is 1.140 mm.

TABLE 4

Aspheric Coefficients

| Surface # | 2 | 3 | 4 | 5 | 6 | 7 |
|---|---|---|---|---|---|---|
| k = | −1.3524E−01 | 5.3969E−01 | −1.9953E+01 | −9.9928E+00 | −9.4801E+00 | 9.3170E+00 |
| A4 = | −1.3031E−04 | −4.2969E−02 | 2.0893E−02 | −1.7829E−03 | 4.9091E−02 | −2.7703E−02 |
| A6 = | 1.5256E−03 | −7.5619E−02 | −1.8379E−01 | −7.7109E−02 | −1.0889E−01 | −2.4663E−02 |
| A8 = | −2.9479E−02 | 7.5476E−02 | 3.0327E−01 | 1.8403E−01 | 1.1772E−01 | −7.6394E−03 |
| A10 = | 3.1224E−02 | −3.4856E−02 | −2.1831E−01 | −1.2731E−01 | −8.7029E−02 | −1.2633E−02 |
| A12 = | −2.1644E−02 | 5.3303E−03 | 8.8695E−02 | 3.6808E−02 | 2.0446E−02 | 9.7559E−03 |
| A14 = | 4.6368E−03 | | −1.5980E−02 | −1.0098E−04 | 5.4879E−03 | −9.8383E−04 |
| A16 = | | | −6.3288E−14 | | | |
| A18 = | | | | | | |

| Surface # | 9 | 10 | 11 | 12 | 13 | 14 |
|---|---|---|---|---|---|---|
| k = | 9.0000E+01 | 5.1627E+01 | 9.3342E+00 | −9.6236E−01 | 6.0000E+00 | −9.0000E+01 |
| A4 = | −2.0881E−01 | −3.3392E−01 | −2.0264E−01 | 1.5810E−01 | 2.3064E−01 | 9.5980E−02 |
| A6 = | 9.0250E−02 | 9.3714E−01 | 1.3512E+00 | −3.6216E−01 | −6.1552E−01 | −2.0040E−01 |
| A8 = | −2.3290E−01 | −2.0276E+00 | −2.9796E+00 | 4.6587E−01 | 7.3141E−01 | 1.4810E−01 |
| A10 = | 3.0447E−01 | 2.2804E+00 | 3.4675E+00 | −3.3558E−01 | −5.9386E−01 | −7.0380E−02 |
| A12 = | −1.4061E−01 | −1.3713E+00 | −2.3369E+00 | 1.3221E−01 | 3.2191E−01 | 2.0538E−02 |
| A14 = | −6.9724E−03 | 4.1305E−01 | 9.1943E−01 | −2.4771E−02 | −1.1329E−01 | −3.1945E−03 |
| A16 = | 1.5001E−02 | −4.8314E−02 | −2.0171E−01 | 1.4573E−03 | 2.3359E−02 | 2.0064E−04 |
| A18 = | | 9.8183E−06 | 2.0189E−02 | | −2.0940E−03 | |
| A20 = | | | | | | |

| Surface # | 15 | 16 | 17 | 18 |
|---|---|---|---|---|
| k = | −7.2554E+00 | −3.7601E+00 | −6.7960E+01 | 9.0000E+01 |
| A4 = | −2.7196E−01 | −2.1167E−01 | −5.3883E−02 | −5.4065E−02 |
| A6 = | 1.5314E−01 | 1.5311E−01 | 7.3396E−02 | 6.1904E−02 |
| A8 = | −7.0242E−02 | −8.9515E−02 | −5.9767E−02 | −3.4069E−02 |
| A10 = | 2.1630E−02 | 3.6277E−02 | 2.8548E−02 | 1.1055E−02 |
| A12 = | −1.5091E−03 | −9.4600E−03 | −8.3072E−03 | −2.3126E−03 |
| A14 = | −1.2865E−03 | 1.5354E−03 | 1.4891E−03 | 3.1694E−04 |
| A16 = | 4.3817E−04 | −1.4866E−04 | −1.6026E−04 | −2.7500E−05 |
| A18 = | −5.6988E−05 | 7.7983E−06 | 9.4940E−06 | 1.3682E−06 |
| A20 = | 2.7666E−06 | −1.6911E−07 | −2.3800E−07 | −2.9670E−08 |

In the 2nd embodiment, the equation of the aspheric surface profiles of the aforementioned lens elements is the same as the equation of the 1st embodiment, and the object-side surface 281 of the eighth lens element 280 includes at least one critical point CP81 (as shown in FIG. 28), and a vertical distance of the critical point CP81 on the object-side surface 281 of the eighth lens element 280 and the optical axis is Yc81. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.86 | |f/fi|max | 0.75 |
| Fno | 1.47 | (f/f2) + (f/f3) | 0.44 |
| HFOV [deg.] | 39.2 | CTf [mm] | 0.10 |
| Nmax | 1.671 | TL [mm] | 5.05 |
| Nmin | 1.544 | TL/f | 1.31 |
| (V2 + V6)/V1 | 0.70 | TL/ImgH | 1.55 |
| |(V2 − V3)/(V4 − V5)| | 1.00 | SD/TD | 0.92 |
| (V4 + V5 + V6)/V1 | 1.70 | Y11/Y82 | 0.45 |
| ATmax/CTmin | 2.09 | HFOV × EPD/f | 26.65 |
| ATmax/ImgH | 0.13 | TL/ImgH + f/EPD | 3.02 |
| (R11 − R12)/(R11 + R12) | 1.49 | TL^2/(ImgH × EPD) | 2.99 |
| f/R16 | −0.04 | f/fG1 | 0.29 |
| EPD/ΣCT | 0.87 | f/fG2 | 1.03 |
| EPD/BL | 5.73 | f/fG3 | −0.76 |
| TL/EPD | 1.92 | Yc71/f | 0.19 |
| f/EPD | 1.47 | Yc72/f | 0.31 |
| f1/f2 | −0.57 | Yc81/f | 0.68 |
| f/f2 | −0.30 | Yc82/f | — |

In the image capturing optical assembly according to the 2nd embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 210 through the eighth lens element 280 is stated in the following table, wherein term definitions of the parameters related to each surface of the lens elements are the same as those of the 1st embodiment. Therefore, an explanation in this regard will not be provided again.

| 2nd Embodiment | | | | |
|---|---|---|---|---|
| |f/Rf| + |f/Rr| | |f/R1| + |f/R2| | 3.26 | |f/Rf| + |f/Rr| | |f/R9| + |f/R10| | 3.09 |
| | |f/R3| + |f/R4| | 3.87 | | |f/R11| + |f/R12| | 0.21 |
| | |f/R5| + |f/R6| | 2.45 | | |f/R13| + |f/R14| | 5.50 |
| | |f/R7| + |f/R8| | 0.51 | | |f/R15| + |f/R16| | 0.59 |

In the 2nd embodiment, each of three of the first lens element 210, the second lens element 220, the third lens element 230, the fourth lens element 240, the fifth lens element 250, the sixth lens element 260, the seventh lens element 270, and the eighth lens element 280 has an Abbe number smaller than 24.0, 23.0 and 20; in detail, the three lens elements are the second lens element 220, the fourth lens element 240 and the sixth lens element 260.

In the 2nd embodiment, the numbers of the inflection points of object-side surfaces and image-side surfaces of the first lens element 210, the second lens element 220, the third lens element 230, the fourth lens element 240, the fifth lens element 250, the sixth lens element 260, the seventh lens element 270, and the eighth lens element 280 are listed in the table below. Moreover, in the 2nd embodiment, a total number of inflection points on the object-side surfaces and the image-side surfaces of all the lens elements of the image capturing optical assembly is Ninf., the following condition is satisfied: Ninf.=22.

| 2nd Embodiment - numbers of the inflection points | | | | | | | | |
|---|---|---|---|---|---|---|---|---|
| | 210 | 220 | 230 | 240 | 250 | 260 | 270 | 280 |
| Object-side surface | 1 | 0 | 2 | 0 | 0 | 2 | 3 | 1 |
| Image-side surface | 1 | 0 | 1 | 2 | 2 | 3 | 1 | 3 |

3rd Embodiment

Figure 5:
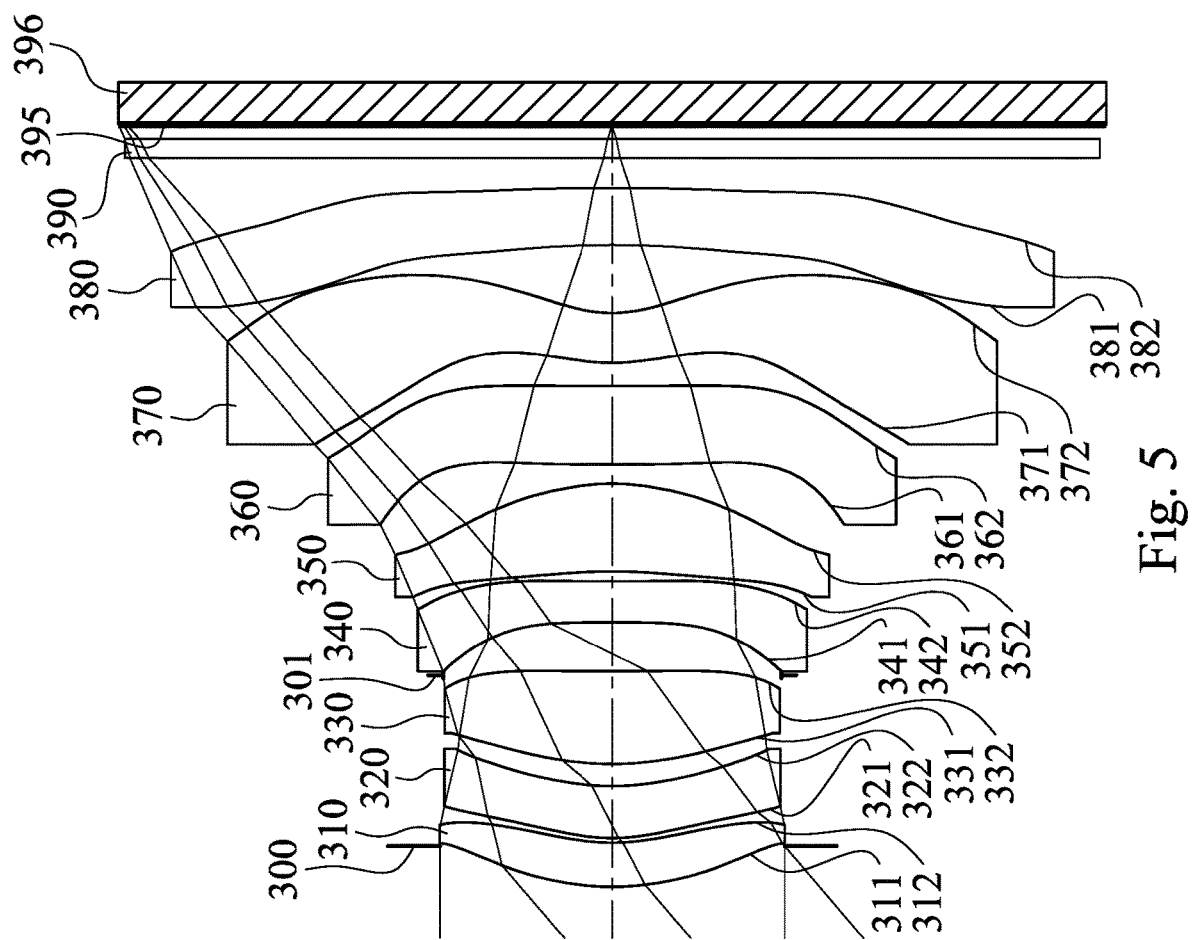
FIG. 5 is a schematic view of an imaging apparatus according to the 3rd embodiment of the present disclosure.
Figure 6:
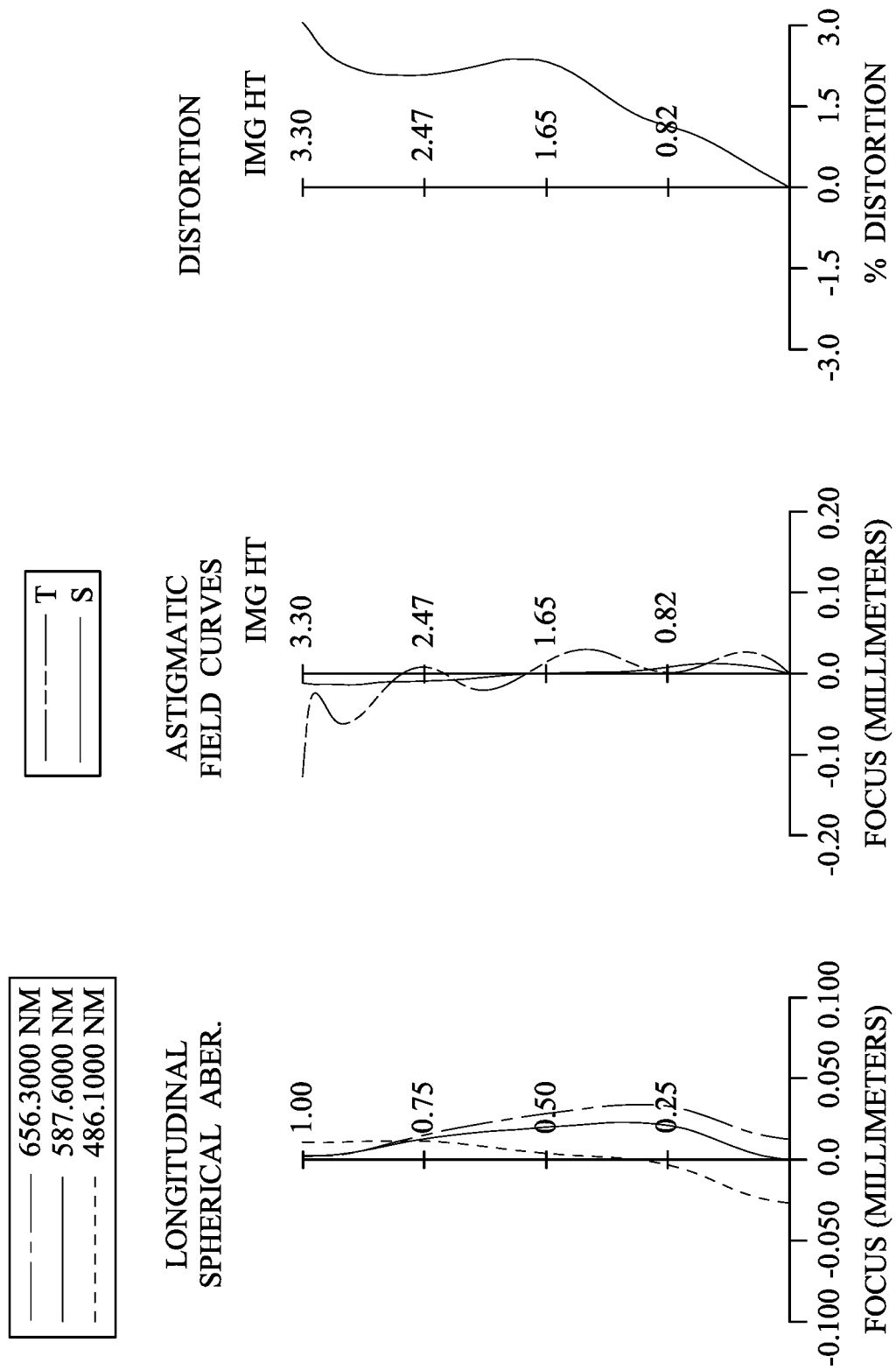
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an image capturing optical assembly (its reference numeral is omitted) and an image sensor 396. The image capturing optical assembly includes, in order from an object side to an image side, an aperture stop 300, a first lens element 310, a second lens element 320, a third lens element 330, a stop 301, a fourth lens element 340, a fifth lens element 350, a sixth lens element 360, a seventh lens element 370, an eighth lens element 380, a filter 390 and an image surface 395, wherein the image sensor 396 is disposed on the image surface 395 of the image capturing optical assembly. The image capturing optical assembly includes eight lens elements (310, 320, 330, 340, 350, 360, 370 and 380) without additional one or more lens elements inserted between the first lens element 310 and the eighth lens element 380, and there is an air gap in a paraxial region between every adjacent lens elements of the image capturing optical assembly. The first lens element 310 and the second lens element 320 belong to a first lens group (its reference numeral is omitted). The third lens element 330, the fourth lens element 340 and the fifth lens element 350 belong to a second lens group (its reference numeral is omitted). The sixth lens element 360, the seventh lens element 370 and the eighth lens element 380 belong to a third lens group (its reference numeral is omitted).

The first lens element 310 with negative refractive power has an object-side surface 311 being convex and an image-side surface 312 being concave. The first lens element 310 is made of a plastic material, and has the object-side surface 311 and the image-side surface 312 being both aspheric. Furthermore, each of the object-side surface 311 and the image-side surface 312 of the first lens element 310 includes at least one inflection point.

The second lens element 320 with positive refractive power has an object-side surface 321 being convex and an image-side surface 322 being concave. The second lens element 320 is made of a plastic material, and has the object-side surface 321 and the image-side surface 322 being both aspheric. Furthermore, the object-side surface 321 of the second lens element 320 includes at least one inflection point.

The third lens element 330 with positive refractive power has an object-side surface 331 being convex and an image-side surface 332 being concave. The third lens element 330 is made of a plastic material, and has the object-side surface 331 and the image-side surface 332 being both aspheric. Furthermore, each of the object-side surface 331 and the image-side surface 332 of the third lens element 330 includes at least one inflection point.

The fourth lens element 340 with negative refractive power has an object-side surface 341 being concave and an image-side surface 342 being concave. The fourth lens element 340 is made of a plastic material, and has the object-side surface 341 and the image-side surface 342 being both aspheric. Furthermore, the image-side surface 342 of the fourth lens element 340 includes at least one inflection point.

The fifth lens element 350 with positive refractive power has an object-side surface 351 being concave and an image-side surface 352 being convex. The fifth lens element 350 is made of a plastic material, and has the object-side surface 351 and the image-side surface 352 being both aspheric. Furthermore, each of the object-side surface 351 and the image-side surface 352 of the fifth lens element 350 includes at least one inflection point.

The sixth lens element 360 with negative refractive power has an object-side surface 361 being concave and an image-side surface 362 being convex. The sixth lens element 360 is made of a plastic material, and has the object-side surface 361 and the image-side surface 362 being both aspheric. Furthermore, each of the object-side surface 361 and the image-side surface 362 of the sixth lens element 360 includes at least one inflection point.

The seventh lens element 370 with negative refractive power has an object-side surface 371 being convex and an image-side surface 372 being concave. The seventh lens element 370 is made of a plastic material, and has the object-side surface 371 and the image-side surface 372 being both aspheric. Furthermore, each of the object-side surface 371 and the image-side surface 372 of the seventh lens element 370 includes at least one inflection point and at least one critical point.

The eighth lens element 380 with negative refractive power has an object-side surface 381 being concave and an image-side surface 382 being convex. The eighth lens element 380 is made of a plastic material, and has the object-side surface 381 and the image-side surface 382 being both aspheric. Furthermore, each of the object-side surface 381 and the image-side surface 382 of the eighth lens element 380 includes at least one inflection point, and the object-side surface 381 of the eighth lens element 380 includes at least one critical point.

The filter 390 is made of a glass material and located between the eighth lens element 380 and the image surface 395, and will not affect the focal length of the image capturing optical assembly.

The detailed optical data of the 3rd embodiment are shown in Table 5 and the aspheric surface data are shown in Table 6 below.

TABLE 5

3rd Embodiment
f = 3.74 mm, Fno = 1.61, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.274 | | | | |
| 2 | Lens 1 | 1.923 | ASP | 0.298 | Plastic | 1.545 | 56.0 | −16.39 |
| 3 | | 1.496 | ASP | 0.031 | | | | |
| 4 | Lens 2 | 1.361 | ASP | 0.350 | Plastic | 1.563 | 40.2 | 7.50 |
| 5 | | 1.821 | ASP | 0.149 | | | | |
| 6 | Lens 3 | 2.203 | ASP | 0.626 | Plastic | 1.544 | 56.0 | 4.48 |
| 7 | | 20.603 | ASP | −0.027 | | | | |
| 8 | Stop | Plano | | 0.361 | | | | |
| 9 | Lens 4 | −22.168 | ASP | 0.275 | Plastic | 1.671 | 19.5 | −9.98 |
| 10 | | 9.642 | ASP | 0.068 | | | | |
| 11 | Lens 5 | −4.407 | ASP | 0.591 | Plastic | 1.544 | 56.0 | 4.39 |
| 12 | | −1.623 | ASP | 0.130 | | | | |
| 13 | Lens 6 | −30.186 | ASP | 0.530 | Plastic | 1.634 | 23.8 | −101.86 |
| 14 | | −57.067 | ASP | 0.154 | | | | |
| 15 | Lens 7 | 1.309 | ASP | 0.340 | Plastic | 1.544 | 56.0 | −5.93 |
| 16 | | 0.846 | ASP | 0.459 | | | | |
| 17 | Lens 8 | −9.072 | ASP | 0.386 | Plastic | 1.634 | 23.8 | −19.31 |
| 18 | | −35.602 | ASP | 0.200 | | | | |
| 19 | Filter | Plano | | 0.130 | Glass | 1.517 | 64.2 | — |
| 20 | | Plano | | 0.096 | | | | |
| 21 | Image | Plano | | — | | | | |

Reference wavelength is 587.6 nm (d-line).
Effective radius of the stop on Surface 8 is 1.140 mm.

TABLE 6

Aspheric Coefficients

| Surface # | 2 | 3 | 4 | 5 | 6 | 7 |
|---|---|---|---|---|---|---|
| k = | −4.4711E−01 | −9.5520E+00 | −8.8928E+00 | −5.2239E+00 | −9.5073E+00 | −9.0000E+01 |
| A4 = | −6.2411E−03 | −5.3786E−02 | −1.0592E−02 | 4.5871E−03 | 6.5584E−02 | −4.2459E−02 |
| A6 = | 3.1219E−03 | −6.1056E−02 | −2.0198E−01 | −8.3385E−02 | −1.0522E−01 | −2.1599E−02 |
| A8 = | −2.5195E−02 | 7.6895E−02 | 3.1050E−01 | 1.7485E−01 | 1.1659E−01 | −9.1196E−03 |

TABLE 6-continued

Aspheric Coefficients

| A10 = | 2.7154E−02 | −3.5577E−02 | −2.1142E−01 | −1.3155E−01 | −8.8028E−02 | −1.3989E−02 |
|---|---|---|---|---|---|---|
| A12 = | −2.5929E−02 | 2.0846E−03 | 8.7687E−02 | 3.8302E−02 | 1.9616E−02 | 9.6094E−03 |
| A14 = | 5.7225E−03 | | −1.8830E−02 | 1.3277E−03 | 5.4868E−03 | −6.1683E−04 |
| A16 = | | | 3.0034E−04 | | | |
| A18 = | | | | | | |

| Surface # | 9 | 10 | 11 | 12 | 13 | 14 |
|---|---|---|---|---|---|---|
| k = | 9.0000E+01 | 5.0373E+01 | 9.1156E+00 | −1.0068E+00 | −9.0000E+01 | 9.0000E+01 |
| A4 = | −2.2912E−01 | −3.0905E−01 | −1.5236E−01 | 1.2765E−01 | 2.6324E−01 | 9.6277E−02 |
| A6 = | 8.7969E−02 | 9.4355E−01 | 1.2374E+00 | −2.6929E−01 | −6.1361E−01 | −2.0033E−01 |
| A8 = | −2.2787E−01 | −2.0254E+00 | −2.7866E+00 | 3.0824E−01 | 7.3099E−01 | 1.4810E−01 |
| A10 = | 3.0765E−01 | 2.2810E+00 | 3.2946E+00 | −1.8311E−01 | −5.9413E−01 | −7.0379E−02 |
| A12 = | −1.3976E−01 | −1.3713E+00 | −2.2644E+00 | 4.8836E−02 | 3.2181E−01 | 2.0538E−02 |
| A14 = | −7.1045E−03 | 4.1296E−01 | 9.2161E−01 | 4.4097E−04 | −1.1332E−01 | −3.1945E−03 |
| A16 = | 1.4718E−02 | −4.8416E−02 | −2.1306E−01 | −1.8066E−03 | 2.3346E−02 | 2.0063E−04 |
| A18 = | | −6.8119E−05 | 2.2712E−02 | | −2.0982E−03 | |
| A20 = | | | | | | |

| Surface # | 15 | 16 | 17 | 18 |
|---|---|---|---|---|
| k = | −9.0340E+00 | −4.5314E+00 | −4.6817E+01 | 8.9989E+01 |
| A4 = | −2.8958E−01 | −2.1586E−01 | −1.0636E−01 | −6.3608E−02 |
| A6 = | 1.2538E−01 | 1.8290E−01 | 2.1233E−01 | 1.0398E−01 |
| A8 = | −6.5132E−02 | −1.1576E−01 | −1.7389E−01 | −6.9913E−02 |
| A10 = | 4.1765E−02 | 5.0184E−02 | 7.4610E−02 | 2.5189E−02 |
| A12 = | −1.6299E−02 | −1.4422E−02 | −1.8952E−02 | −5.5236E−03 |
| A14 = | 3.2686E−03 | 2.7007E−03 | 2.9771E−03 | 7.6755E−04 |
| A16 = | −2.6454E−04 | −3.1762E−04 | −2.8545E−04 | −6.6288E−05 |
| A18 = | −7.2303E−06 | 2.1317E−05 | 1.5365E−05 | 3.2492E−06 |
| A20 = | 1.7611E−06 | −6.2186E−07 | −3.5666E−07 | −6.9030E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.74 | |f/fi|max | 0.85 |
| Fno | 1.61 | (f/f2) + (f/f3) | 1.33 |
| HFOV [deg.] | 40.5 | CTf [mm] | 0.13 |
| Nmax | 1.671 | TL [mm] | 5.15 |
| Nmin | 1.544 | TL/f | 1.37 |
| (V2 + V6)/V1 | 1.14 | TL/ImgH | 1.56 |
| |(V2 − V3)/(V4 − V5)| | 0.43 | SD/TD | 0.94 |
| (V4 + V5 + V6)/V1 | 1.77 | Y11/Y82 | 0.39 |
| ATmax/CTmin | 1.67 | HFOV × EPD/f | 25.14 |
| ATmax/ImgH | 0.14 | TL/ImgH + f/EPD | 3.17 |
| (R11 − R12)/(R11 + R12) | −0.31 | TL^2/(ImgH × EPD) | 3.45 |
| f/R16 | −0.11 | f/fG1 | 0.23 |
| EPD/ΣCT | 0.68 | f/fG2 | 1.13 |
| EPD/BL | 5.46 | f/fG3 | −0.87 |
| TL/EPD | 2.21 | Yc71/f | 0.18 |
| f/EPD | 1.61 | Yc72/f | 0.35 |
| f1/f2 | −2.18 | Yc81/f | 0.72\0.75 |
| f/f2 | 0.50 | Yc82/f | — |

In the image capturing optical assembly according to the 3rd embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 310 through the eighth lens element 380 is stated in the following table, wherein term definitions of the parameters related to each surface of the lens elements are the same as those of the 1st embodiment. Therefore, an explanation in this regard will not be provided again.

| 3rd Embodiment | | | |
|---|---|---|---|
| |f/Rf| + |f/Rr| | |f/R1| + |f/R2| | 4.45 | |f/Rf| + |f/Rr| | |f/R9| + |f/R10| | 3.16 |
| | |f/R3| + |f/R4| | 4.81 | | |f/R11| + |f/R12| | 0.19 |
| | |f/R5| + |f/R6| | 1.88 | | |f/R13| + |f/R14| | 7.28 |
| | |f/R7| + |f/R8| | 0.56 | | |f/R15| + |f/R16| | 0.52 |

In the 3rd embodiment, each of three of the first lens element 310, the second lens element 320, the third lens element 330, the fourth lens element 340, the fifth lens element 350, the sixth lens element 360, the seventh lens element 370, and the eighth lens element 380 has an Abbe number smaller than 24.0; in detail, the three lens elements are the fourth lens element 340, the sixth lens element 360 and the eighth lens element 380.

In the 3rd embodiment, the numbers of the inflection points of object-side surfaces and image-side surfaces of the first lens element 310, the second lens element 320, the third lens element 330, the fourth lens element 340, the fifth lens element 350, the sixth lens element 360, the seventh lens element 370, and the eighth lens element 380 are listed in the table below. Moreover, in the 3rd embodiment, a total number of inflection points on the object-side surfaces and the image-side surfaces of all the lens elements of the image capturing optical assembly is Ninf., the following condition is satisfied: Ninf.=32.

3rd Embodiment - numbers of the inflection points

| | 310 | 320 | 330 | 340 | 350 | 360 | 370 | 380 |
|---|---|---|---|---|---|---|---|---|
| Object-side surface | 1 | 2 | 2 | 0 | 2 | 2 | 3 | 4 |
| Image-side surface | 1 | 0 | 1 | 2 | 2 | 3 | 3 | 4 |

4th Embodiment

Figure 7:
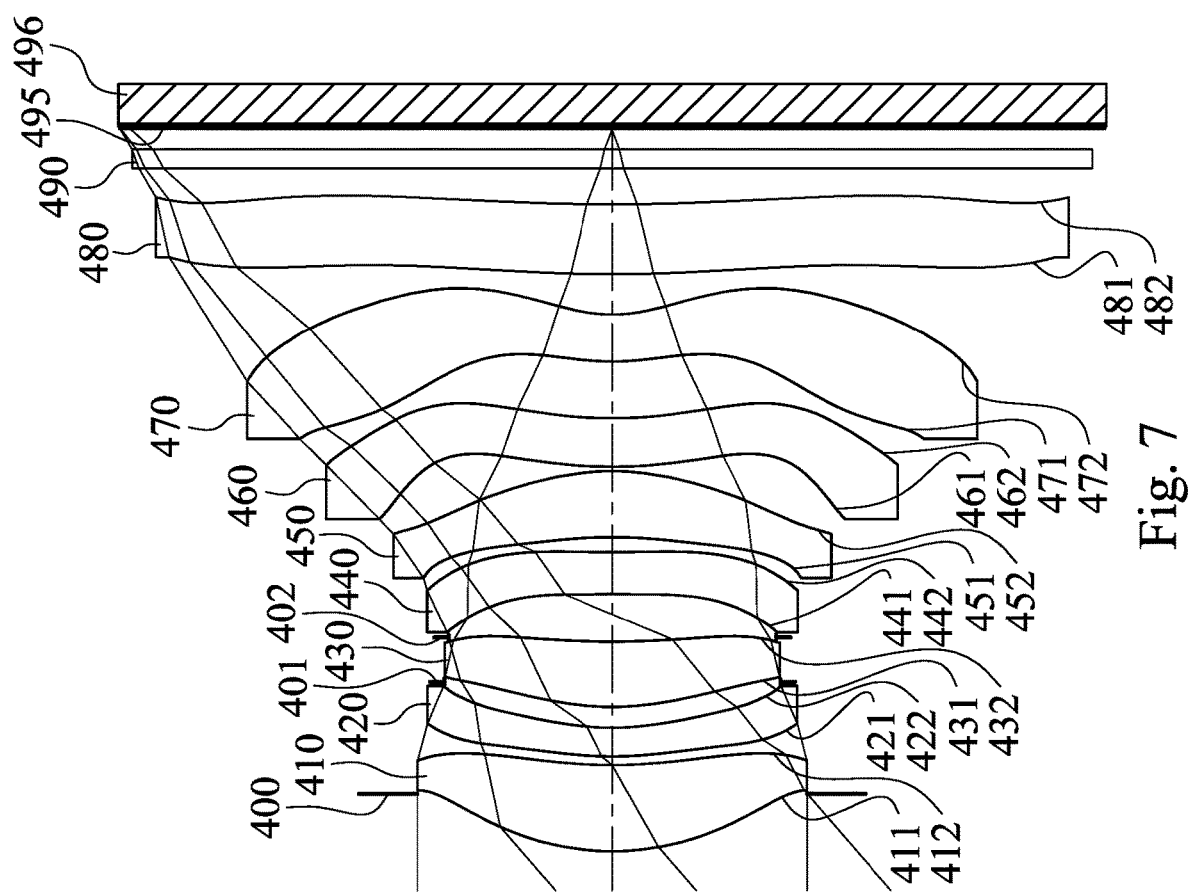
FIG. 7 is a schematic view of an imaging apparatus according to the 4th embodiment of the present disclosure.
Figure 8:
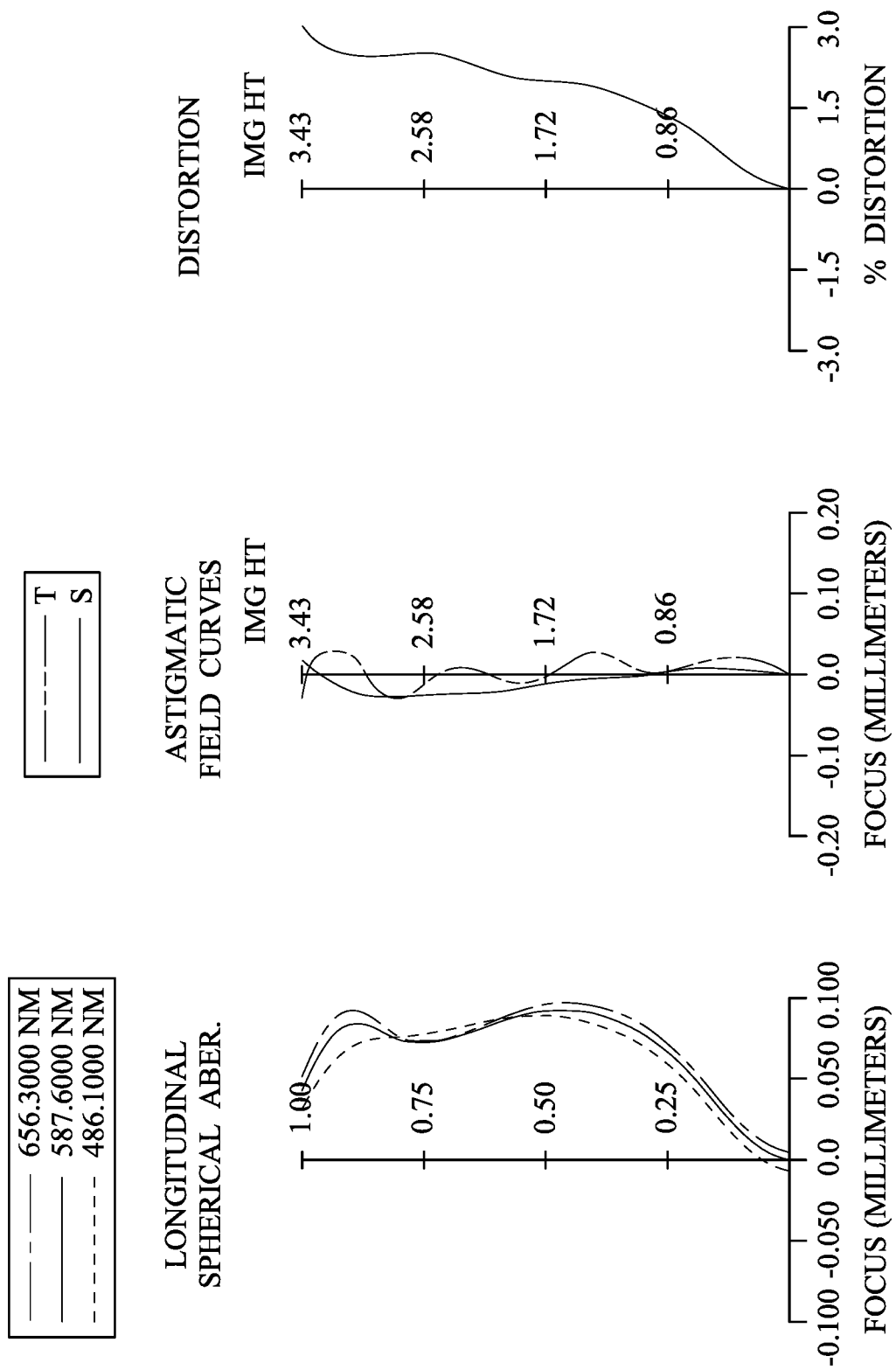
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an image capturing optical assembly (its reference numeral is omitted) and an image sensor 496. The image capturing optical assembly includes, in order from an object side to an image side, an aperture stop 400, a first lens element 410, a second lens element 420, a stop 401, a third lens element 430, a stop 402, a fourth lens element 440, a fifth lens element 450, a sixth lens element 460, a seventh lens element 470, an eighth lens element 480, a filter 490 and an image surface 495, wherein the image sensor 496 is disposed on the image surface 495 of the image capturing optical assembly. The image capturing optical assembly includes eight lens elements (410, 420, 430, 440, 450, 460, 470 and 480) without additional one or more lens elements inserted between the first lens element 410 and the eighth lens element 480, and there is an air gap in a paraxial region between every adjacent lens elements of the image capturing optical assembly. The first lens element 410 and the second lens element 420 belong to a first lens group (its reference numeral is omitted). The third lens element 430, the fourth lens element 440 and the fifth lens element 450 belong to a second lens group (its reference numeral is omitted). The sixth lens element 460, the seventh lens element 470 and the eighth lens element 480 belong to a third lens group (its reference numeral is omitted).

The first lens element 410 with positive refractive power has an object-side surface 411 being convex and an image-side surface 412 being concave. The first lens element 410 is made of a plastic material, and has the object-side surface 411 and the image-side surface 412 being both aspheric. Furthermore, each of the object-side surface 411 and the image-side surface 412 of the first lens element 410 includes at least one inflection point.

The second lens element 420 with negative refractive power has an object-side surface 421 being convex and an image-side surface 422 being concave. The second lens element 420 is made of a plastic material, and has the object-side surface 421 and the image-side surface 422 being both aspheric. Furthermore, the object-side surface 421 of the second lens element 420 includes at least one inflection point.

The third lens element 430 with positive refractive power has an object-side surface 431 being convex and an image-side surface 432 being concave. The third lens element 430 is made of a plastic material, and has the object-side surface 431 and the image-side surface 432 being both aspheric. Furthermore, each of the object-side surface 431 and the image-side surface 432 of the third lens element 430 includes at least one inflection point.

The fourth lens element 440 with negative refractive power has an object-side surface 441 being concave and an image-side surface 442 being concave. The fourth lens element 440 is made of a plastic material, and has the object-side surface 441 and the image-side surface 442 being both aspheric. Furthermore, the image-side surface 442 of the fourth lens element 440 includes at least one inflection point.

The fifth lens element 450 with positive refractive power has an object-side surface 451 being concave and an image-side surface 452 being convex. The fifth lens element 450 is made of a plastic material, and has the object-side surface 451 and the image-side surface 452 being both aspheric. Furthermore, each of the object-side surface 451 and the image-side surface 452 of the fifth lens element 450 includes at least one inflection point.

The sixth lens element 460 with negative refractive power has an object-side surface 461 being convex and an image-side surface 462 being concave. The sixth lens element 460 is made of a plastic material, and has the object-side surface 461 and the image-side surface 462 being both aspheric. Furthermore, each of the object-side surface 461 and the image-side surface 462 of the sixth lens element 460 includes at least one inflection point.

The seventh lens element 470 with negative refractive power has an object-side surface 471 being convex and an image-side surface 472 being concave. The seventh lens element 470 is made of a plastic material, and has the object-side surface 471 and the image-side surface 472 being both aspheric. Furthermore, each of the object-side surface 471 and the image-side surface 472 of the seventh lens element 470 includes at least one inflection point and at least one critical point.

The eighth lens element 480 with positive refractive power has an object-side surface 481 being convex and an image-side surface 482 being concave. The eighth lens element 480 is made of a plastic material, and has the object-side surface 481 and the image-side surface 482 being both aspheric. Furthermore, each of the object-side surface 481 and the image-side surface 482 of the eighth lens element 480 includes at least one inflection point and at least one critical point.

The filter 490 is made of a glass material and located between the eighth lens element 480 and the image surface 495, and will not affect the focal length of the image capturing optical assembly.

The detailed optical data of the 4th embodiment are shown in Table 7 and the aspheric surface data are shown in Table 8 below.

TABLE 7

4th Embodiment
f = 3.76 mm, Fno = 1.37, HFOV = 41.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.402 | | | | |
| 2 | Lens 1 | 1.834 | ASP | 0.600 | Plastic | 1.545 | 56.0 | 6.58 |
| 3 | | 3.324 | ASP | 0.061 | | | | |

TABLE 7-continued

4th Embodiment
f = 3.76 mm, Fno = 1.37, HFOV = 41.0 deg.

| Surface # | | Curvature Radius | | Thickness | Material | Index | Abbe # | Focal Length |
|---|---|---|---|---|---|---|---|---|
| 4 | Lens 2 | 2.594 | ASP | 0.200 | Plastic | 1.669 | 19.5 | -12.27 |
| 5 | | 1.910 | ASP | 0.318 | | | | |
| 6 | Stop | Plano | | -0.173 | | | | |
| 7 | Lens 3 | 2.079 | ASP | 0.455 | Plastic | 1.544 | 56.0 | 5.53 |
| 8 | | 6.201 | ASP | 0.027 | | | | |
| 9 | Stop | Plano | | 0.306 | | | | |
| 10 | Lens 4 | -184.747 | ASP | 0.293 | Plastic | 1.669 | 19.5 | -14.23 |
| 11 | | 10.040 | ASP | 0.103 | | | | |
| 12 | Lens 5 | -4.300 | ASP | 0.461 | Plastic | 1.544 | 56.0 | 4.76 |
| 13 | | -1.676 | ASP | 0.030 | | | | |
| 14 | Lens 6 | 4.442 | ASP | 0.337 | Plastic | 1.669 | 19.5 | -22.89 |
| 15 | | 3.339 | ASP | 0.395 | | | | |
| 16 | Lens 7 | 1.656 | ASP | 0.330 | Plastic | 1.544 | 56.0 | -5.70 |
| 17 | | 1.004 | ASP | 0.282 | | | | |
| 18 | Lens 8 | 9.927 | ASP | 0.486 | Plastic | 1.559 | 40.4 | 49.07 |
| 19 | | 15.290 | ASP | 0.250 | | | | |
| 20 | Filter | Plano | | 0.130 | Glass | 1.517 | 64.2 | — |
| 21 | | Plano | | 0.162 | | | | |
| 22 | Image | Plano | | — | | | | |

Reference wavelength is 587.6 nm (d-line).
Effective radius of the stop on Surface 6 is 1.170 mm.
Effective radius of the stop on Surface 9 is 1.140 mm.

TABLE 8

Aspheric Coefficients

| Surface # | 2 | 3 | 4 | 5 | 7 | 8 |
|---|---|---|---|---|---|---|
| k = | -1.4994E-01 | -3.0847E-01 | -3.2415E+01 | -1.1928E+01 | -8.6888E+00 | 1.1228E+01 |
| A4 = | -3.9379E-03 | -4.7439E-02 | 2.0951E-02 | -2.0940E-03 | 4.7306E-02 | -2.3296E-02 |
| A6 = | 7.6028E-03 | -7.1572E-02 | -1.8634E-01 | -7.6418E-02 | -1.0950E-01 | -2.3006E-02 |
| A8 = | -2.8921E-02 | 7.7995E-02 | 3.0281E-01 | 1.8180E-01 | 1.1636E-01 | -1.0079E-02 |
| A10 = | 3.1513E-02 | -3.5537E-02 | -2.1775E-01 | -1.3011E-01 | -8.9436E-02 | -1.3835E-02 |
| A12 = | -2.1756E-02 | 5.3177E-03 | 8.7942E-02 | 3.6695E-02 | 1.9529E-02 | 1.0141E-02 |
| A14 = | 4.5414E-03 | | -1.5308E-02 | 1.2825E-03 | 7.3562E-03 | 1.7260E-05 |

| Surface # | 10 | 11 | 12 | 13 | 14 | 15 |
|---|---|---|---|---|---|---|
| k = | 9.0000E+01 | 5.4558E+01 | 9.4628E+00 | -1.5312E+00 | 8.2651E-01 | -8.7226E+00 |
| A4 = | -1.8393E-01 | -3.3866E-01 | -2.5750E-01 | 1.5833E-01 | 2.2654E-01 | 7.5153E-02 |
| A6 = | 8.6474E-02 | 9.4505E-01 | 1.4888E+00 | -2.9202E-01 | -6.1992E-01 | -1.9676E-01 |
| A8 = | -2.3306E-01 | -2.0265E+00 | -3.0306E+00 | 3.9288E-01 | 7.3087E-01 | 1.4801E-01 |
| A10 = | 3.0473E-01 | 2.2804E+00 | 3.2054E+00 | -3.5333E-01 | -5.9394E-01 | -7.0417E-02 |
| A12 = | -1.4098E-01 | -1.3714E+00 | -1.8605E+00 | 1.8774E-01 | 3.2190E-01 | 2.0531E-02 |
| A14 = | -7.1273E-03 | 4.1304E-01 | 5.5809E-01 | -5.1114E-02 | -1.1329E-01 | -3.1960E-03 |
| A16 = | 1.5038E-02 | -4.8349E-02 | -6.7236E-02 | 5.4410E-03 | 2.3358E-02 | 2.0038E-04 |
| A18 = | | -4.8914E-05 | -6.4327E-05 | | -2.0926E-03 | |
| A20 = | | | | | | |

| Surface # | 16 | 17 | 18 | 19 |
|---|---|---|---|---|
| k = | -8.0802E+00 | -4.4752E+00 | -1.4265E+01 | -2.3285E+00 |
| A4 = | -3.7733E-01 | -2.4447E-01 | -1.1097E-02 | -3.4078E-03 |
| A6 = | 2.6815E-01 | 1.8180E-01 | 7.7766E-04 | -3.2668E-04 |
| A8 = | -2.0928E-01 | -1.1536E-01 | 1.4530E-05 | 7.4035E-06 |
| A10 = | 1.3966E-01 | 5.4032E-02 | 3.7315E-07 | 1.6660E-06 |
| A12 = | -5.9213E-02 | -1.6843E-02 | -7.4913E-08 | 1.7214E-07 |
| A14 = | 1.5327E-02 | 3.3677E-03 | -4.5860E-09 | 1.2438E-08 |
| A16 = | -2.3800E-03 | -4.1600E-04 | 2.5602E-10 | -7.0867E-10 |
| A18 = | 2.0521E-04 | 2.9005E-05 | 9.6774E-12 | -4.5098E-11 |
| A20 = | -7.6115E-06 | -8.7663E-07 | -2.1212E-12 | -3.2136E-12 |

In the 4th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 4th embodiment, so an explanation in this regard will not be provided again.

Moreover, these parameters can be calculated from Table 7 and Table 8 as the following values and satisfy the following conditions:

4th Embodiment

| 4th Embodiment | | | |
|---|---|---|---|
| f [mm] | 3.76 | \|f/f\|max | 0.79 |
| Fno | 1.37 | (f/f2) + (f/f3) | 0.37 |
| HFOV [deg.] | 41.0 | CTf [mm] | 0.13 |
| Nmax | 1.669 | TL [mm] | 5.05 |
| Nmin | 1.544 | TL/f | 1.34 |
| (V2 + V6)/V1 | 0.70 | TL/ImgH | 1.47 |
| \|(V2 − V3)/(V4 − V5)\| | 1.00 | SD/TD | 0.91 |
| (V4 + V5 + V6)/V1 | 1.70 | Y11/Y82 | 0.43 |
| ATmax/CTmin | 1.98 | HFOV × EPD/f | 29.92 |
| ATmax/ImgH | 0.11 | TL/ImgH + f/EPD | 2.84 |
| (R11 − R12)/(R11 + R12) | 0.14 | TL^2/(ImgH × EPD) | 2.71 |
| f/R16 | 0.25 | f/fG1 | 0.33 |
| EPD/ΣCT | 0.87 | f/fG2 | 1.06 |
| EPD/BL | 5.07 | f/fG3 | −0.77 |
| TL/EPD | 1.84 | Yc71/f | 0.17 |
| f/EPD | 1.37 | Yc72/f | 0.28 |
| f1/f2 | −0.54 | Yc81/f | 0.45\0.66 |
| f/f2 | −0.31 | Yc82/f | 0.49\0.76 |

In the image capturing optical assembly according to the 4th embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 410 through the eighth lens element 480 is stated in the following table, wherein term definitions of the parameters related to each surface of the lens elements are the same as those of the 1st embodiment. Therefore, an explanation in this regard will not be provided again.

| 4th Embodiment | | | | |
|---|---|---|---|---|
| \|f/Rf\| + \|f/Rr\| | \|f/R1\| + \|f/R2\| | 3.18 | \|f/Rf\| + \|f/Rr\| \|f/R9\| + \|f/R10\| | 3.12 |
| | \|f/R3\| + \|f/R4\| | 3.42 | \|f/R11\| + \|f/R12\| | 1.97 |
| | \|f/R5\| + \|f/R6\| | 2.42 | \|f/R13\| + \|f/R14\| | 6.02 |
| | \|f/R7\| + \|f/R8\| | 0.40 | \|f/R15\| + \|f/R16\| | 0.63 |

In the 4th embodiment, each of three of the first lens element 410, the second lens element 420, the third lens element 430, the fourth lens element 440, the fifth lens element 450, the sixth lens element 460, the seventh lens element 470, and the eighth lens element 480 has an Abbe number smaller than 24.0, 23.0 and 20; in detail, the three lens elements are the second lens element 420, the fourth lens element 440, and the sixth lens element 460.

In the 4th embodiment, the numbers of the inflection points of object-side surfaces and image-side surfaces of the first lens element 410, the second lens element 420, the third lens element 430, the fourth lens element 440, the fifth lens element 450, the sixth lens element 460, the seventh lens element 470, and the eighth lens element 480 are listed in the table below. Moreover, in the 4th embodiment, a total number of inflection points on the object-side surfaces and the image-side surfaces of all the lens elements of the image capturing optical assembly is Ninf., the following condition is satisfied: Ninf.=24.

| 4th Embodiment - numbers of the inflection points | | | | | | | | |
|---|---|---|---|---|---|---|---|---|
| | 410 | 420 | 430 | 440 | 450 | 460 | 470 | 480 |
| Object-side surface | 1 | 2 | 2 | 0 | 2 | 2 | 3 | 2 |
| Image-side surface | 1 | 0 | 1 | 2 | 2 | 1 | 1 | 2 |

5th Embodiment

Figure 9:
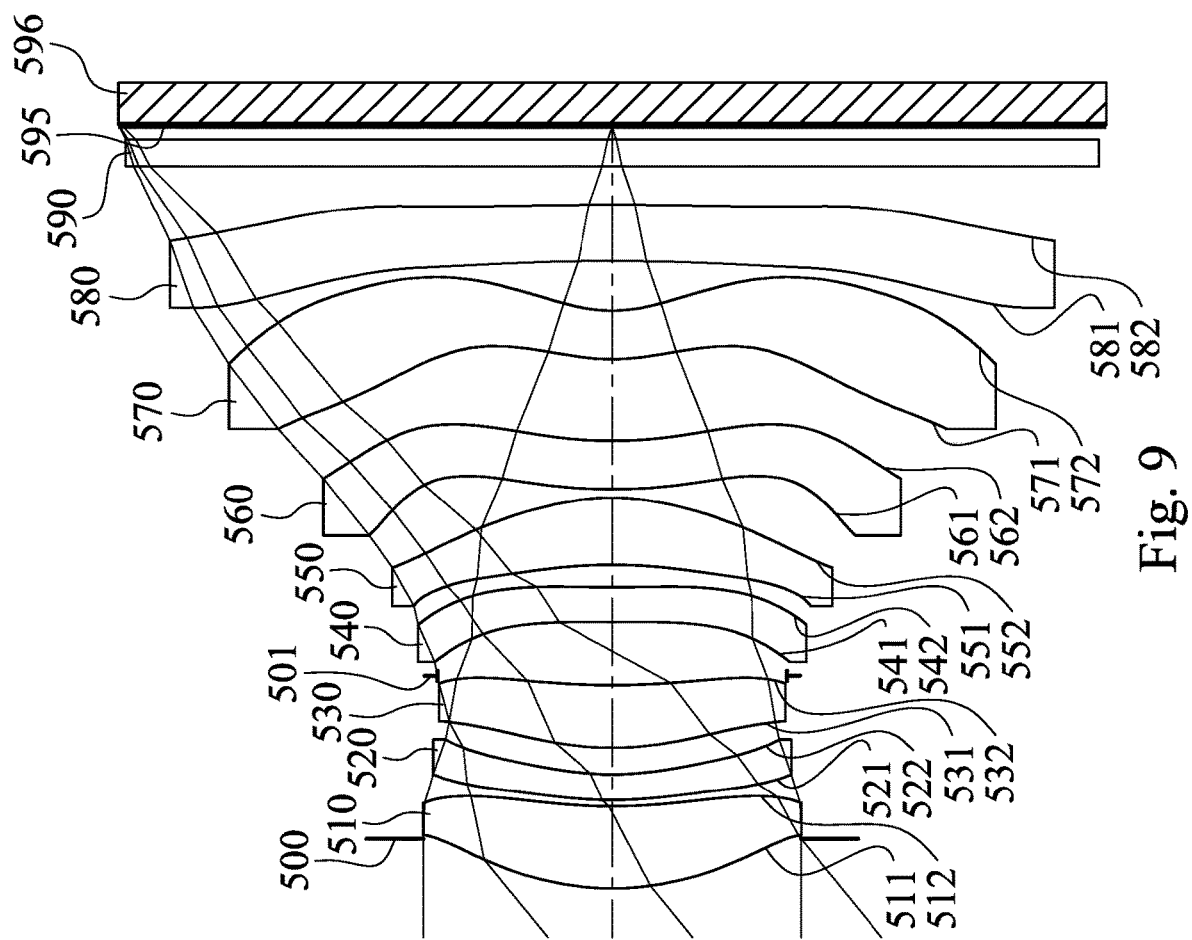
FIG. 9 is a schematic view of an imaging apparatus according to the 5th embodiment of the present disclosure.
Figure 10:
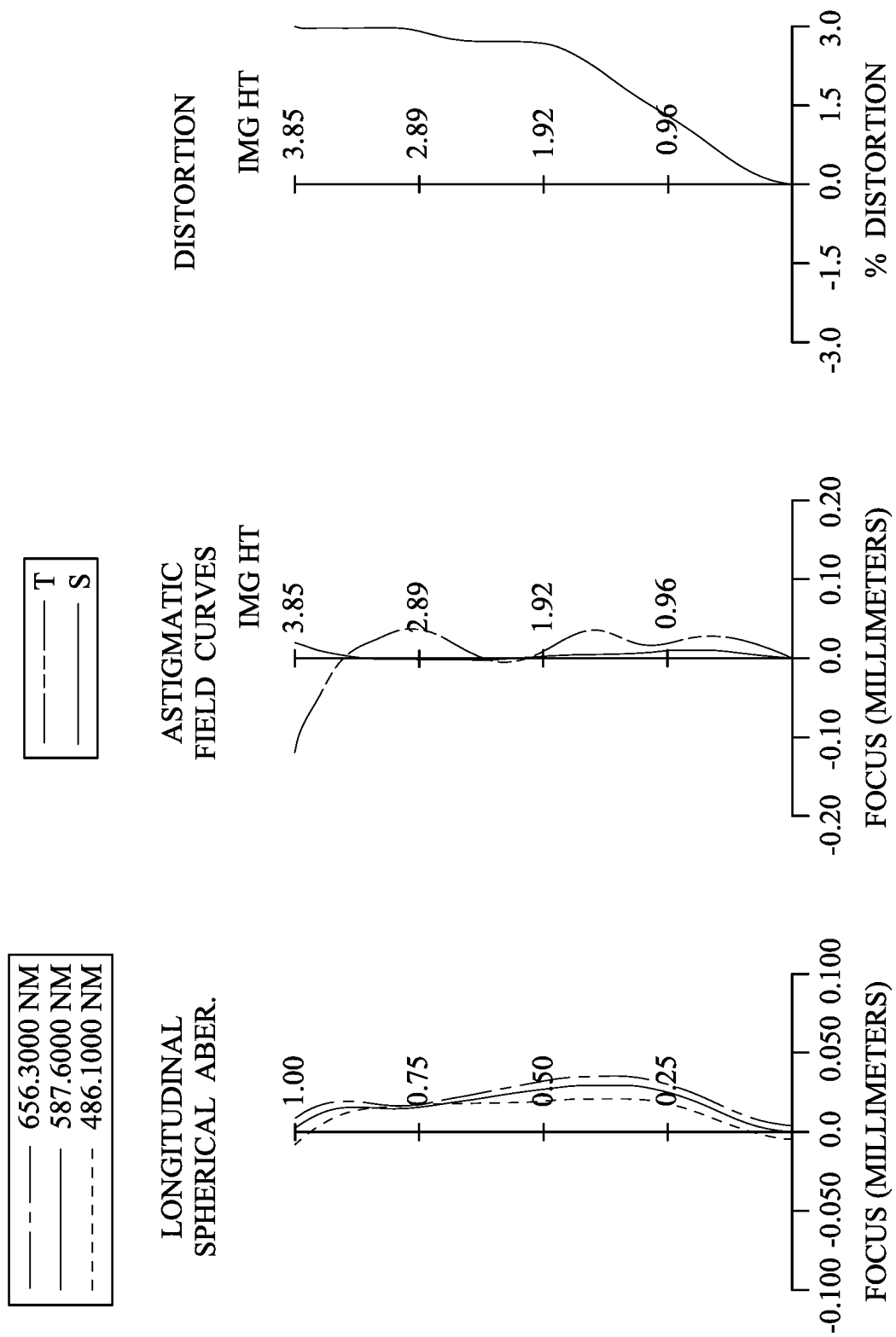
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an image capturing optical assembly (its reference numeral is omitted) and an image sensor 596. The image capturing optical assembly includes, in order from an object side to an image side, an aperture stop 500, a first lens element 510, a second lens element 520, a third lens element 530, a stop 501, a fourth lens element 540, a fifth lens element 550, a sixth lens element 560, a seventh lens element 570, an eighth lens element 580, a filter 590 and an image surface 595, wherein the image sensor 596 is disposed on the image surface 595 of the image capturing optical assembly. The image capturing optical assembly includes eight lens elements (510, 520, 530, 540, 550, 560, 570 and 580) without additional one or more lens elements inserted between the first lens element 510 and the eighth lens element 580, and there is an air gap in a paraxial region between every adjacent lens elements of the image capturing optical assembly. The first lens element 510 and the second lens element 520 belong to a first lens group (its reference numeral is omitted). The third lens element 530, the fourth lens element 540 and the fifth lens element 550 belong to a second lens group (its reference numeral is omitted). The sixth lens element 560, the seventh lens element 570 and the eighth lens element 580 belong to a third lens group (its reference numeral is omitted).

The first lens element 510 with positive refractive power has an object-side surface 511 being convex and an image-side surface 512 being concave. The first lens element 510 is made of a plastic material, and has the object-side surface 511 and the image-side surface 512 being both aspheric. Furthermore, each of the object-side surface 511 and the image-side surface 512 of the first lens element 510 includes at least one inflection point.

The second lens element 520 with negative refractive power has an object-side surface 521 being convex and an image-side surface 522 being concave. The second lens element 520 is made of a plastic material, and has the object-side surface 521 and the image-side surface 522 being both aspheric.

The third lens element 530 with positive refractive power has an object-side surface 531 being convex and an image-side surface 532 being concave. The third lens element 530 is made of a plastic material, and has the object-side surface 531 and the image-side surface 532 being both aspheric. Furthermore, each of the object-side surface 531 and the image-side surface 532 of the third lens element 530 includes at least one inflection point.

The fourth lens element 540 with negative refractive power has an object-side surface 541 being convex and an image-side surface 542 being concave. The fourth lens element 540 is made of a plastic material, and has the object-side surface 541 and the image-side surface 542 being both aspheric. Furthermore, each of the object-side surface 541 and the image-side surface 542 of the fourth lens element 540 includes at least one inflection point.

The fifth lens element 550 with positive refractive power has an object-side surface 551 being concave and an image-side surface 552 being convex. The fifth lens element 550 is made of a plastic material, and has the object-side surface 551 and the image-side surface 552 being both aspheric.

Furthermore, the image-side surface 552 of the fifth lens element 550 includes at least one inflection point.

The sixth lens element 560 with negative refractive power has an object-side surface 561 being convex and an image-side surface 562 being concave. The sixth lens element 560 is made of a plastic material, and has the object-side surface 561 and the image-side surface 562 being both aspheric. Furthermore, each of the object-side surface 561 and the image-side surface 562 of the sixth lens element 560 includes at least one inflection point.

The seventh lens element 570 with negative refractive power has an object-side surface 571 being convex and an image-side surface 572 being concave. The seventh lens element 570 is made of a plastic material, and has the object-side surface 571 and the image-side surface 572 being both aspheric. Furthermore, each of the object-side surface 571 and the image-side surface 572 of the seventh lens element 570 includes at least one inflection point and at least one critical point.

The eighth lens element 580 with negative refractive power has an object-side surface 581 being concave and an image-side surface 582 being convex. The eighth lens element 580 is made of a plastic material, and has the object-side surface 581 and the image-side surface 582 being both aspheric. Furthermore, each of the object-side surface 581 and the image-side surface 582 of the eighth lens element 580 includes at least one inflection point, and the image-side surface 582 of the eighth lens element 580 includes at least one critical point.

The filter 590 is made of a glass material and located between the eighth lens element 580 and the image surface 595, and will not affect the focal length of the image capturing optical assembly.

The detailed optical data of the 5th embodiment are shown in Table 9 and the aspheric surface data are shown in Table 10 below.

TABLE 9

5th Embodiment
f = 4.56 mm, Fno = 1.55, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.387 | | | | |
| 2 | Lens 1 | 2.264 | ASP | 0.642 | Plastic | 1.535 | 55.8 | 8.19 |
| 3 | | 4.221 | ASP | 0.048 | | | | |
| 4 | Lens 2 | 3.153 | ASP | 0.202 | Plastic | 1.671 | 19.5 | −15.15 |
| 5 | | 2.345 | ASP | 0.208 | | | | |
| 6 | Lens 3 | 2.440 | ASP | 0.488 | Plastic | 1.544 | 56.0 | 7.18 |
| 7 | | 6.044 | ASP | 0.073 | | | | |
| 8 | Stop | Plano | | 0.420 | | | | |
| 9 | Lens 4 | 528.763 | ASP | 0.272 | Plastic | 1.671 | 19.5 | −18.85 |
| 10 | | 12.347 | ASP | 0.172 | | | | |
| 11 | Lens 5 | −5.075 | ASP | 0.526 | Plastic | 1.544 | 56.0 | 5.24 |
| 12 | | −1.891 | ASP | 0.069 | | | | |
| 13 | Lens 6 | 5.629 | ASP | 0.379 | Plastic | 1.671 | 19.5 | −17.91 |
| 14 | | 3.729 | ASP | 0.634 | | | | |
| 15 | Lens 7 | 1.646 | ASP | 0.378 | Plastic | 1.530 | 55.8 | −8.36 |
| 16 | | 1.105 | ASP | 0.387 | | | | |
| 17 | Lens 8 | −59.623 | ASP | 0.442 | Plastic | 1.639 | 23.3 | −282.30 |
| 18 | | −89.336 | ASP | 0.299 | | | | |
| 19 | Filter | Plano | | 0.210 | Glass | 1.517 | 64.2 | — |
| 20 | | Plano | | 0.113 | | | | |
| 21 | Image | Plano | | — | | | | |

Reference wavelength is 587.6 nm (d-line).
Effective radius of the stop on Surface 8 is 1.362 mm.

TABLE 10

Aspheric Coefficients

| Surface # | 2 | 3 | 4 | 5 | 6 | 7 |
|---|---|---|---|---|---|---|
| k = | −1.7992E−01 | −8.7259E−01 | −2.6564E+01 | −1.2345E+01 | −9.2403E+00 | 6.9357E+00 |
| A4 = | −2.3168E−03 | −2.9017E−02 | 1.1658E−02 | 5.5408E−03 | 3.1431E−02 | −9.7482E−03 |
| A6 = | 2.0819E−03 | −3.0175E−02 | −7.5949E−02 | −3.8770E−02 | −5.2698E−02 | −1.9227E−02 |
| A8 = | −8.8122E−03 | 2.2261E−02 | 8.7431E−02 | 5.0172E−02 | 2.6249E−02 | −5.5651E−03 |
| A10 = | 6.1312E−03 | −7.2593E−03 | −4.3674E−02 | −1.8363E−02 | −9.2839E−03 | 5.9304E−03 |
| A12 = | −3.0725E−03 | 6.4481E−04 | 1.2358E−02 | 8.6512E−04 | 3.8706E−04 | −2.1474E−03 |
| A14 = | 4.2969E−04 | | −1.6039E−03 | 8.9868E−04 | 7.4904E−04 | 1.7616E−04 |

| Surface # | 9 | 10 | 11 | 12 | 13 | 14 |
|---|---|---|---|---|---|---|
| k = | −2.1585E+01 | 5.3417E+01 | 9.3168E+00 | −1.4348E+00 | 1.5297E+00 | −9.7262E+00 |
| A4 = | −1.2489E−01 | −1.9848E−01 | −1.6309E−01 | 7.1684E−02 | 1.3332E−01 | 4.3111E−02 |
| A6 = | 1.5744E−01 | 3.8749E−01 | 5.3201E−01 | −8.7810E−02 | −2.5453E−01 | −8.0934E−02 |
| A8 = | −3.1779E−01 | −5.8212E−01 | −6.7838E−01 | 8.0966E−02 | 2.1012E−01 | 4.2532E−02 |
| A10 = | 3.0813E−01 | 4.5895E−01 | 4.6600E−01 | −4.4540E−02 | −1.1950E−01 | −1.4166E−02 |
| A12 = | −1.4703E−01 | −1.9323E−01 | −1.7727E−01 | 1.3155E−02 | 4.5363E−02 | 2.8939E−03 |
| A14 = | 3.2643E−02 | 4.0760E−02 | 3.3965E−02 | −1.8009E−03 | −1.1179E−02 | −3.1529E−04 |

TABLE 10-continued

| Aspheric Coefficients | | | | | | |
|---|---|---|---|---|---|---|
| A16 = | −2.5225E−03 | −3.3385E−03 | −2.1823E−03 | 7.8936E−05 | 1.6143E−03 | 1.3849E−05 |
| A18 = | | 2.7057E−07 | −9.0546E−05 | | −1.0128E−04 | |
| A20 = | | | | | | |

| Surface # | 15 | 16 | 17 | 18 |
|---|---|---|---|---|
| k = | −6.3267E+00 | −4.4864E+00 | 9.0000E+01 | −9.0000E+01 |
| A4 = | −1.8181E−01 | −1.2114E−01 | −5.9752E−02 | −2.7501E−02 |
| A6 = | 9.4869E−02 | 5.7826E−02 | 6.7728E−02 | 3.2251E−02 |
| A8 = | −5.7436E−02 | −2.2330E−02 | −3.5115E−02 | −1.4585E−02 |
| A10 = | 2.6763E−02 | 5.8772E−03 | 1.0019E−02 | 3.4594E−03 |
| A12 = | −7.6649E−03 | −9.4439E−04 | −1.7284E−03 | −4.9123E−04 |
| A14 = | 1.3306E−03 | 8.5750E−05 | 1.8564E−04 | 4.3627E−05 |
| A16 = | −1.3776E−04 | −3.7276E−06 | −1.2162E−05 | −2.3901E−06 |
| A18 = | 7.8482E−06 | 2.6386E−08 | 4.4548E−07 | 7.4254E−08 |
| A20 = | −1.8964E−07 | 2.1119E−09 | −7.0015E−09 | −1.0048E−09 |

In the 5th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 5th embodiment, so an explanation in this regard will not be provided again.

Moreover, these parameters can be calculated from Table 9 and Table as the following values and satisfy the following conditions:

| 5th Embodiment | | | |
|---|---|---|---|
| f [mm] | 4.56 | \|f/fi\|max | 0.87 |
| Fno | 1.55 | (f/f2) + (f/f3) | 0.33 |
| HFOV [deg.] | 39.2 | CTf [mm] | 0.21 |
| Nmax | 1.671 | TL [mm] | 5.96 |
| Nmin | 1.530 | TL/f | 1.31 |
| (V2 + V6)/V1 | 0.70 | TL/ImgH | 1.55 |
| \|(V2 − V3)/(V4 − V5)\| | 1.00 | SD/TD | 0.93 |
| (V4 + V5 + V6)/V1 | 1.70 | Y11/Y82 | 0.43 |
| ATmax/CTmin | 3.14 | HFOV × EPD/f | 25.30 |
| ATmax/ImgH | 0.16 | TL/ImgH + f/EPD | 3.10 |
| (R11 − R12)/(R11 + R12) | 0.20 | TL^2/(ImgH × EPD) | 3.14 |
| f/R16 | −0.05 | f/fG1 | 0.31 |
| EPD/ΣCT | 0.88 | f/fG2 | 1.11 |
| EPD/BL | 4.73 | f/fG3 | −0.85 |
| TL/EPD | 2.02 | Yc71/f | 0.20 |
| f/EPD | 1.55 | Yc72/f | 0.30 |
| f1/f2 | −0.54 | Yc81/f | — |
| f/f2 | −0.30 | Yc82/f | 0.26\0.36 |

In the image capturing optical assembly according to the 5th embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 510 through the eighth lens element 580 is stated in the following table, wherein term definitions of the parameters related to each surface of the lens elements are the same as those of the 1st embodiment. Therefore, an explanation in this regard will not be provided again.

| 5th Embodiment | | | |
|---|---|---|---|
| \|f/Rf\| + \|f/Rr\| | \|f/R1\| + \|f/R2\| | 3.10 | |
| | \|f/R3\| + \|f/R4\| | 3.39 | |
| \|f/Rf\| + \|f/Rr\| | \|f/R9\| + \|f/R10\| | 3.31 | |
| | \|f/R11\| + \|f/R12\| | 2.04 | |
| | \|f/R5\| + \|f/R6\| | 2.63 | |
| | \|f/R7\| + \|f/R8\| | 0.38 | |
| | \|f/R13\| + \|f/R14\| | 6.90 | |
| | \|f/R15\| + \|f/R16\| | 0.13 | |

In the 5th embodiment, each of four of the first lens element 510, the second lens element 520, the third lens element 530, the fourth lens element 540, the fifth lens element 550, the sixth lens element 560, the seventh lens element 570, and the eighth lens element 580 has an Abbe number smaller than 24.0; in detail, the four lens elements are the second lens element 520, the fourth lens element 540, the sixth lens element 560, and the eighth lens element 580, wherein each of the Abbe numbers of the second lens element 520, the fourth lens element 540 and the sixth lens element 560 is smaller than 23.0 and 20.

In the 5th embodiment, the numbers of the inflection points of object-side surfaces and image-side surfaces of the first lens element 510, the second lens element 520, the third lens element 530, the fourth lens element 540, the fifth lens element 550, the sixth lens element 560, the seventh lens element 570, and the eighth lens element 580 are listed in the table below. Moreover, in the 5th embodiment, a total number of inflection points on the object-side surfaces and the image-side surfaces of all the lens elements of the image capturing optical assembly is Ninf., the following condition is satisfied: Ninf.=23.

| 5th Embodiment - numbers of the inflection points | | | | | | | | |
|---|---|---|---|---|---|---|---|---|
| | 510 | 520 | 530 | 540 | 550 | 560 | 570 | 580 |
| Object-side surface | 1 | 0 | 2 | 1 | 0 | 2 | 3 | 3 |
| Image-side surface | 1 | 0 | 1 | 1 | 1 | 3 | 1 | 3 |

6th Embodiment

Figure 11:
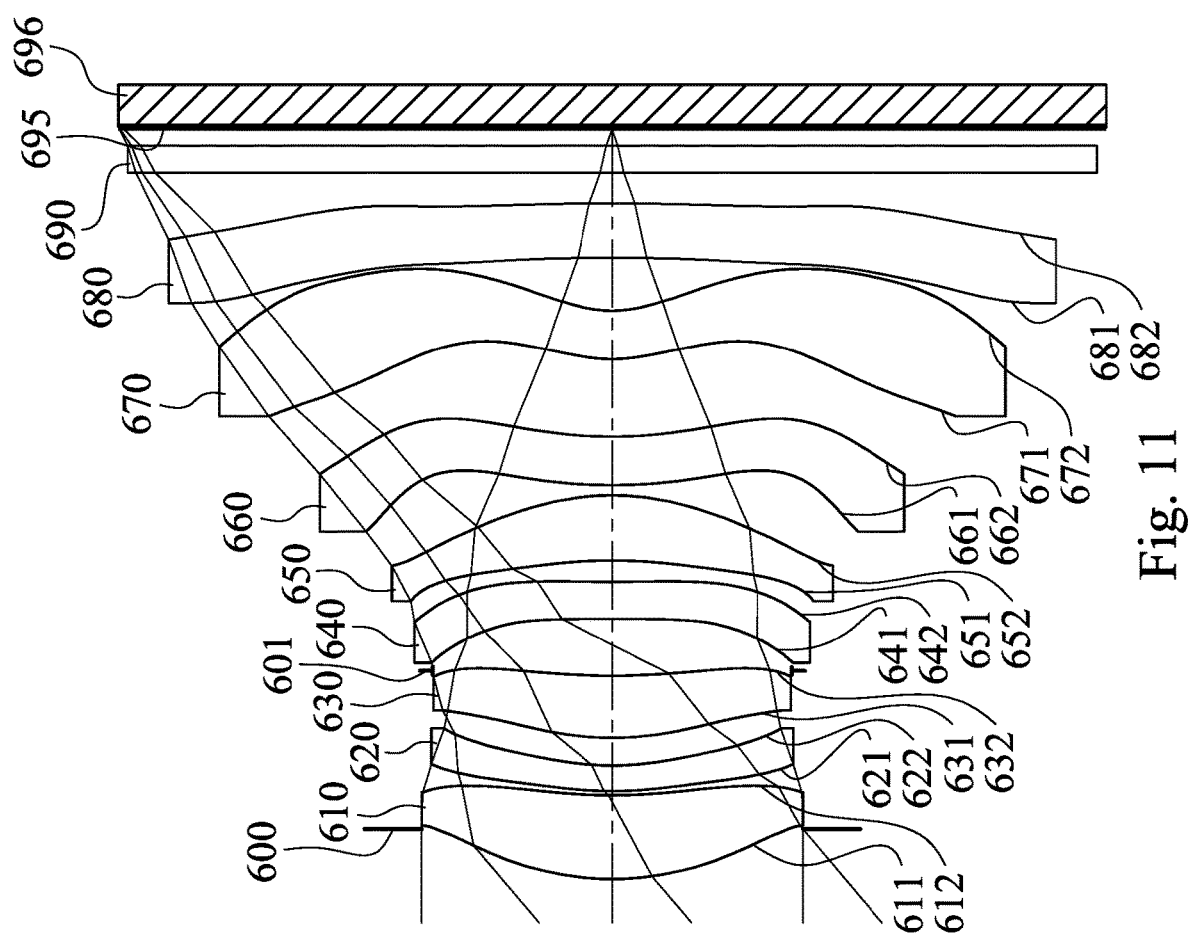
FIG. 11 is a schematic view of an imaging apparatus according to the 6th embodiment of the present disclosure.
Figure 12:
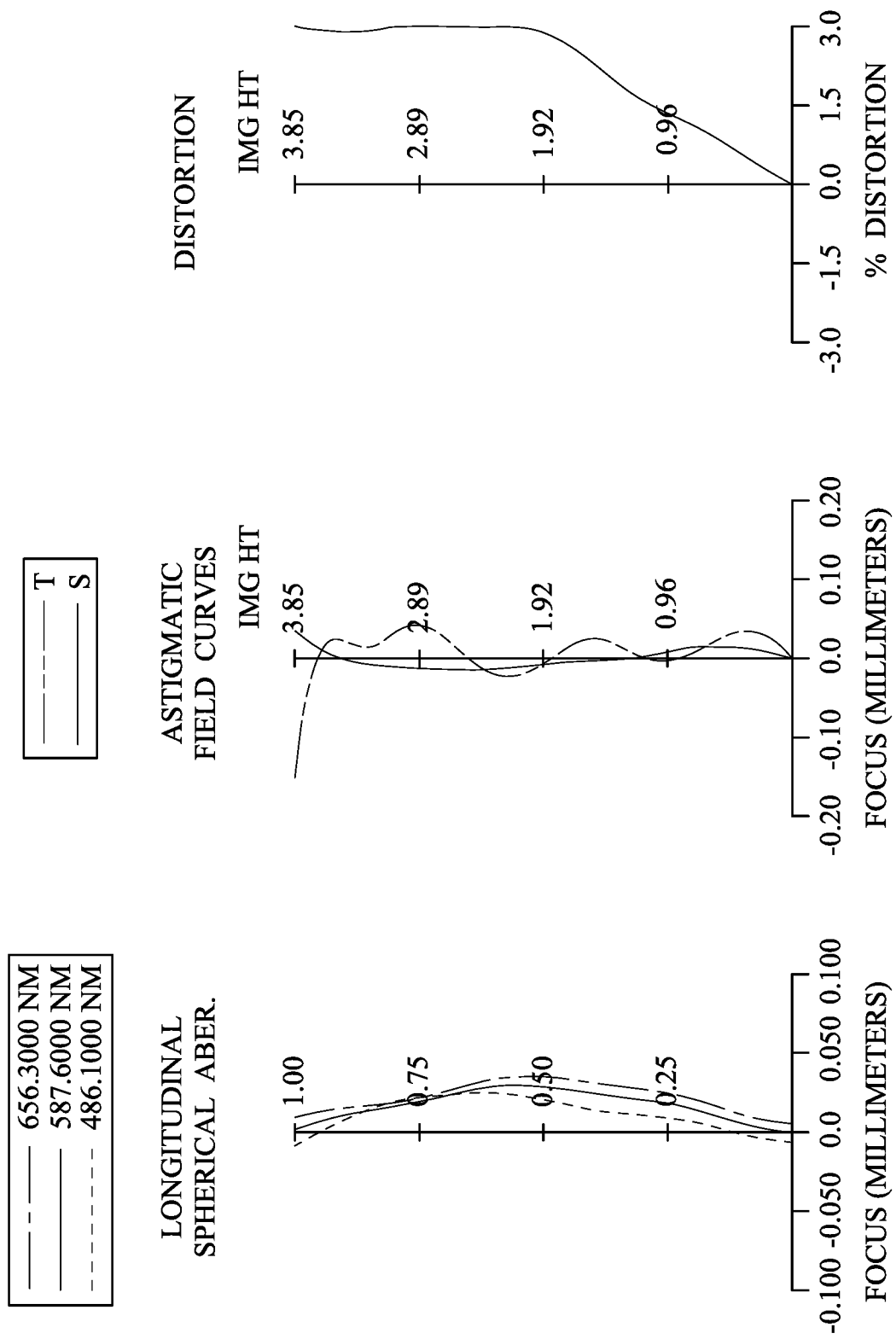
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an image capturing optical assembly (its reference numeral is omitted) and an image sensor 696. The image capturing optical assembly includes, in order from an object side to an image side, an aperture stop 600, a first lens element 610, a second lens element 620, a third lens element 630, a stop 601, a fourth lens element 640, a fifth lens element 650, a sixth lens element 660, a seventh lens element 670, an eighth lens element 680, a filter 690 and an image surface 695, wherein the image sensor 696 is disposed on the image surface 695 of the image capturing optical assembly. The image capturing optical assembly includes eight lens elements (610, 620, 630, 640, 650, 660, 670 and 680) without additional one or more lens elements inserted between the first lens element 610 and the eighth lens element 680, and there is an air gap in a paraxial region between every adjacent lens elements of the image capturing optical assembly. The first lens element 610 and the second lens element 620 belong to a first lens group (its reference numeral is omitted). The third lens element 630, the fourth lens element 640 and the fifth lens element 650 belong to a second lens group (its reference numeral is omitted). The sixth lens element 660, the seventh lens element 670 and the eighth lens element 680 belong to a third lens group (its reference numeral is omitted).

The first lens element 610 with positive refractive power has an object-side surface 611 being convex and an image-side surface 612 being concave. The first lens element 610 is made of a plastic material, and has the object-side surface 611 and the image-side surface 612 being both aspheric. Furthermore, each of the object-side surface 611 and the image-side surface 612 of the first lens element 610 includes at least one inflection point.

The second lens element 620 with negative refractive power has an object-side surface 621 being convex and an image-side surface 622 being concave. The second lens element 620 is made of a plastic material, and has the object-side surface 621 and the image-side surface 622 being both aspheric. Furthermore, the object-side surface 621 of the second lens element 620 includes at least one inflection point.

The third lens element 630 with positive refractive power has an object-side surface 631 being convex and an image-side surface 632 being concave. The third lens element 630 is made of a plastic material, and has the object-side surface 631 and the image-side surface 632 being both aspheric. Furthermore, each of the object-side surface 631 and the image-side surface 632 of the third lens element 630 includes at least one inflection point.

The fourth lens element 640 with negative refractive power has an object-side surface 641 being convex and an image-side surface 642 being concave. The fourth lens element 640 is made of a plastic material, and has the object-side surface 641 and the image-side surface 642 being both aspheric. Furthermore, each of the object-side surface 641 and the image-side surface 642 of the fourth lens element 640 includes at least one inflection point.

The fifth lens element 650 with positive refractive power has an object-side surface 651 being concave and an image-side surface 652 being convex. The fifth lens element 650 is made of a plastic material, and has the object-side surface 651 and the image-side surface 652 being both aspheric. Furthermore, the image-side surface 652 of the fifth lens element 650 includes at least one inflection point.

The sixth lens element 660 with negative refractive power has an object-side surface 661 being convex and an image-side surface 662 being concave. The sixth lens element 660 is made of a plastic material, and has the object-side surface 661 and the image-side surface 662 being both aspheric. Furthermore, each of the object-side surface 661 and the image-side surface 662 of the sixth lens element 660 includes at least one inflection point.

The seventh lens element 670 with negative refractive power has an object-side surface 671 being convex and an image-side surface 672 being concave. The seventh lens element 670 is made of a plastic material, and has the object-side surface 671 and the image-side surface 672 being both aspheric. Furthermore, each of the object-side surface 671 and the image-side surface 672 of the seventh lens element 670 includes at least one inflection point and at least one critical point.

The eighth lens element 680 with negative refractive power has an object-side surface 681 being concave and an image-side surface 682 being convex. The eighth lens element 680 is made of a plastic material, and has the object-side surface 681 and the image-side surface 682 being both aspheric. Furthermore, each of the object-side surface 681 and the image-side surface 682 of the eighth lens element 680 includes at least one inflection point, and the image-side surface 682 of the eighth lens element 680 includes at least one critical point.

The filter 690 is made of a glass material and located between the eighth lens element 680 and the image surface 695, and will not affect the focal length of the image capturing optical assembly.

The detailed optical data of the 6th embodiment are shown in Table 11 and the aspheric surface data are shown in Table 12 below.

TABLE 11

6th Embodiment
f = 4.40 mm, Fno = 1.48, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.390 | | | | |
| 2 | Lens 1 | 2.289 | ASP | 0.653 | Plastic | 1.535 | 55.4 | 8.16 |
| 3 | | 4.328 | ASP | 0.032 | | | | |
| 4 | Lens 2 | 2.919 | ASP | 0.200 | Plastic | 1.664 | 19.8 | −14.28 |
| 5 | | 2.171 | ASP | 0.216 | | | | |
| 6 | Lens 3 | 2.362 | ASP | 0.484 | Plastic | 1.528 | 55.7 | 7.18 |
| 7 | | 5.822 | ASP | 0.038 | | | | |
| 8 | Stop | Plano | | 0.408 | | | | |
| 9 | Lens 4 | 299.924 | ASP | 0.292 | Plastic | 1.669 | 19.4 | −18.70 |
| 10 | | 12.005 | ASP | 0.165 | | | | |
| 11 | Lens 5 | −5.142 | ASP | 0.509 | Plastic | 1.536 | 55.9 | 5.56 |

TABLE 11-continued

6th Embodiment
f = 4.40 mm, Fno = 1.48, HFOV = 40.2 deg.

| Surface # | | Curvature Radius | | Thickness | Material | Index | Abbe # | Focal Length |
|---|---|---|---|---|---|---|---|---|
| 12 | | −1.952 | ASP | 0.078 | | | | |
| 13 | Lens 6 | 5.078 | ASP | 0.379 | Plastic | 1.669 | 19.4 | −22.67 |
| 14 | | 3.691 | ASP | 0.606 | | | | |
| 15 | Lens 7 | 1.313 | ASP | 0.380 | Plastic | 1.513 | 55.5 | −10.03 |
| 16 | | 0.943 | ASP | 0.412 | | | | |
| 17 | Lens 8 | −73.141 | ASP | 0.423 | Plastic | 1.585 | 32.8 | −409.57 |
| 18 | | −105.510 | ASP | 0.240 | | | | |
| 19 | Filter | | Plano | 0.210 | Glass | 1.517 | 64.2 | — |
| 20 | | | Plano | 0.146 | | | | |
| 21 | Image | | Plano | — | | | | |

Reference wavelength is 587.6 nm (d-line).
Effective radius of the stop on Surface 8 is 1.400 mm.

TABLE 12

Aspheric Coefficients

| Surface # | 2 | 3 | 4 | 5 | 6 | 7 |
|---|---|---|---|---|---|---|
| k = | −1.4779E−01 | −1.1621E+00 | −2.6720E+01 | −1.2243E+01 | −9.3304E+00 | 6.1413E+00 |
| A4 = | −1.6388E−03 | −2.9488E−02 | 1.1150E−02 | 2.2211E−04 | 3.3459E−02 | −1.4677E−02 |
| A6 = | 2.0932E−03 | −3.0149E−02 | −7.6152E−02 | −1.8583E−02 | −5.5863E−02 | −4.4073E−03 |
| A8 = | −8.8976E−03 | 2.2668E−02 | 8.7425E−02 | 2.1139E−02 | 3.1382E−02 | −3.6209E−02 |
| A10 = | 6.1335E−03 | −7.2569E−03 | −4.3637E−02 | 3.5214E−03 | −1.2839E−02 | 3.4470E−02 |
| A12 = | −3.0576E−03 | 6.4819E−04 | 1.2379E−02 | −7.5283E−03 | 1.5222E−03 | −1.4060E−02 |
| A14 = | 4.4047E−04 | | −1.6036E−03 | 2.1279E−03 | 5.5266E−04 | 2.0083E−03 |

| Surface # | 9 | 10 | 11 | 12 | 13 | 14 |
|---|---|---|---|---|---|---|
| k = | −2.1585E+01 | 5.3179E+01 | 9.3180E+00 | −1.2550E+00 | 1.0481E+00 | −7.0282E+00 |
| A4 = | −1.2106E−01 | −1.9796E−01 | −1.5561E−01 | 5.3287E−02 | 1.3206E−01 | 4.4391E−02 |
| A6 = | 1.4069E−01 | 3.8746E−01 | 4.9051E−01 | −6.8722E−02 | −2.5410E−01 | −8.1188E−02 |
| A8 = | −2.9480E−01 | −5.8217E−01 | −5.8410E−01 | 5.5383E−02 | 2.1011E−01 | 4.2486E−02 |
| A10 = | 2.7479E−01 | 4.5893E−01 | 3.5840E−01 | −1.4582E−02 | −1.1951E−01 | −1.4166E−02 |
| A12 = | −1.1531E−01 | −1.9324E−01 | −1.0319E−01 | −4.7595E−03 | 4.5361E−02 | 2.8940E−03 |
| A14 = | 1.8422E−02 | 4.0754E−02 | 2.6068E−03 | 3.1772E−03 | −1.1179E−02 | −3.1525E−04 |
| A16 = | −1.8143E−04 | −3.3415E−03 | 5.1856E−03 | −4.3668E−04 | 1.6142E−03 | 1.3864E−05 |
| A18 = | | −9.9119E−07 | −8.1201E−04 | | −1.0128E−04 | |

| Surface # | 15 | 16 | 17 | 18 |
|---|---|---|---|---|
| k = | −7.3562E+00 | −4.2432E+00 | 7.1682E+01 | 2.3726E+01 |
| A4 = | −1.1543E−01 | −1.0129E−01 | −7.6798E−02 | −4.7548E−02 |
| A6 = | 8.8375E−03 | 3.6284E−02 | 8.7437E−02 | 5.1083E−02 |
| A8 = | 9.1538E−03 | −9.2684E−03 | −4.5233E−02 | −2.2499E−02 |
| A10 = | −4.1888E−03 | 1.4209E−03 | 1.2945E−02 | 5.3539E−03 |
| A12 = | 1.1135E−03 | −4.8093E−05 | −2.2408E−03 | −7.7208E−04 |
| A14 = | −2.0406E−04 | −2.1882E−05 | 2.4098E−04 | 6.9982E−05 |
| A16 = | 2.3929E−05 | 3.7291E−06 | −1.5767E−05 | −3.9169E−06 |
| A18 = | −1.5731E−06 | −2.4045E−07 | 5.7561E−07 | 1.2409E−07 |
| A20 = | 4.3680E−08 | 5.7038E−09 | −9.0015E−09 | −1.7055E−09 |

In the 6th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.40 | \|f/fi\|max | 0.79 |
| Fno | 1.48 | (f/f2) + (f/f3) | 0.30 |
| HFOV [deg.] | 40.2 | CTf [mm] | 0.21 |
| Nmax | 1.669 | TL [mm] | 5.87 |
| Nmin | 1.514 | TL/f | 1.33 |
| (V2 + V6)/V1 | 0.71 | TL/ImgH | 1.52 |
| \|(V2 − V3)/(V4 − V5)\| | 0.98 | SD/TD | 0.93 |
| (V4 + V5 + V6)/V1 | 1.71 | Y11/Y82 | 0.43 |
| ATmax/CTmin | 3.03 | HFOV × EPD/f | 27.19 |
| ATmax/ImgH | 0.16 | TL/ImgH + f/EPD | 3.00 |

-continued

| 6th Embodiment | | | |
|---|---|---|---|
| (R11 − R12)/(R11 + R12) | 0.16 | TL^2/(ImgH × EPD) | 3.01 |
| f/R16 | −0.04 | f/fG1 | 0.28 |
| EPD/ΣCT | 0.90 | f/fG2 | 1.03 |
| EPD/BL | 4.99 | f/fG3 | −0.67 |
| TL/EPD | 1.97 | Yc71/f | 0.22 |
| f/EPD | 1.48 | Yc72/f | 0.34 |
| f1/f2 | −0.57 | Yc81/f | — |
| f/f2 | −0.31 | Yc82/f | 0.28\0.38 |

In the image capturing optical assembly according to the 6th embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 610 through the eighth lens element 680 is stated in the following table, wherein term definitions of the parameters related to each surface of the lens elements are the same as those of the 1st embodiment. Therefore, an explanation in this regard will not be provided again.

| 6th Embodiment | | | | |
|---|---|---|---|---|
| \|f/Rf\| + \|f/Rr\| | \|f/R1\| + \|f/R2\| | 2.94 | \|f/Rf\| + \|f/Rr\| \|f/R9\| + \|f/R10\| | 3.11 |
| | \|f/R3\| + \|f/R4\| | 3.53 | \|f/R11\| + \|f/R12\| | 2.06 |
| | \|f/R5\| + \|f/R6\| | 2.62 | \|f/R13\| + \|f/R14\| | 8.01 |
| | \|f/R7\| + \|f/R8\| | 0.38 | \|f/R15\| + \|f/R16\| | 0.10 |

In the 6th embodiment, each of three of the first lens element 610, the second lens element 620, the third lens element 630, the fourth lens element 640, the fifth lens element 650, the sixth lens element 660, the seventh lens element 670, and the eighth lens element 680 has an Abbe number smaller than 24.0, 23.0 and 20; in detail, the three lens elements are the second lens element 620, the fourth lens element 640, the sixth lens element 660.

In the 6th embodiment, the numbers of the inflection points of object-side surfaces and image-side surfaces of the first lens element 610, the second lens element 620, the third lens element 630, the fourth lens element 640, the fifth lens element 650, the sixth lens element 660, the seventh lens element 670, the eighth lens element 680 are listed in the table below. Moreover, in the 6th embodiment, a total number of inflection points on the object-side surfaces and the image-side surfaces of all the lens elements of the image capturing optical assembly is Ninf., the following condition is satisfied: Ninf.=24.

| 6th Embodiment - numbers of the inflection points | | | | | | | | |
|---|---|---|---|---|---|---|---|---|
| | 610 | 620 | 630 | 640 | 650 | 660 | 670 | 680 |
| Object-side surface | 1 | 2 | 2 | 1 | 0 | 2 | 3 | 3 |
| Image-side surface | 1 | 0 | 1 | 2 | 1 | 1 | 1 | 3 |

7th Embodiment

Figure 13:
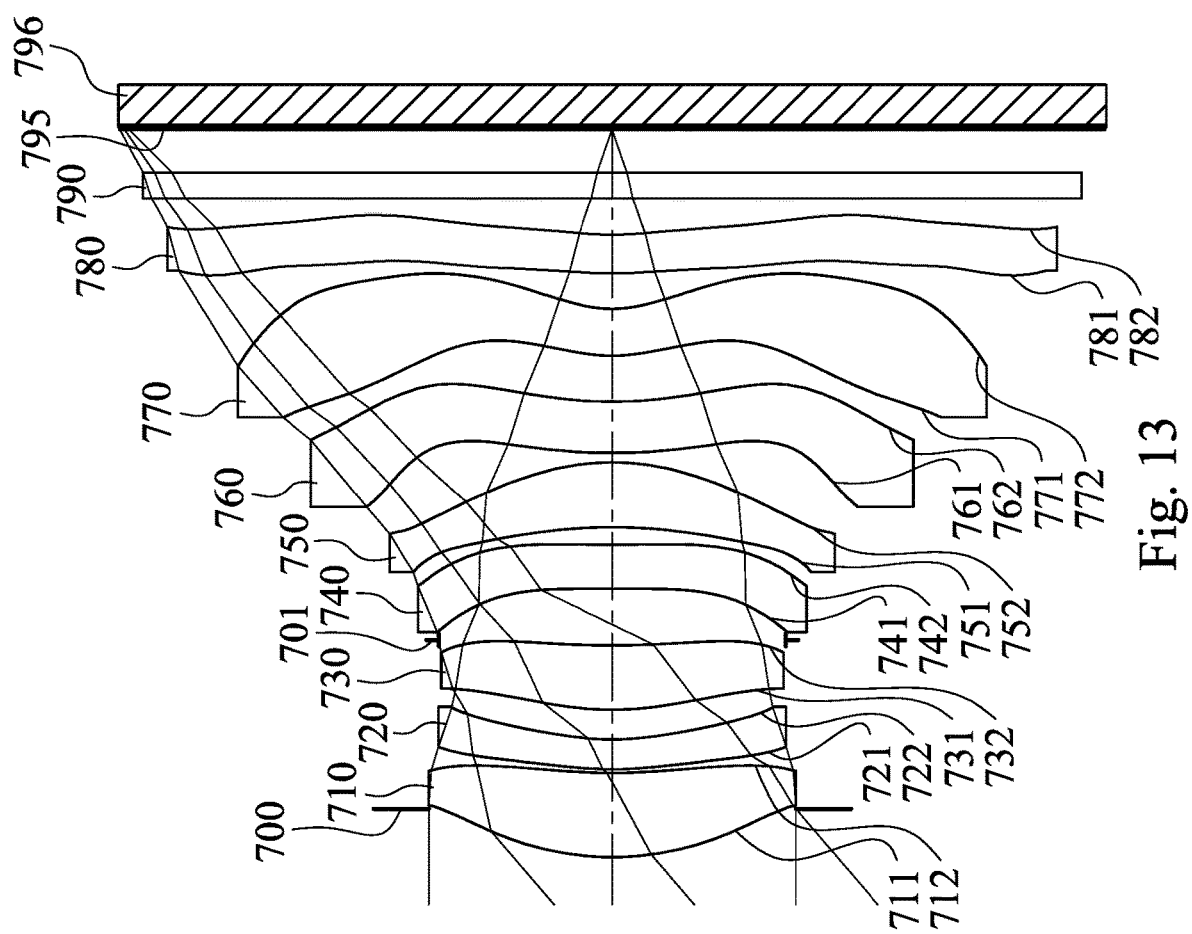
FIG. 13 is a schematic view of an imaging apparatus according to the 7th embodiment of the present disclosure.
Figure 14:
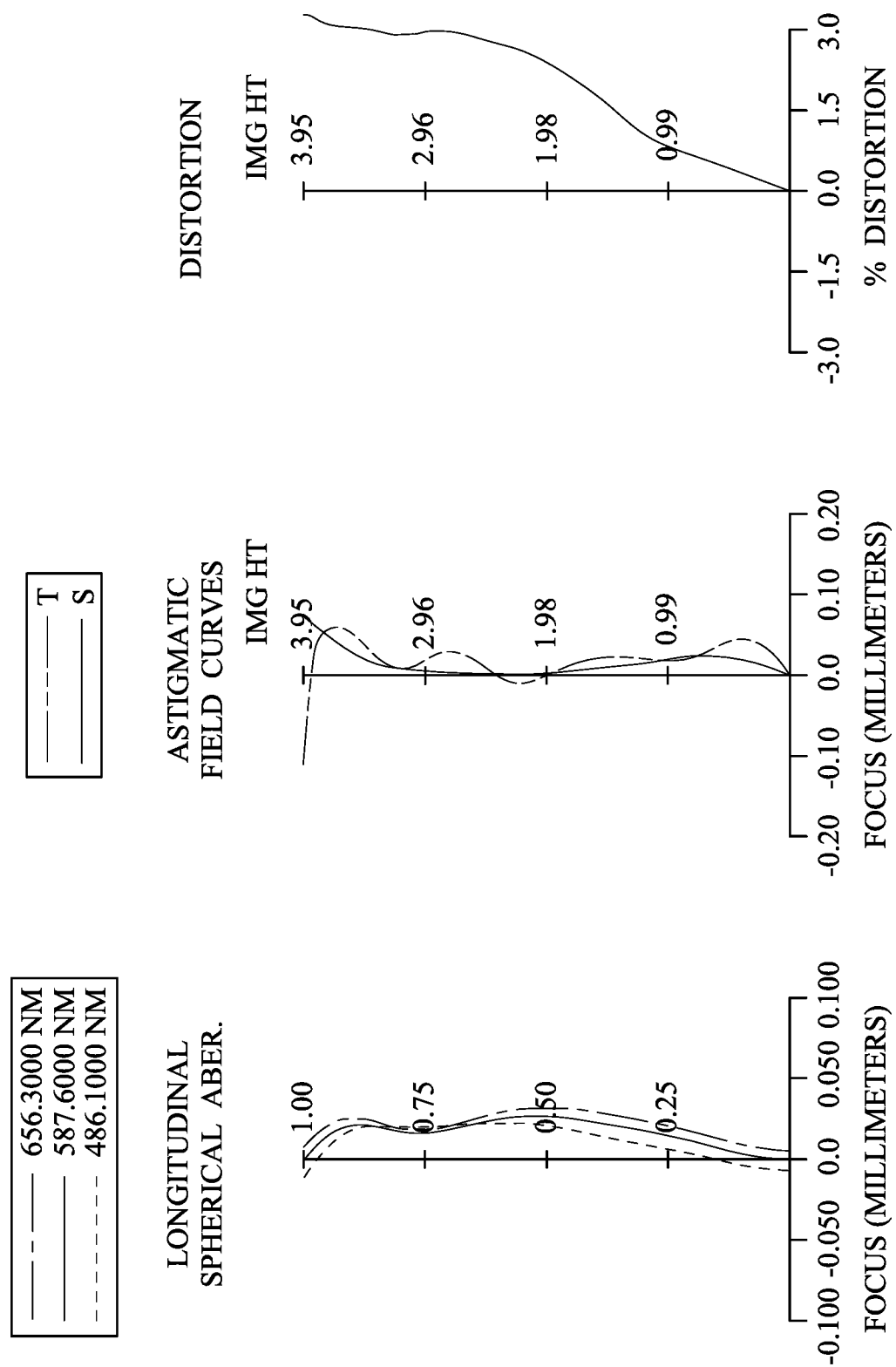
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an image capturing optical assembly (its reference numeral is omitted) and an image sensor 796. The image capturing optical assembly includes, in order from an object side to an image side, an aperture stop 700, a first lens element 710, a second lens element 720, a third lens element 730, a stop 701, a fourth lens element 740, a fifth lens element 750, a sixth lens element 760, a seventh lens element 770, an eighth lens element 780, a filter 790 and an image surface 795, wherein the image sensor 796 is disposed on the image surface 795 of the image capturing optical assembly. The image capturing optical assembly includes eight lens elements (710, 720, 730, 740, 750, 760, 770 and 780) without additional one or more lens elements inserted between the first lens element 710 and the eighth lens element 780, and there is an air gap in a paraxial region between every adjacent lens elements of the image capturing optical assembly. The first lens element 710 and the second lens element 720 belong to a first lens group (its reference numeral is omitted). The third lens element 730, the fourth lens element 740 and the fifth lens element 750 belong to a second lens group (its reference numeral is omitted). The sixth lens element 760, the seventh lens element 770 and the eighth lens element 780 belong to a third lens group (its reference numeral is omitted).

The first lens element 710 with positive refractive power has an object-side surface 711 being convex and an image-side surface 712 being concave. The first lens element 710 is made of a plastic material, and has the object-side surface 711 and the image-side surface 712 being both aspheric. Furthermore, each of the object-side surface 711 and the image-side surface 712 of the first lens element 710 includes at least one inflection point.

The second lens element 720 with negative refractive power has an object-side surface 721 being convex and an image-side surface 722 being concave. The second lens element 720 is made of a plastic material, and has the object-side surface 721 and the image-side surface 722 being both aspheric. Furthermore, the object-side surface 721 of the second lens element 720 includes at least one inflection point.

The third lens element 730 with positive refractive power has an object-side surface 731 being convex and an image-side surface 732 being concave. The third lens element 730 is made of a plastic material, and has the object-side surface 731 and the image-side surface 732 being both aspheric. Furthermore, each of the object-side surface 731 and the image-side surface 732 of the third lens element 730 includes at least one inflection point.

The fourth lens element 740 with negative refractive power has an object-side surface 741 being convex and an image-side surface 742 being concave. The fourth lens element 740 is made of a plastic material, and has the object-side surface 741 and the image-side surface 742 being both aspheric. Furthermore, each of the object-side surface 741 and the image-side surface 742 of the fourth lens element 740 includes at least one inflection point.

The fifth lens element 750 with positive refractive power has an object-side surface 751 being concave and an image-side surface 752 being convex. The fifth lens element 750 is made of a plastic material, and has the object-side surface 751 and the image-side surface 752 being both aspheric. Furthermore, the image-side surface 752 of the fifth lens element 750 includes at least one inflection point.

The sixth lens element 760 with negative refractive power has an object-side surface 761 being convex and an image-side surface 762 being concave. The sixth lens element 760 is made of a plastic material, and has the object-side surface 761 and the image-side surface 762 being both aspheric. Furthermore, each of the object-side surface 761 and the image-side surface 762 of the sixth lens element 760 includes at least one inflection point.

The seventh lens element 770 with negative refractive power has an object-side surface 771 being convex and an image-side surface 772 being concave. The seventh lens element 770 is made of a plastic material, and has the object-side surface 771 and the image-side surface 772 being both aspheric. Furthermore, each of the object-side surface 771 and the image-side surface 772 of the seventh lens element 770 includes at least one inflection point and at least one critical point.

The eighth lens element 780 with negative refractive power has an object-side surface 781 being convex and an image-side surface 782 being concave. The eighth lens element 780 is made of a plastic material, and has the object-side surface 781 and the image-side surface 782 being both aspheric. Furthermore, each of the object-side surface 781 and the image-side surface 782 of the eighth lens element 780 includes at least one inflection point and at least one critical point.

The filter 790 is made of a glass material and located between the eighth lens element 780 and the image surface 795, and will not affect the focal length of the image capturing optical assembly.

The detailed optical data of the 7th embodiment are shown in Table 13 and the aspheric surface data are shown in Table 14 below.

TABLE 13

7th Embodiment
f = 4.44 mm, Fno = 1.50, HFOV = 40.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.390 | | | | |
| 2 | Lens 1 | 2.363 | ASP | 0.684 | Plastic | 1.544 | 56.0 | 7.55 |
| 3 | | 5.000 | ASP | 0.030 | | | | |
| 4 | Lens 2 | 3.131 | ASP | 0.241 | Plastic | 1.669 | 19.4 | −15.14 |
| 5 | | 2.318 | ASP | 0.241 | | | | |
| 6 | Lens 3 | 2.723 | ASP | 0.518 | Plastic | 1.544 | 56.0 | 7.65 |
| 7 | | 7.341 | ASP | 0.043 | | | | |
| 8 | Stop | Plano | | 0.413 | | | | |
| 9 | Lens 4 | 1069.663 | ASP | 0.356 | Plastic | 1.666 | 19.7 | −17.93 |
| 10 | | 11.807 | ASP | 0.141 | | | | |
| 11 | Lens 5 | −5.232 | ASP | 0.528 | Plastic | 1.539 | 55.9 | 5.27 |
| 12 | | −1.908 | ASP | 0.075 | | | | |
| 13 | Lens 6 | 6.376 | ASP | 0.414 | Plastic | 1.651 | 21.1 | −15.20 |
| 14 | | 3.777 | ASP | 0.370 | | | | |
| 15 | Lens 7 | 1.412 | ASP | 0.379 | Plastic | 1.513 | 55.5 | −10.44 |
| 16 | | 1.016 | ASP | 0.285 | | | | |
| 17 | Lens 8 | 2.683 | ASP | 0.311 | Plastic | 1.513 | 55.5 | −48.31 |
| 18 | | 2.326 | ASP | 0.299 | | | | |
| 19 | Filter | Plano | | 0.210 | Glass | 1.517 | 64.2 | — |
| 20 | | Plano | | 0.364 | | | | |
| 21 | Image | Plano | | — | | | | |

Reference wavelength is 587.6 nm (d-line).
Effective radius of the stop on Surface 8 is 1.400 mm.

TABLE 14

Aspheric Coefficients

| Surface # | 2 | 3 | 4 | 5 | 6 | 7 |
|---|---|---|---|---|---|---|
| k = | −9.0910E−02 | −6.5336E−01 | −2.6269E+01 | −1.2506E+01 | −1.1243E+01 | 3.4703E+00 |
| A4 = | 5.8347E−05 | −2.8838E−02 | 6.1769E−03 | 6.2863E−03 | 2.3863E−02 | −2.0332E−02 |
| A6 = | 1.3430E−03 | −2.8326E−02 | −7.7454E−02 | −3.9205E−02 | −5.1754E−02 | −9.0551E−03 |
| A8 = | −8.4355E−03 | 2.2668E−02 | 8.7631E−02 | 4.3006E−02 | 3.2473E−02 | −1.8762E−02 |
| A10 = | 6.1335E−03 | −7.2569E−03 | −4.3446E−02 | −1.2675E−02 | −1.8820E−02 | 1.5119E−02 |
| A12 = | −2.9734E−03 | 6.4819E−04 | 1.2359E−02 | −8.3353E−04 | 6.5114E−03 | −4.6293E−03 |
| A14 = | 4.2800E−04 | | −1.6036E−03 | 1.1150E−03 | −7.1158E−04 | 3.3959E−04 |

| Surface # | 9 | 10 | 11 | 12 | 13 | 14 |
|---|---|---|---|---|---|---|
| k = | −2.1585E+01 | 5.3878E+01 | 9.1327E+00 | −1.2472E+00 | 2.8762E+00 | −6.7174E+00 |
| A4 = | −1.0355E−01 | −2.0154E−01 | −2.0223E−01 | 3.7248E−02 | 1.3797E−01 | 4.5467E−02 |
| A6 = | 6.0574E−02 | 3.8668E−01 | 6.3873E−01 | −3.9594E−02 | −2.5431E−01 | −8.1099E−02 |
| A8 = | −1.2101E−01 | −5.8192E−01 | −8.9980E−01 | 1.7445E−02 | 2.1006E−01 | 4.2496E−02 |
| A10 = | 7.7241E−02 | 4.5911E−01 | 7.1865E−01 | 1.2601E−02 | −1.1952E−01 | −1.4165E−02 |
| A12 = | 2.6013E−03 | −1.9318E−01 | −3.3543E−01 | −1.4168E−02 | 4.5358E−02 | 2.8942E−03 |
| A14 = | −1.7012E−02 | 4.0767E−02 | 8.9232E−02 | 4.6087E−03 | −1.1179E−02 | −3.1523E−04 |
| A16 = | 4.1129E−03 | −3.3459E−03 | −1.2401E−02 | −5.0457E−04 | 1.6142E−03 | 1.3866E−05 |
| A18 = | | −7.0049E−06 | 6.9306E−04 | | −1.0127E−04 | |

TABLE 14-continued

| Aspheric Coefficients | | | | |
|---|---|---|---|---|
| Surface # | 15 | 16 | 17 | 18 |
| k = | −6.2724E+00 | −4.0121E+00 | −9.0000E+01 | −6.5886E+01 |
| A4 = | −1.4691E−01 | −1.3891E−01 | −1.0690E−01 | −6.0163E−02 |
| A6 = | 2.4563E−02 | 6.7302E−02 | 1.2531E−01 | 6.1593E−02 |
| A8 = | −3.1650E−03 | −2.2900E−02 | −6.4542E−02 | −2.7041E−02 |
| A10 = | 4.4234E−03 | 4.8428E−03 | 1.8001E−02 | 6.3193E−03 |
| A12 = | −2.1760E−03 | −5.0171E−04 | −2.9823E−03 | −8.7498E−04 |
| A14 = | 4.9708E−04 | 3.2094E−07 | 3.0288E−04 | 7.4617E−05 |
| A16 = | −6.0641E−05 | 5.0160E−06 | −1.8551E−05 | −3.8722E−06 |
| A18 = | 3.8323E−06 | −4.3105E−07 | 6.3046E−07 | 1.1290E−07 |
| A20 = | −9.8440E−08 | 1.1697E−08 | −9.1510E−09 | −1.4278E−09 |

In the 7th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.44 | |f/fi|max | 0.84 |
| Fno | 1.50 | (f/f2) + (f/f3) | 0.29 |
| HFOV [deg.] | 40.6 | CTf [mm] | 0.21 |
| Nmax | 1.669 | TL [mm] | 5.90 |
| Nmin | 1.514 | TL/f | 1.33 |
| (V2 + V6)/V1 | 0.72 | TL/ImgH | 1.49 |
| |(V2 − V3)/(V4 − V5)| | 1.01 | SD/TD | 0.92 |
| (V4 + V5 + V6)/V1 | 1.73 | Y11/Y82 | 0.41 |
| ATmax/CTmin | 1.89 | HFOV × EPD/f | 27.09 |
| ATmax/ImgH | 0.12 | TL/ImgH + f/EPD | 2.99 |
| (R11 − R12)/(R11 + R12) | 0.26 | TL^2/(ImgH × EPD) | 2.98 |
| f/R16 | 1.91 | f/fG1 | 0.35 |
| EPD/ΣCT | 0.86 | f/fG2 | 1.04 |
| EPD/BL | 3.39 | f/fG3 | −0.88 |
| TL/EPD | 1.99 | Yc71/f | 0.21 |
| f/EPD | 1.50 | Yc72/f | 0.32 |
| f1/f2 | −0.50 | Yc81/f | 0.39\0.73 |
| f/f2 | −0.29 | Yc82/f | 0.43\0.76 |

In the image capturing optical assembly according to the 7th embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 710 through the eighth lens element 780 is stated in the following table, wherein term definitions of the parameters related to each surface of the lens elements are the same as those of the 1st embodiment. Therefore, an explanation in this regard will not be provided again.

| 7th Embodiment | | | | |
|---|---|---|---|---|
| |f/Rf| + |f/Rr| | |f/R1| + |f/R2| | 2.77 | |f/Rf| + |f/Rr| |f/R9| + |f/R10| | 3.18 |
| | |f/R3| + |f/R4| | 3.33 | |f/R11| + |f/R12| | 1.87 |
| | |f/R5| + |f/R6| | 2.24 | |f/R13| + |f/R14| | 7.52 |
| | |f/R7| + |f/R8| | 0.38 | |f/R15| + |f/R16| | 3.57 |

In the 7th embodiment, each of three of the first lens element 710, the second lens element 720, the third lens element 730, the fourth lens element 740, the fifth lens element 750, the sixth lens element 760, the seventh lens element 770, and the eighth lens element 780 has an Abbe number smaller than 24.0 and 23.0; in detail, the three lens elements are the second lens element 720, the fourth lens element 740, the sixth lens element 760, wherein each of the Abbe numbers of the second lens element 720 and the fourth lens element 740 is smaller than 20.

In the 7th embodiment, the numbers of the inflection points of object-side surfaces and image-side surfaces of the first lens element 710, the second lens element 720, the third lens element 730, the fourth lens element 740, the fifth lens element 750, the sixth lens element 760, the seventh lens element 770, and the eighth lens element 780 are listed in the table below. Moreover, in the 7th embodiment, a total number of inflection points on the object-side surfaces and the image-side surfaces of all the lens elements of the image capturing optical assembly is Ninf., the following condition is satisfied: Ninf.=38.

| 7th Embodiment - numbers of the inflection points | | | | | | | | |
|---|---|---|---|---|---|---|---|---|
| | 710 | 720 | 730 | 740 | 750 | 760 | 770 | 780 |
| Object-side surface | 1 | 2 | 2 | 2 | 0 | 2 | 4 | 7 |
| Image-side surface | 1 | 0 | 1 | 2 | 2 | 4 | 1 | 7 |

8th Embodiment

Figure 15:
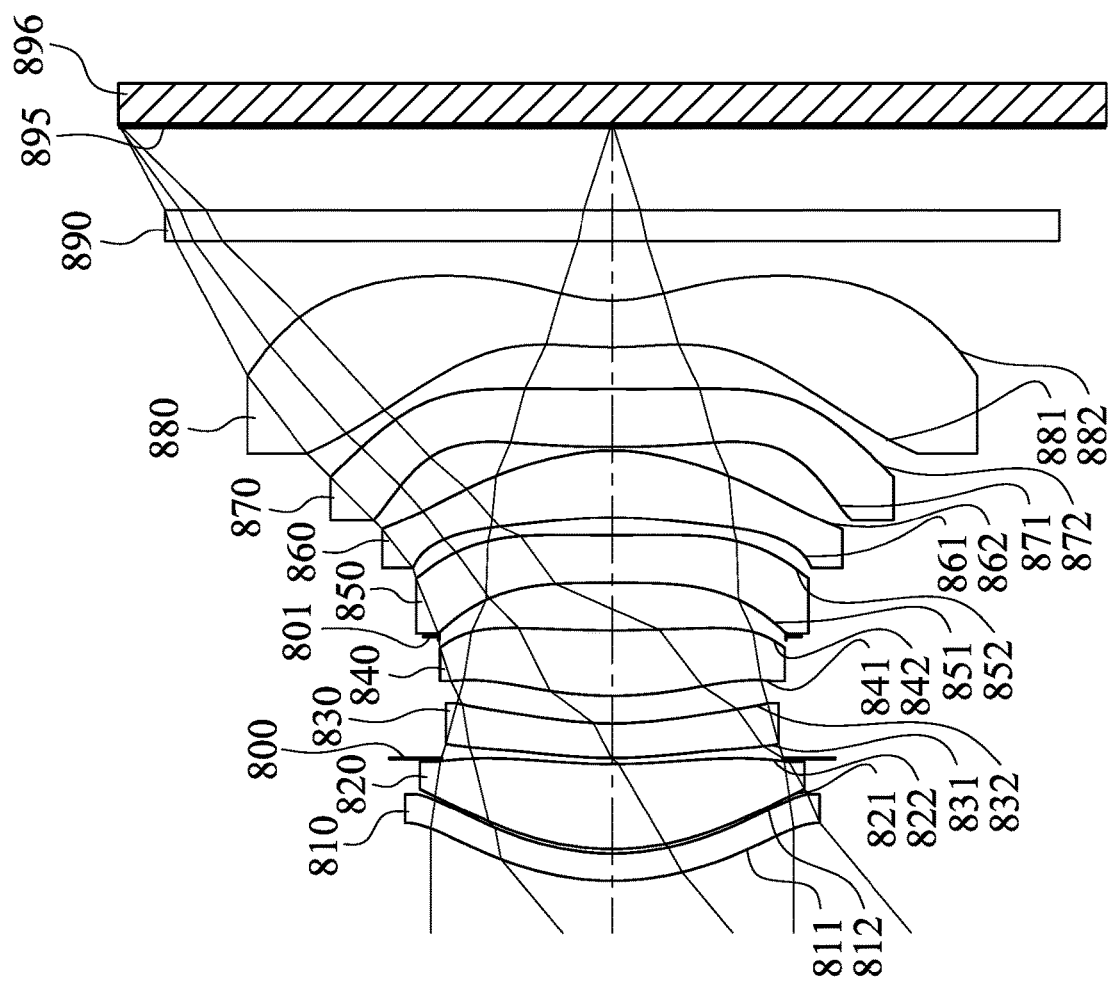
FIG. 15 is a schematic view of an imaging apparatus according to the 8th embodiment of the present disclosure.
Figure 16:
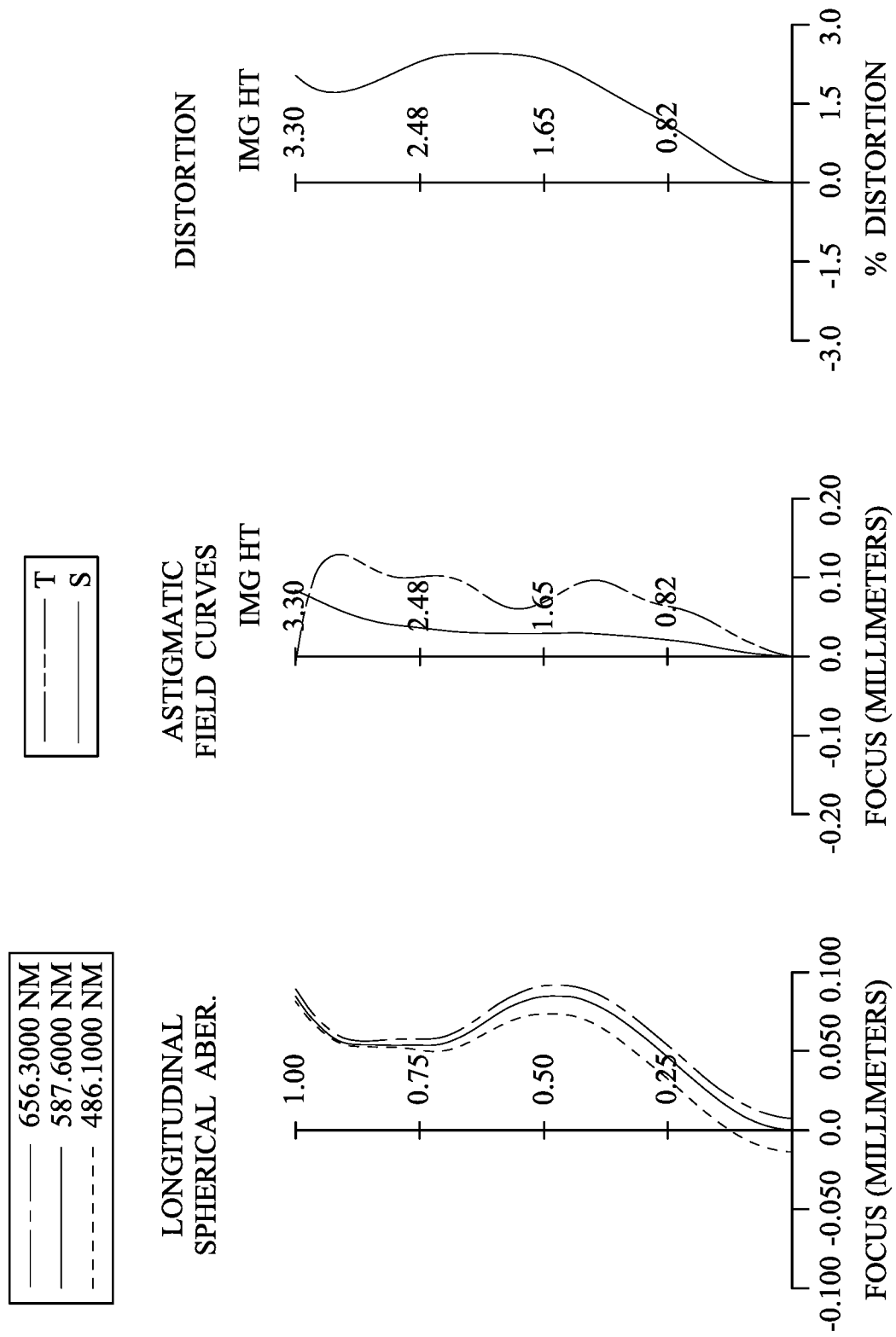
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an image capturing optical assembly (its reference numeral is omitted) and an image sensor 896. The image capturing optical assembly includes, in order from an object side to an image side, a first lens element 810, a second lens element 820, an aperture stop 800, a third lens element 830, a fourth lens element 840, a stop 801, a fifth lens element 850, a sixth lens element 860, a seventh lens element 870, an eighth lens element 880, a filter 890 and an image surface 895, wherein the image sensor 896 is disposed on the image surface 895 of the image capturing optical assembly. The image capturing optical assembly includes eight lens elements (810, 820, 830, 840, 850, 860, 870 and 880) without additional one or more lens elements inserted between the first lens element 810 and the eighth lens element 880, and there is an air gap in a paraxial region between every adjacent lens elements of the image capturing optical assembly. The first lens element 810 and the second lens element 820 belong to a first lens group (its reference numeral is omitted). The third lens element 830, the fourth lens element 840 and the fifth lens element 850 belong to a second lens group (its reference numeral is omitted). The sixth lens element 860, the seventh lens element 870 and the eighth lens element 880 belong to a third lens group (its reference numeral is omitted).

The first lens element 810 with negative refractive power has an object-side surface 811 being convex and an image-side surface 812 being concave. The first lens element 810 is made of a plastic material, and has the object-side surface 811 and the image-side surface 812 being both aspheric. Furthermore, each of the object-side surface 811 and the image-side surface 812 of the first lens element 810 includes at least one inflection point.

The second lens element 820 with positive refractive power has an object-side surface 821 being convex and an image-side surface 822 being concave. The second lens element 820 is made of a plastic material, and has the object-side surface 821 and the image-side surface 822 being both aspheric. Furthermore, each of the object-side surface 821 and the image-side surface 822 of the second lens element 820 includes at least one inflection point.

The third lens element 830 with negative refractive power has an object-side surface 831 being convex and an image-side surface 832 being concave. The third lens element 830 is made of a plastic material, and has the object-side surface 831 and the image-side surface 832 being both aspheric. Furthermore, the object-side surface 831 of the third lens element 830 includes at least one inflection point.

The fourth lens element 840 with positive refractive power has an object-side surface 841 being convex and an image-side surface 842 being concave. The fourth lens element 840 is made of a plastic material, and has the object-side surface 841 and the image-side surface 842 being both aspheric. Furthermore, each of the object-side surface 841 and the image-side surface 842 of the fourth lens element 840 includes at least one inflection point.

The fifth lens element 850 with negative refractive power has an object-side surface 851 being concave and an image-side surface 852 being concave. The fifth lens element 850 is made of a plastic material, and has the object-side surface 851 and the image-side surface 852 being both aspheric. Furthermore, each of the object-side surface 851 and the image-side surface 852 of the fifth lens element 850 includes at least one inflection point.

The sixth lens element 860 with positive refractive power has an object-side surface 861 being concave and an image-side surface 862 being convex. The sixth lens element 860 is made of a plastic material, and has the object-side surface 861 and the image-side surface 862 being both aspheric. Furthermore, each of the object-side surface 861 and the image-side surface 862 of the sixth lens element 860 includes at least one inflection point.

The seventh lens element 870 with positive refractive power has an object-side surface 871 being convex and an image-side surface 872 being convex. The seventh lens element 870 is made of a plastic material, and has the object-side surface 871 and the image-side surface 872 being both aspheric. Furthermore, each of the object-side surface 871 and the image-side surface 872 of the seventh lens element 870 includes at least one inflection point and at least one critical point.

The eighth lens element 880 with negative refractive power has an object-side surface 881 being convex and an image-side surface 882 being concave. The eighth lens element 880 is made of a plastic material, and has the object-side surface 881 and the image-side surface 882 being both aspheric. Furthermore, each of the object-side surface 881 and the image-side surface 882 of the eighth lens element 880 includes at least one inflection point and at least one critical point.

The filter 890 is made of a glass material and located between the eighth lens element 880 and the image surface 895, and will not affect the focal length of the image capturing optical assembly.

The detailed optical data of the 8th embodiment are shown in Table 15 and the aspheric surface data are shown in Table 16 below.

TABLE 15

8th Embodiment
f = 3.81 mm, Fno = 1.57, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.920 | ASP | 0.182 | Plastic | 1.669 | 19.5 | −62.02 |
| 2 | | 1.765 | ASP | 0.030 | | | | |
| 3 | Lens 2 | 1.857 | ASP | 0.573 | Plastic | 1.545 | 56.0 | 5.44 |
| 4 | | 4.432 | ASP | 0.037 | | | | |
| 5 | Ape. Stop | Plano | | 0.003 | | | | |
| 6 | Lens 3 | 3.264 | ASP | 0.230 | Plastic | 1.669 | 19.5 | −18.06 |
| 7 | | 2.497 | ASP | 0.184 | | | | |
| 8 | Lens 4 | 2.420 | ASP | 0.437 | Plastic | 1.544 | 56.0 | 6.25 |
| 9 | | 7.865 | ASP | −0.040 | | | | |
| 10 | Stop | Plano | | 0.359 | | | | |
| 11 | Lens 5 | −18.280 | ASP | 0.317 | Plastic | 1.669 | 19.5 | −9.58 |
| 12 | | 9.931 | ASP | 0.119 | | | | |
| 13 | Lens 6 | −4.234 | ASP | 0.450 | Plastic | 1.544 | 56.0 | 4.21 |
| 14 | | −1.543 | ASP | 0.025 | | | | |
| 15 | Lens 7 | 12.076 | ASP | 0.387 | Plastic | 1.669 | 19.5 | 16.64 |
| 16 | | −140.349 | ASP | 0.278 | | | | |
| 17 | Lens 8 | 2.433 | ASP | 0.312 | Plastic | 1.544 | 56.0 | −3.41 |
| 18 | | 1.005 | ASP | 0.400 | | | | |

TABLE 15-continued

8th Embodiment
f = 3.81 mm, Fno = 1.57, HFOV = 39.9 deg.

| Surface # | | Curvature Radius | Thickness | Material | Index | Abbe # | Focal Length |
|---|---|---|---|---|---|---|---|
| 19 | Filter | Plano | 0.210 | Plastic | 1.544 | 56.0 | — |
| 20 | | Plano | 0.562 | | | | |
| 21 | Image | Plano | — | | | | |

Reference wavelength is 587.6 nm (d-line).
Effective radius of the stop on Surface 10 is 1.160 mm.

TABLE 16

Aspheric Coefficients

| Surface # | 1 | 2 | 3 | 4 | 6 | 7 |
|---|---|---|---|---|---|---|
| k = | −4.3103E−01 | −2.7695E−01 | −3.8667E−01 | −3.9922E+00 | −3.7464E+01 | −1.8452E+01 |
| A4 = | −1.5135E−02 | −5.5586E−03 | 1.0100E−02 | −5.8373E−02 | 1.2402E−02 | 4.5875E−03 |
| A6 = | 2.3019E−02 | −2.7074E−02 | −4.6149E−02 | −6.8163E−02 | −2.0369E−01 | −7.7310E−02 |
| A8 = | −5.3485E−02 | 2.9887E−03 | 3.9482E−02 | 8.4238E−02 | 3.6361E−01 | 7.4956E−02 |
| A10 = | 4.7621E−02 | 3.8215E−03 | −2.8954E−02 | −4.4092E−02 | −3.2601E−01 | 3.6871E−02 |
| A12 = | −2.3235E−02 | −2.9578E−03 | 8.1130E−03 | 1.0370E−02 | 1.6581E−01 | −8.9116E−02 |
| A14 = | 4.0090E−03 | | | | −3.5221E−02 | 3.9998E−02 |

| Surface # | 8 | 9 | 11 | 12 | 13 | 14 |
|---|---|---|---|---|---|---|
| k = | −1.6655E+01 | −6.8319E+00 | 9.0000E+01 | 5.4464E+01 | 8.8723E+00 | −1.1897E+00 |
| A4 = | 5.9142E−02 | −2.4568E−02 | −2.6154E−01 | −3.4711E−01 | −2.0588E−01 | 1.4705E−01 |
| A6 = | −1.5637E−01 | −6.4073E−02 | 3.8810E−01 | 9.4391E−01 | 1.3092E+00 | −2.6104E−01 |
| A8 = | 1.2277E−01 | 7.0349E−03 | −9.6169E−01 | −2.0257E+00 | −2.7040E+00 | 3.3022E−01 |
| A10 = | −9.9744E−02 | −2.7123E−02 | 1.2886E+00 | 2.2809E+00 | 2.8482E+00 | −2.6879E−01 |
| A12 = | 3.2886E−02 | 2.2785E−02 | −8.7024E−01 | −1.3711E+00 | −1.6385E+00 | 1.2969E−01 |
| A14 = | 3.9910E−03 | −5.5447E−02 | 2.6495E−01 | 4.1305E−01 | 4.8642E−01 | −3.2261E−02 |
| A16 = | | | −2.3335E−02 | −4.8437E−02 | −5.8327E−02 | 3.1158E−03 |

| Surface # | 15 | 16 | 17 | 18 |
|---|---|---|---|---|
| k = | 3.0182E+00 | −2.3943E+00 | −2.2655E+01 | −6.0624E+00 |
| A4 = | 2.3205E−01 | 9.0345E−02 | −4.9378E−01 | −2.6178E−01 |
| A6 = | −6.2269E−01 | −2.0024E−01 | 4.5553E−01 | 2.3749E−01 |
| A8 = | 7.3081E−01 | 1.4770E−01 | −3.0082E−01 | −1.4793E−01 |
| A10 = | −5.9375E−01 | −7.0409E−02 | 1.3859E−01 | 6.2715E−02 |
| A12 = | 3.2198E−01 | 2.0540E−02 | −4.0662E−02 | −1.7982E−02 |
| A14 = | −1.1327E−01 | −3.1943E−03 | 7.0126E−03 | 3.3976E−03 |
| A16 = | 2.3364E−02 | 2.0101E−04 | −6.1286E−04 | −4.0235E−04 |
| A18 = | −2.0940E−03 | | 1.4712E−05 | 2.6832E−05 |
| A20 = | | | 7.3927E−07 | −7.6057E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.81 | |f/f|max | 1.12 |
| Fno | 1.57 | (f/f2) + (f/f3) | 0.49 |
| HFOV [deg.] | 39.9 | CTf [mm] | 0.21 |
| Nmax | 1.669 | TL [mm] | 5.05 |
| Nmin | 1.544 | TL/f | 1.33 |
| (V2 + V6)/V1 | 5.74 | TL/ImgH | 1.53 |
| |(V2 − V3)/(V4 − V5)| | 1.00 | SD/TD | 0.79 |
| (V4 + V5 + V6)/V1 | 6.74 | Y11/Y82 | 0.57 |
| ATmax/CTmin | 1.75 | HFOV × EPD/f | 25.43 |
| ATmax/ImgH | 0.10 | TL/ImgH + f/EPD | 3.10 |
| (R11 − R12)/(R11 + R12) | 0.47 | TL^2/(ImgH × EPD) | 3.19 |
| f/R16 | 3.79 | f/fG1 | 0.61 |
| EPD/ΣCT | 0.84 | f/fG2 | 0.03 |
| EPD/BL | 2.07 | f/fG3 | 0.28 |
| TL/EPD | 2.08 | Yc71/f | 0.21 |
| f/EPD | 1.57 | Yc72/f | 0.04\0.17 |
| f1/f2 | −11.40 | Yc81/f | 0.12 |
| f/f2 | 0.70 | Yc82/f | 0.29 |

In the image capturing optical assembly according to the 8th embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 810 through the eighth lens element 880 is stated in the following table, wherein term definitions of the parameters related to each surface of the lens elements are the same as those of the 1st embodiment. Therefore, an explanation in this regard will not be provided again.

| 8th Embodiment | | | | |
|---|---|---|---|---|
| |f/Rf| + |f/Rr| | |f/R1| + |f/R2| | 4.14 | |f/Rf| + |f/Rr| | |f/R9| + |f/R10| | 0.59 |
| | |f/R3| + |f/R4| | 2.91 | |f/R11| + |f/R12| | 3.37 |
| | |f/R5| + |f/R6| | 2.69 | |f/R13| + |f/R14| | 0.34 |
| | |f/R7| + |f/R8| | 2.06 | |f/R15| + |f/R16| | 5.36 |

In the 8th embodiment, each of four of the first lens element 810, the second lens element 820, the third lens element 830, the fourth lens element 840, the fifth lens element 850, the sixth lens element 860, the seventh lens element 870, and the eighth lens element 880 has an Abbe number smaller than 24.0, 23.0 and 20; in detail, the four lens elements are the first lens element 810, the third lens element 830, the fifth lens element 850 and the seventh lens element 870.

In the 8th embodiment, the numbers of the inflection points of object-side surfaces and image-side surfaces of the first lens element 810, the second lens element 820, the third lens element 830, the fourth lens element 840, the fifth lens element 850, the sixth lens element 860, the seventh lens element 870, and the eighth lens element 880 are listed in the table below. Moreover, in the 8th embodiment, a total number of inflection points on the object-side surfaces and the image-side surfaces of all the lens elements of the image capturing optical assembly is Ninf., the following condition is satisfied: Ninf.=26.

| 8th Embodiment - numbers of the inflection points | | | | | | | | |
|---|---|---|---|---|---|---|---|---|
| | 810 | 820 | 830 | 840 | 850 | 860 | 870 | 880 |
| Object-side surface | 1 | 2 | 2 | 1 | 1 | 2 | 2 | 3 |
| Image-side surface | 1 | 2 | 0 | 1 | 2 | 2 | 2 | 2 |

9th Embodiment

Figure 17:
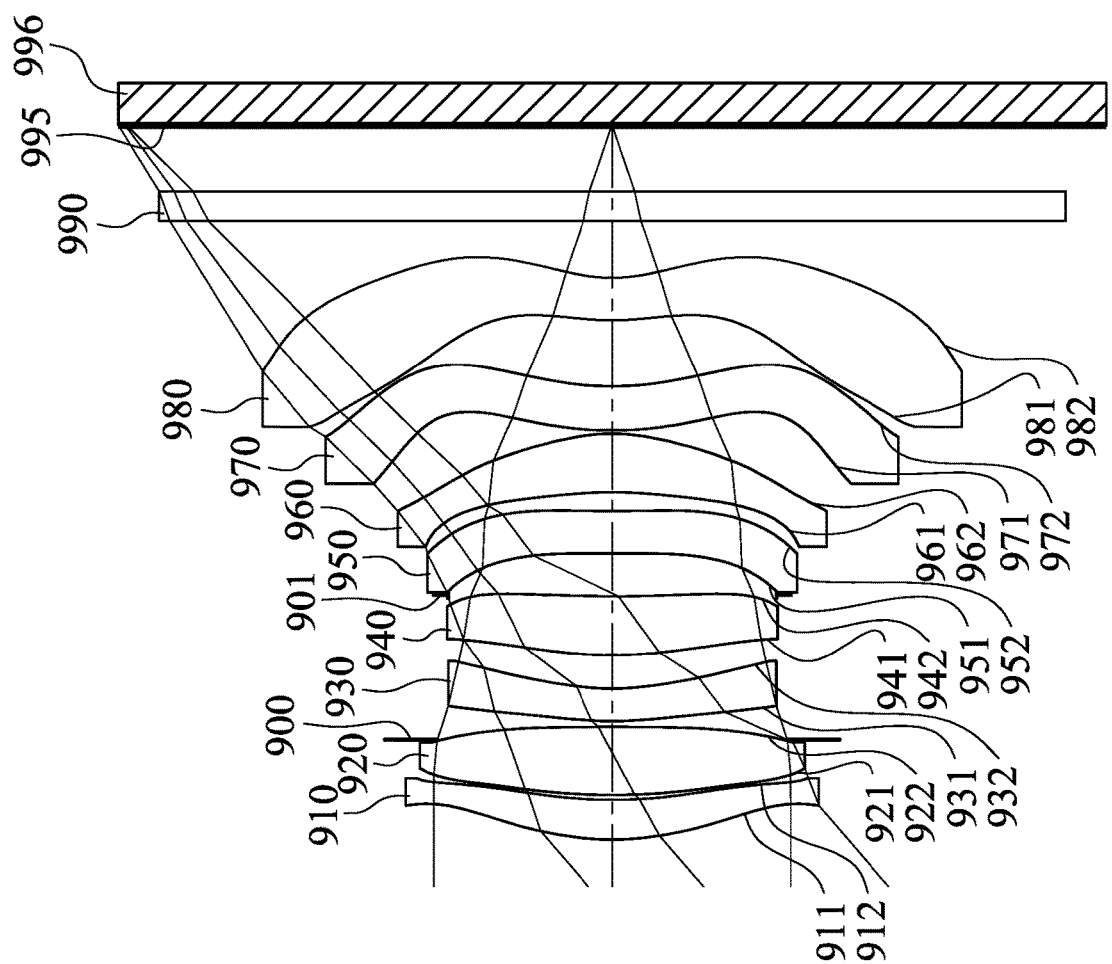
FIG. 17 is a schematic view of an imaging apparatus according to the 9th embodiment of the present disclosure.
Figure 18:
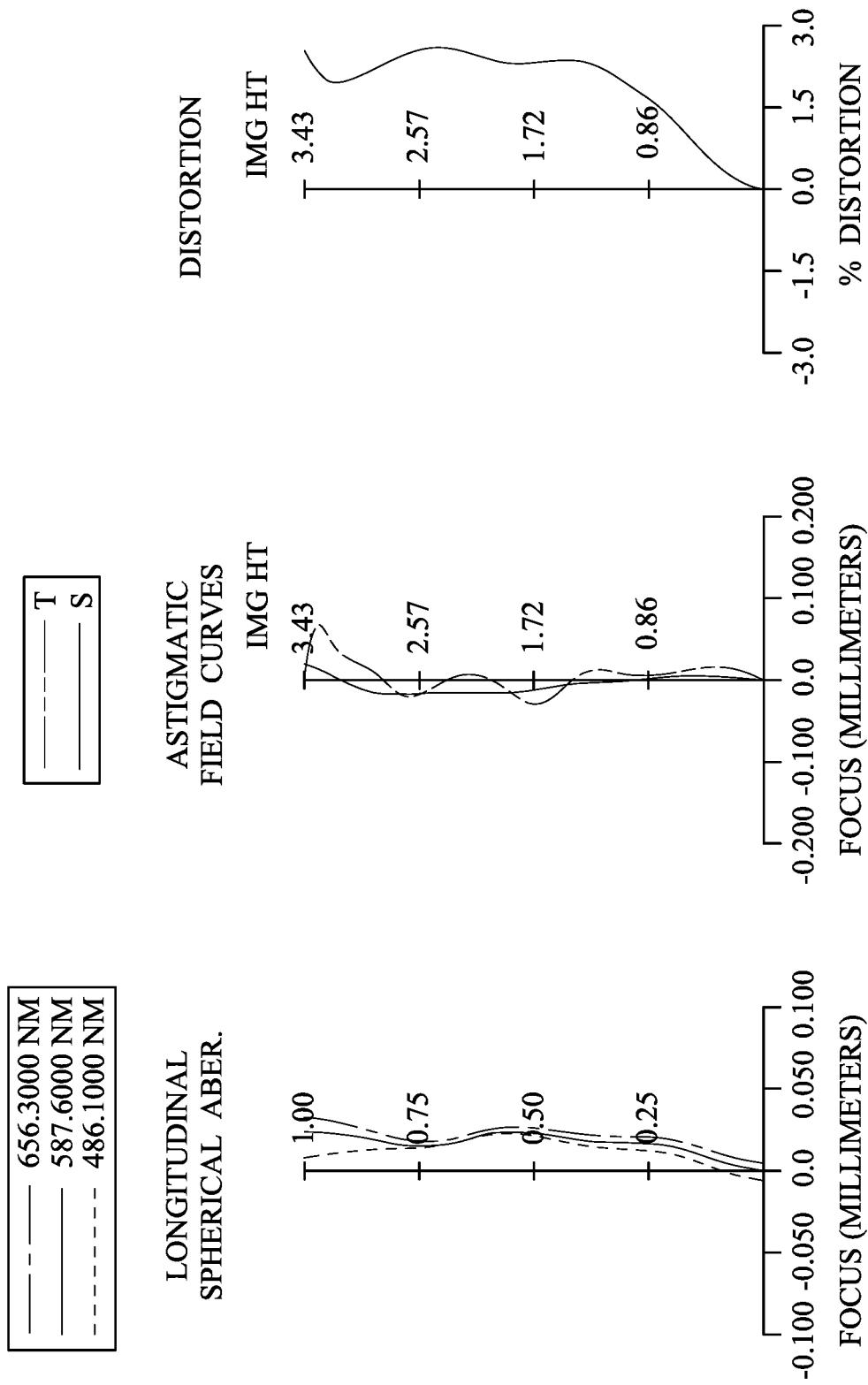
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an image capturing optical assembly (its reference numeral is omitted) and an image sensor 996. The image capturing optical assembly includes, in order from an object side to an image side, a first lens element 910, a second lens element 920, an aperture stop 900, a third lens element 930, a fourth lens element 940, a stop 901, a fifth lens element 950, a sixth lens element 960, a seventh lens element 970, an eighth lens element 980, a filter 990 and an image surface 995, wherein the image sensor 996 is disposed on the image surface 995 of the image capturing optical assembly. The image capturing optical assembly includes eight lens elements (910, 920, 930, 940, 950, 960, 970 and 980) without additional one or more lens elements inserted between the first lens element 910 and the eighth lens element 980, and there is an air gap in a paraxial region between every adjacent lens elements of the image capturing optical assembly. The first lens element 910 and the second lens element 920 belong to a first lens group (its reference numeral is omitted). The third lens element 930, the fourth lens element 940 and the fifth lens element 950 belong to a second lens group (its reference numeral is omitted). The sixth lens element 960, the seventh lens element 970 and the eighth lens element 980 belong to a third lens group (its reference numeral is omitted).

The first lens element 910 with positive refractive power has an object-side surface 911 being convex and an image-side surface 912 being concave. The first lens element 910 is made of a plastic material, and has the object-side surface 911 and the image-side surface 912 being both aspheric. Furthermore, each of the object-side surface 911 and the image-side surface 912 of the first lens element 910 includes at least one inflection point.

The second lens element 920 with positive refractive power has an object-side surface 921 being convex and an image-side surface 922 being convex. The second lens element 920 is made of a plastic material, and has the object-side surface 921 and the image-side surface 922 being both aspheric. Furthermore, the object-side surface 921 of the second lens element 920 includes at least one inflection point.

The third lens element 930 with negative refractive power has an object-side surface 931 being convex and an image-side surface 932 being concave. The third lens element 930 is made of a plastic material, and has the object-side surface 931 and the image-side surface 932 being both aspheric. Furthermore, the object-side surface 931 of the third lens element 930 includes at least one inflection point.

The fourth lens element 940 with positive refractive power has an object-side surface 941 being convex and an image-side surface 942 being concave. The fourth lens element 940 is made of a plastic material, and has the object-side surface 941 and the image-side surface 942 being both aspheric. Furthermore, each of the object-side surface 941 and the image-side surface 942 of the fourth lens element 940 includes at least one inflection point.

The fifth lens element 950 with negative refractive power has an object-side surface 951 being convex and an image-side surface 952 being concave. The fifth lens element 950 is made of a plastic material, and has the object-side surface 951 and the image-side surface 952 being both aspheric. Furthermore, each of the object-side surface 951 and the image-side surface 952 of the fifth lens element 950 includes at least one inflection point.

The sixth lens element 960 with positive refractive power has an object-side surface 961 being concave and an image-side surface 962 being convex. The sixth lens element 960 is made of a plastic material, and has the object-side surface 961 and the image-side surface 962 being both aspheric. Furthermore, the image-side surface 962 of the sixth lens element 960 includes at least one inflection point.

The seventh lens element 970 with negative refractive power has an object-side surface 971 being convex and an image-side surface 972 being concave. The seventh lens element 970 is made of a plastic material, and has the object-side surface 971 and the image-side surface 972 being both aspheric. Furthermore, each of the object-side surface 971 and the image-side surface 972 of the seventh lens element 970 includes at least one inflection point and at least one critical point.

The eighth lens element 980 with negative refractive power has an object-side surface 981 being convex and an image-side surface 982 being concave. The eighth lens element 980 is made of a plastic material, and has the object-side surface 981 and the image-side surface 982 being both aspheric. Furthermore, each of the object-side surface 981 and the image-side surface 982 of the eighth lens element 980 includes at least one inflection point and at least one critical point.

The filter 990 is made of a glass material and located between the eighth lens element 980 and the image surface 995, and will not affect the focal length of the image capturing optical assembly.

The detailed optical data of the 9th embodiment are shown in Table 17 and the aspheric surface data are shown in Table 18 below.

TABLE 17

9th Embodiment
f = 3.86 mm, Fno = 1.53, HFOV = 40.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.151 | ASP | 0.280 | Plastic | 1.545 | 56.0 | 8.82 |
| 2 | | 3.716 | ASP | 0.036 | | | | |
| 3 | Lens 2 | 5.716 | ASP | 0.479 | Plastic | 1.545 | 56.0 | 9.81 |
| 4 | | −79.920 | ASP | −0.091 | | | | |
| 5 | Ape. Stop | Plano | | 0.131 | | | | |
| 6 | Lens 3 | 2.789 | ASP | 0.230 | Plastic | 1.671 | 19.5 | −11.13 |
| 7 | | 1.963 | ASP | 0.239 | | | | |
| 8 | Lens 4 | 3.469 | ASP | 0.416 | Plastic | 1.544 | 56.0 | 9.96 |
| 9 | | 9.240 | ASP | 0.008 | | | | |
| 10 | Stop | Plano | | 0.294 | | | | |
| 11 | Lens 5 | 289.494 | ASP | 0.300 | Plastic | 1.671 | 19.5 | −15.58 |
| 12 | | 10.084 | ASP | 0.131 | | | | |
| 13 | Lens 6 | −4.209 | ASP | 0.412 | Plastic | 1.544 | 56.0 | 3.81 |
| 14 | | −1.436 | ASP | 0.025 | | | | |
| 15 | Lens 7 | 3.218 | ASP | 0.311 | Plastic | 1.671 | 19.5 | −13.45 |
| 16 | | 2.280 | ASP | 0.468 | | | | |
| 17 | Lens 8 | 1.955 | ASP | 0.300 | Plastic | 1.544 | 56.0 | −5.14 |
| 18 | | 1.089 | ASP | 0.400 | | | | |
| 19 | Filter | Plano | | 0.210 | Plastic | 1.544 | 56.0 | — |
| 20 | | Plano | | 0.464 | | | | |
| 21 | Image | Plano | | — | | | | |

Reference wavelength is 587.6 nm (d-line).
Effective radius of the stop on Surface 10 is 1.160 mm.

TABLE 18

Aspheric Coefficients

| Surface # | 1 | 2 | 3 | 4 | 6 | 7 |
|---|---|---|---|---|---|---|
| k = | −8.9343E−01 | −2.3345E+00 | 4.5756E+00 | −9.0000E+01 | −4.0185E+01 | −1.2107E+01 |
| A4 = | 3.8950E−04 | 1.0493E−01 | 1.2733E−01 | −7.9076E−02 | −1.0115E−02 | 1.6090E−02 |
| A6 = | −6.2198E−02 | −3.2556E−01 | −3.3020E−01 | 7.5898E−02 | −1.0082E−01 | −6.9715E−02 |
| A8 = | 7.4568E−02 | 2.9849E−01 | 3.0684E−01 | −6.2072E−02 | 2.2283E−01 | 8.9668E−02 |
| A10 = | −6.8450E−02 | −1.2902E−01 | −1.3107E−01 | 2.5707E−02 | −2.0970E−01 | −4.8533E−02 |
| A12 = | 2.7613E−02 | 2.2641E−02 | 2.2766E−02 | −4.0658E−03 | 1.0351E−01 | 4.0565E−03 |
| A14 = | −3.8984E−03 | | | | −2.1910E−02 | 4.2449E−03 |

| Surface # | 8 | 9 | 11 | 12 | 13 | 14 |
|---|---|---|---|---|---|---|
| k = | −8.4956E+00 | 2.0174E+01 | 4.2796E+01 | 5.0020E+01 | 9.0278E+00 | −1.2769E+00 |
| A4 = | 1.0368E−02 | −2.6874E−02 | −1.9191E−01 | −3.4442E−01 | −3.0802E−01 | 1.8294E−01 |
| A6 = | −5.3904E−02 | −3.8909E−02 | 2.2513E−01 | 9.4401E−01 | 1.6535E+00 | −1.5725E−01 |
| A8 = | 7.2664E−02 | 3.5918E−02 | −6.7260E−01 | −2.0258E+00 | −3.2859E+00 | 1.0542E−01 |
| A10 = | −9.3110E−02 | −3.3080E−02 | 1.0847E+00 | 2.2812E+00 | 3.3697E+00 | −1.0842E−01 |
| A12 = | 4.7107E−02 | −9.8007E−03 | −8.8028E−01 | −1.3709E+00 | −1.9098E+00 | 7.3005E−02 |
| A14 = | −5.3997E−03 | 1.0043E−02 | 3.2943E−01 | 4.1296E−01 | 5.6896E−01 | −2.1593E−02 |
| A16 = | | | −4.2575E−02 | −4.8647E−02 | −7.0189E−02 | 2.1925E−03 |

| Surface# | 15 | 16 | 17 | 18 |
|---|---|---|---|---|
| k = | −5.6433E−01 | −8.3566E+00 | −6.0580E+00 | −5.2650E+00 |
| A4 = | 2.3101E−01 | 8.2653E−02 | −4.8461E−01 | −2.4576E−01 |
| A6 = | −6.2576E−01 | −2.0036E−01 | 4.4529E−01 | 1.6291E−01 |
| A8 = | 7.3086E−01 | 1.4729E−01 | −4.7691E−01 | −9.6450E−02 |
| A10 = | −5.9360E−01 | −7.0438E−02 | 3.9168E−01 | 4.3144E−02 |

TABLE 18-continued

| Aspheric Coefficients | | | | |
|---|---|---|---|---|
| A12 = | 3.2195E−01 | 2.0545E−02 | −1.9931E−01 | −1.2142E−02 |
| A14 = | −1.1330E−01 | −3.1913E−03 | 6.2121E−02 | 1.9595E−03 |
| A16 = | 2.3354E−02 | 2.0176E−04 | −1.1651E−02 | −1.5725E−04 |
| A18 = | −2.0933E−03 | | 1.2100E−03 | 3.2002E−06 |
| A20 = | | | −5.3445E−05 | 1.8901E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.86 | \|f/f\|max | 1.01 |
| Fno | 1.53 | (f/f2) + (f/f3) | 0.05 |
| HFOV [deg] | 40.9 | CTf [mm] | 0.21 |
| Nmax | 1.671 | TL [mm] | 5.04 |
| Nmin | 1.544 | TL/f | 1.31 |
| (V2 + V6)/V1 | 2.00 | TL/ImgH | 1.47 |
| \|(V2 − V3)/(V4 − V5)\| | 1.00 | SD/TD | 0.82 |
| (V4 + V5 + V6)/V1 | 2.35 | Y11/Y82 | 0.59 |
| ATmax/CTmin | 2.03 | HFOV × EPD/f | 26.71 |
| ATmax/ImgH | 0.14 | TL/ImgH + f/EPD | 3.00 |
| (R11 − R12)/(R11 + R12) | 0.49 | TL^2/(ImgH × EPD) | 2.94 |
| f/R16 | 3.54 | f/fG1 | 0.81 |
| EPD/ΣCT | 0.92 | f/fG2 | −0.21 |
| EPD/BL | 2.35 | f/fG3 | 0.21 |
| TL/EPD | 2.00 | Yc71/f | 0.26 |
| f/EPD | 1.53 | Yc72/f | 0.29 |
| f1/f2 | 0.90 | Yc81/f | 0.15 |
| f/f2 | 0.39 | Yc82/f | 0.25 |

In the image capturing optical assembly according to the 9th embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 910 through the eighth lens element 980 is stated in the following table, wherein term definitions of the parameters related to each surface of the lens elements are the same as those of the 1st embodiment. Therefore, an explanation in this regard will not be provided again.

| 9th Embodiment | | | | |
|---|---|---|---|---|
| \|f/Rf\| + \|f/Rr\| | \|f/R1\| + \|f/R2\| | 2.83 | \|f/Rf\| + \|f/Rr\| \|f/R9\| + \|f/R10\| | 0.40 |
| | \|f/R3\| + \|f/R4\| | 0.72 | \|f/R11\| + \|f/R12\| | 3.60 |
| | \|f/R5\| + \|f/R6\| | 3.35 | \|f/R13\| + \|f/R14\| | 2.89 |
| | \|f/R7\| + \|f/R8\| | 1.53 | \|f/R15\| + \|f/R16\| | 5.51 |

In the 9th embodiment, each of three of the first lens element 910, the second lens element 920, the third lens element 930, the fourth lens element 940, the fifth lens element 950, the sixth lens element 960, the seventh lens element 970, and the eighth lens element 980 has an Abbe number smaller than 24.0, 23.0 and 20; in detail, the three lens elements are the third lens element 930, the fifth lens element 950 and the seventh lens element 970.

In the 9th embodiment, the numbers of the inflection points of object-side surfaces and image-side surfaces of the first lens element 910, the second lens element 920, the third lens element 930, the fourth lens element 940, the fifth lens element 950, the sixth lens element 960, the seventh lens element 970, and the eighth lens element 980 are listed in the table below. Moreover, in the 9th embodiment, a total number of inflection points on the object-side surfaces and the image-side surfaces of all the lens elements of the image capturing optical assembly is Ninf., the following condition is satisfied: Ninf.=26.

| 9th Embodiment - numbers of the inflection points | | | | | | | | |
|---|---|---|---|---|---|---|---|---|
| | 910 | 920 | 930 | 940 | 950 | 960 | 970 | 980 |
| Object-side surface | 1 | 2 | 3 | 2 | 1 | 0 | 3 | 4 |
| Image-side surface | 2 | 0 | 0 | 1 | 1 | 2 | 2 | 2 |

10th Embodiment

Figure 19:
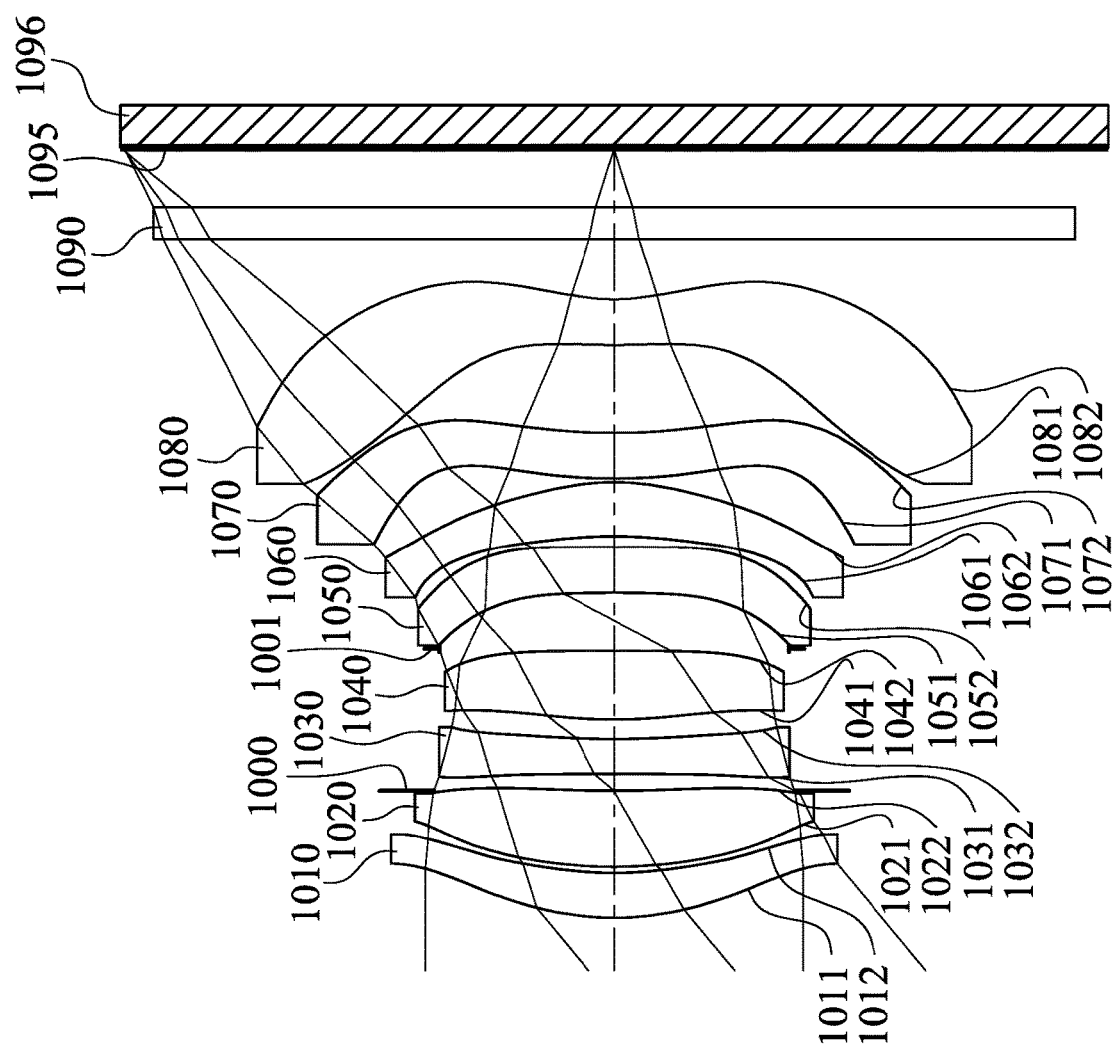
FIG. 19 is a schematic view of an imaging apparatus according to the 10th embodiment of the present disclosure.
Figure 20:
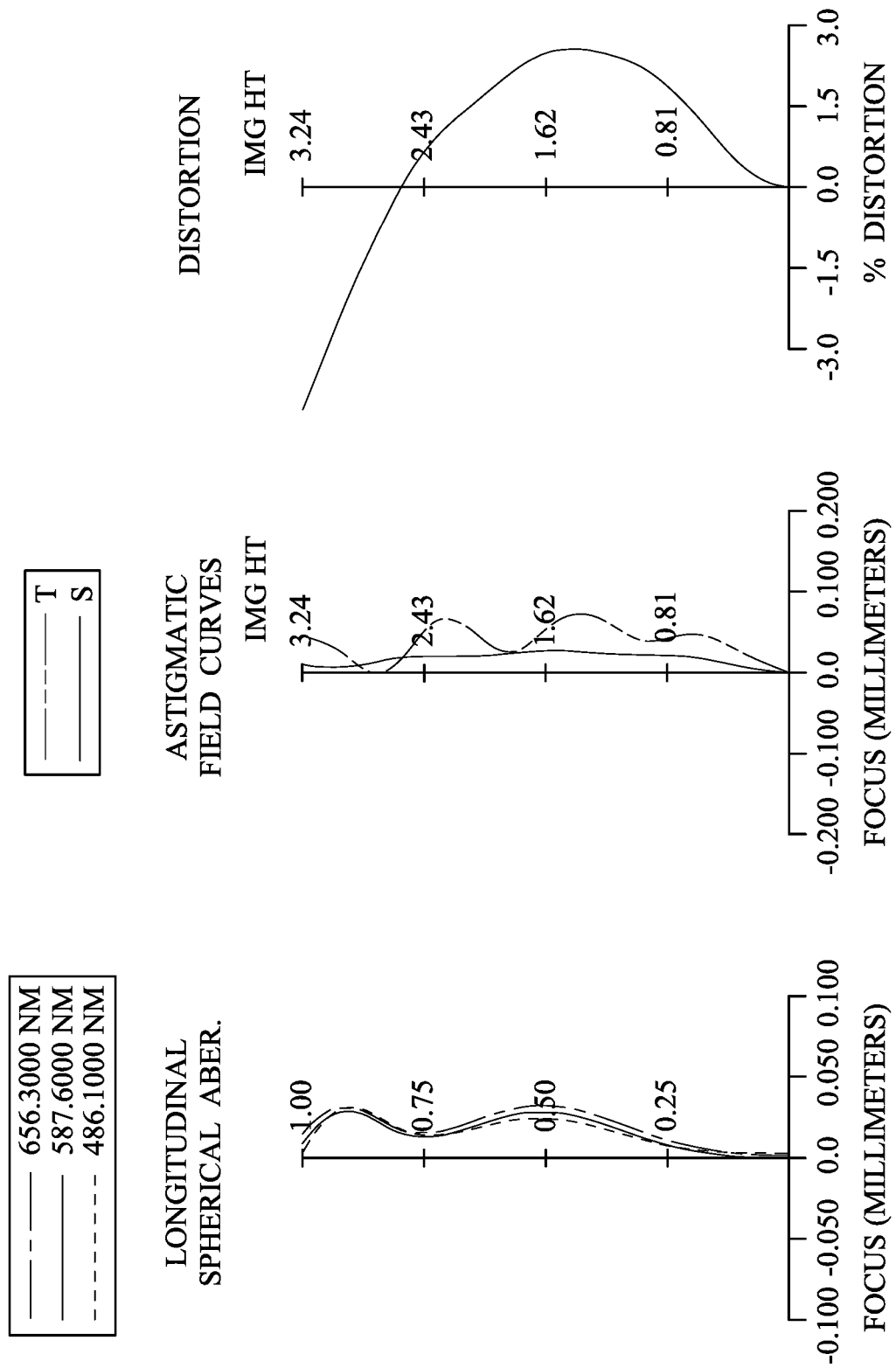
FIG. 20 shows spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes an image capturing optical assembly (its reference numeral is omitted) and an image sensor 1096. The image capturing optical assembly includes, in order from an object side to an image side, a first lens element 1010, a second lens element 1020, an aperture stop 1000, a third lens element 1030, a fourth lens element 1040, a stop 1001, a fifth lens element 1050, a sixth lens element 1060, a seventh lens element 1070, an eighth lens element 1080, a filter 1090 and an image surface 1095, wherein the image sensor 1096 is disposed on the image surface 1095 of the image capturing optical assembly. The image capturing optical assembly includes eight lens elements (1010, 1020, 1030, 1040, 1050, 1060, 1070 and 1080) without additional one or more lens elements inserted between the first lens element 1010 and the eighth lens element 1080, and there is an air gap in a paraxial region between every adjacent lens elements of the image capturing optical assembly. The first lens element 1010 and the second lens element 1020 belong to a first lens group (its reference numeral is omitted). The third lens element 1030, the fourth lens element 1040 and the fifth lens element 1050 belong to a second lens group (its reference numeral is omitted). The sixth lens element 1060, the seventh lens element 1070 and the eighth lens element 1080 belong to a third lens group (its reference numeral is omitted).

The first lens element 1010 with positive refractive power has an object-side surface 1011 being convex and an image-side surface 1012 being concave. The first lens element 1010 is made of a plastic material, and has the object-side surface 1011 and the image-side surface 1012 being both aspheric. Furthermore, each of the object-side surface 1011 and the image-side surface 1012 of the first lens element 1010 includes at least one inflection point.

The second lens element 1020 with positive refractive power has an object-side surface 1021 being convex and an image-side surface 1022 being concave. The second lens element 1020 is made of a plastic material, and has the object-side surface 1021 and the image-side surface 1022 being both aspheric. Furthermore, each of the object-side surface 1021 and the image-side surface 1022 of the second lens element 1020 includes at least one inflection point.

The third lens element 1030 with negative refractive power has an object-side surface 1031 being concave and an image-side surface 1032 being concave. The third lens element 1030 is made of a plastic material, and has the object-side surface 1031 and the image-side surface 1032 being both aspheric. Furthermore, the object-side surface 1031 of the third lens element 1030 includes at least one inflection point.

The fourth lens element 1040 with positive refractive power has an object-side surface 1041 being convex and an image-side surface 1042 being convex. The fourth lens element 1040 is made of a plastic material, and has the object-side surface 1041 and the image-side surface 1042 being both aspheric. Furthermore, the object-side surface 1041 of the fourth lens element 1040 includes at least one inflection point.

The fifth lens element 1050 with negative refractive power has an object-side surface 1051 being concave and an image-side surface 1052 being concave. The fifth lens element 1050 is made of a plastic material, and has the object-side surface 1051 and the image-side surface 1052 being both aspheric. Furthermore, the image-side surface 1052 of the fifth lens element 1050 includes at least one inflection point.

The sixth lens element 1060 with positive refractive power has an object-side surface 1061 being concave and an image-side surface 1062 being convex. The sixth lens element 1060 is made of a plastic material, and has the object-side surface 1061 and the image-side surface 1062 being both aspheric. Furthermore, the image-side surface 1062 of the sixth lens element 1060 includes at least one inflection point.

The seventh lens element 1070 with negative refractive power has an object-side surface 1071 being convex and an image-side surface 1072 being concave. The seventh lens element 1070 is made of a plastic material, and has the object-side surface 1071 and the image-side surface 1072 being both aspheric. Furthermore, each of the object-side surface 1071 and the image-side surface 1072 of the seventh lens element 1070 includes at least one inflection point and at least one critical point.

The eighth lens element 1080 with negative refractive power has an object-side surface 1081 being convex and an image-side surface 1082 being concave. The eighth lens element 1080 is made of a plastic material, and has the object-side surface 1081 and the image-side surface 1082 being both aspheric. Furthermore, each of the object-side surface 1081 and the image-side surface 1082 of the eighth lens element 1080 includes at least one inflection point and at least one critical point.

The filter 1090 is made of a glass material and located between the eighth lens element 1080 and the image surface 1095, and will not affect the focal length of the image capturing optical assembly.

The detailed optical data of the 10th embodiment are shown in Table 19 and the aspheric surface data are shown in Table 20 below.

TABLE 19

10th Embodiment
f = 4.06 mm, Fno = 1.63, HFOV = 39.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.959 ASP | 0.297 | Plastic | 1.545 | 56.0 | 10.67 |
| 2 | | 2.798 ASP | 0.039 | | | | |
| 3 | Lens 2 | 3.026 ASP | 0.506 | Plastic | 1.545 | 56.0 | 7.69 |
| 4 | | 10.258 ASP | −0.002 | | | | |
| 5 | Ape. Stop | Plano | 0.111 | | | | |
| 6 | Lens 3 | −1041.667 ASP | 0.230 | Plastic | 1.671 | 19.5 | −8.72 |
| 7 | | 5.881 ASP | 0.129 | | | | |
| 8 | Lens 4 | 3.602 ASP | 0.451 | Plastic | 1.544 | 56.0 | 6.16 |
| 9 | | −46.484 ASP | 0.013 | | | | |
| 10 | Stop | Plano | 0.371 | | | | |
| 11 | Lens 5 | −12.365 ASP | 0.300 | Plastic | 1.660 | 20.4 | −8.98 |
| 12 | | 11.485 ASP | 0.071 | | | | |
| 13 | Lens 6 | −4.230 ASP | 0.358 | Plastic | 1.544 | 56.0 | 4.58 |
| 14 | | −1.614 ASP | 0.025 | | | | |
| 15 | Lens 7 | 4.798 ASP | 0.300 | Plastic | 1.671 | 19.5 | −373.64 |
| 16 | | 4.590 ASP | 0.578 | | | | |
| 17 | Lens 8 | 4.266 ASP | 0.300 | Plastic | 1.544 | 56.0 | −3.65 |
| 18 | | 1.320 ASP | 0.400 | | | | |
| 19 | Filter | Plano | 0.210 | Plastic | 1.544 | 56.0 | — |
| 20 | | Plano | 0.393 | | | | |
| 21 | Image | Plano | — | | | | |

Reference wavelength is 587.6 nm (d-line).
Effective radius of the stop on Surface 10 is 1.150 mm.

TABLE 20

Aspheric Coefficients

| Surface # | 1 | 2 | 3 | 4 | 6 | 7 |
|---|---|---|---|---|---|---|
| k = | −6.0556E−01 | −8.4455E−01 | 2.1571E+00 | 5.9390E+01 | 9.0000E+01 | −3.2646E+01 |
| A4 = | −8.3741E−03 | −2.6501E−02 | −2.8003E−02 | −2.6517E−02 | −2.4209E−02 | −4.2746E−02 |
| A6 = | −1.6417E−02 | −4.6885E−02 | −2.3213E−02 | −3.1824E−02 | −4.5232E−02 | 2.6258E−02 |
| A8 = | 8.4071E−03 | 1.1271E−01 | 8.2872E−02 | −4.5687E−03 | 8.1980E−02 | −5.5389E−02 |
| A10 = | −1.0182E−02 | −7.5986E−02 | −4.8074E−02 | 2.3180E−02 | −5.1736E−02 | 1.4472E−01 |
| A12 = | 2.5311E−03 | 1.5785E−02 | 5.9742E−03 | −9.8772E−03 | 2.1854E−02 | −1.3090E−01 |
| A14 = | 6.9747E−05 | | | | −4.0277E−03 | 4.6522E−02 |

| Surface # | 8 | 9 | 11 | 12 | 13 | 14 |
|---|---|---|---|---|---|---|
| k = | −1.6787E+01 | 9.0000E+01 | 4.2796E+01 | −2.1561E+01 | 9.2270E+00 | −1.1971E+00 |
| A4 = | −2.0063E−02 | −1.7117E−02 | −1.8856E−01 | −3.6612E−01 | −2.6363E−01 | 2.1795E−01 |
| A6 = | −4.6782E−02 | −9.7268E−02 | 8.1209E−02 | 9.3632E−01 | 1.4858E+00 | −3.5621E−01 |
| A8 = | 3.2844E−02 | 1.2930E−01 | −9.9971E−02 | −2.0270E+00 | −3.2684E+00 | 4.2151E−01 |
| A10 = | −3.8924E−02 | −1.6023E−01 | −1.1909E−02 | 2.2815E+00 | 3.7290E+00 | −3.2367E−01 |
| A12 = | 2.5612E−02 | 9.9797E−02 | 1.5529E−01 | −1.3704E+00 | −2.3479E+00 | 1.4055E−01 |
| A14 = | −3.0798E−03 | −2.4716E−02 | −1.4019E−01 | 4.1330E−01 | 7.7303E−01 | −3.0273E−02 |
| A16 = | | | 4.0116E−02 | −4.8441E−02 | −1.0435E−01 | 2.4202E−03 |

| Surface # | 15 | 16 | 17 | 18 |
|---|---|---|---|---|
| k = | −2.1723E+00 | −1.4325E+01 | −6.8662E+00 | −7.1427E+00 |
| A4 = | 2.3237E−01 | 9.1735E−02 | −4.5860E−01 | −2.0920E−01 |
| A6 = | −6.1880E−01 | −1.9923E−01 | 3.0887E−01 | 1.1355E−01 |
| A8 = | 7.2908E−01 | 1.4721E−01 | −2.0552E−01 | −3.8589E−02 |
| A10 = | −5.9410E−01 | −7.0472E−02 | 1.2280E−01 | 2.5904E−03 |
| A12 = | 3.2192E−01 | 2.0536E−02 | −4.9033E−02 | 4.0231E−03 |
| A14 = | −1.1330E−01 | −3.1933E−03 | 1.2089E−02 | −1.9055E−03 |
| A16 = | 2.3351E−02 | 2.0136E−04 | −1.7803E−03 | 4.0270E−04 |
| A18 = | −2.0978E−03 | | 1.4424E−04 | −4.2922E−05 |
| A20 = | | | −4.9635E−06 | 1.8691E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 10th embodiment, so an explanation in this regard will not be provided again.

Moreover, these parameters can be calculated from Table 19 and Table as the following values and satisfy the following conditions:

| 10th Embodiment | | | |
|---|---|---|---|
| f [mm] | 4.06 | \|f\|f\|max | 1.11 |
| Fno | 1.63 | (f/f2) + (f/f3) | 0.06 |
| HFOV [deg.] | 39.7 | CTf [mm] | 0.21 |
| Nmax | 1.671 | TL [mm] | 5.08 |
| Nmin | 1.544 | TL/f | 1.25 |
| (V2 + V6)/V1 | 2.00 | TL/ImgH | 1.57 |
| \|(V2 − V3)/(V4 − V5)\| | 1.03 | SD/TD | 0.79 |
| (V4 + V5 + V6)/V1 | 2.36 | Y11/Y82 | 0.62 |
| ATmax/CTmin | 2.51 | HFOV × EPD/f | 24.34 |
| ATmax/ImgH | 0.18 | TL/ImgH + f/EPD | 3.20 |
| (R11 − R12)/(R11 + R12) | 0.45 | TL^2/(ImgH × EPD) | 3.20 |
| f/R16 | 3.07 | f/fG1 | 0.88 |
| EPD/ΣCT | 0.91 | f/fG2 | −0.24 |
| EPD/BL | 2.48 | f/fG3 | 0.04 |
| TL/EPD | 2.04 | Yc71/f | 0.23 |
| f/EPD | 1.63 | Yc72/f | 0.25 |
| f1/f2 | 1.39 | Yc81/f | 0.09 |
| f/f2 | 0.53 | Yc82/f | 0.23 |

In the image capturing optical assembly according to the 10th embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 1010 through the eighth lens element 1080 is stated in the following table, wherein term definitions of the parameters related to each surface of the lens elements are the same as those of the 1st embodiment. Therefore, an explanation in this regard will not be provided again.

| 10th Embodiment | | | |
|---|---|---|---|
| \|f/Rf\| + \|f/Rr\| | \|f/R1\| + \|f/R2\| | 3.52 | \|f/Rf\| + \|f/Rr\| | \|f/R9\| + \|f/R10\| | 0.68 |
| | \|f/R3\| + \|f/R4\| | 1.74 | | \|f/R11\| + \|f/R12\| | 3.47 |
| | \|f/R5\| + \|f/R6\| | 0.69 | | \|f/R13\| + \|f/R14\| | 1.73 |
| | \|f/R7\| + \|f/R8\| | 1.21 | | \|f/R15\| + \|f/R16\| | 4.02 |

In the 10th embodiment, each of three of the first lens element 1010, the second lens element 1020, the third lens element 1030, the fourth lens element 1040, the fifth lens element 1050, the sixth lens element 1060, the seventh lens element 1070, and the eighth lens element 1080 has an Abbe number smaller than 24.0 and 23.0; in detail, the three lens elements are the third lens element 1030, the fifth lens element 1050 and the seventh lens element 1070, wherein each of the Abbe numbers of the third lens element 1030 and the seventh lens element 1070 is smaller than 20.

In the 10th embodiment, the numbers of the inflection points of object-side surfaces and image-side surfaces of the first lens element 1010, the second lens element 1020, the third lens element 1030, the fourth lens element 1040, the fifth lens element 1050, the sixth lens element 1060, the seventh lens element 1070 and the eighth lens element 1080 are listed in the table below. Moreover, in the 10th embodiment, a total number of inflection points on the object-side surfaces and the image-side surfaces of all the lens elements of the image capturing optical assembly is Ninf., the following condition is satisfied: Ninf.=18.

| 10th Embodiment - numbers of the inflection points | | | | | | | | |
|---|---|---|---|---|---|---|---|---|
| | 1010 | 1020 | 1030 | 1040 | 1050 | 1060 | 1070 | 1080 |
| Object-side surface | 1 | 1 | 1 | 2 | 0 | 0 | 1 | 2 |
| Image-side surface | 2 | 1 | 0 | 0 | 2 | 2 | 1 | 2 |

11th Embodiment

Figure 21:
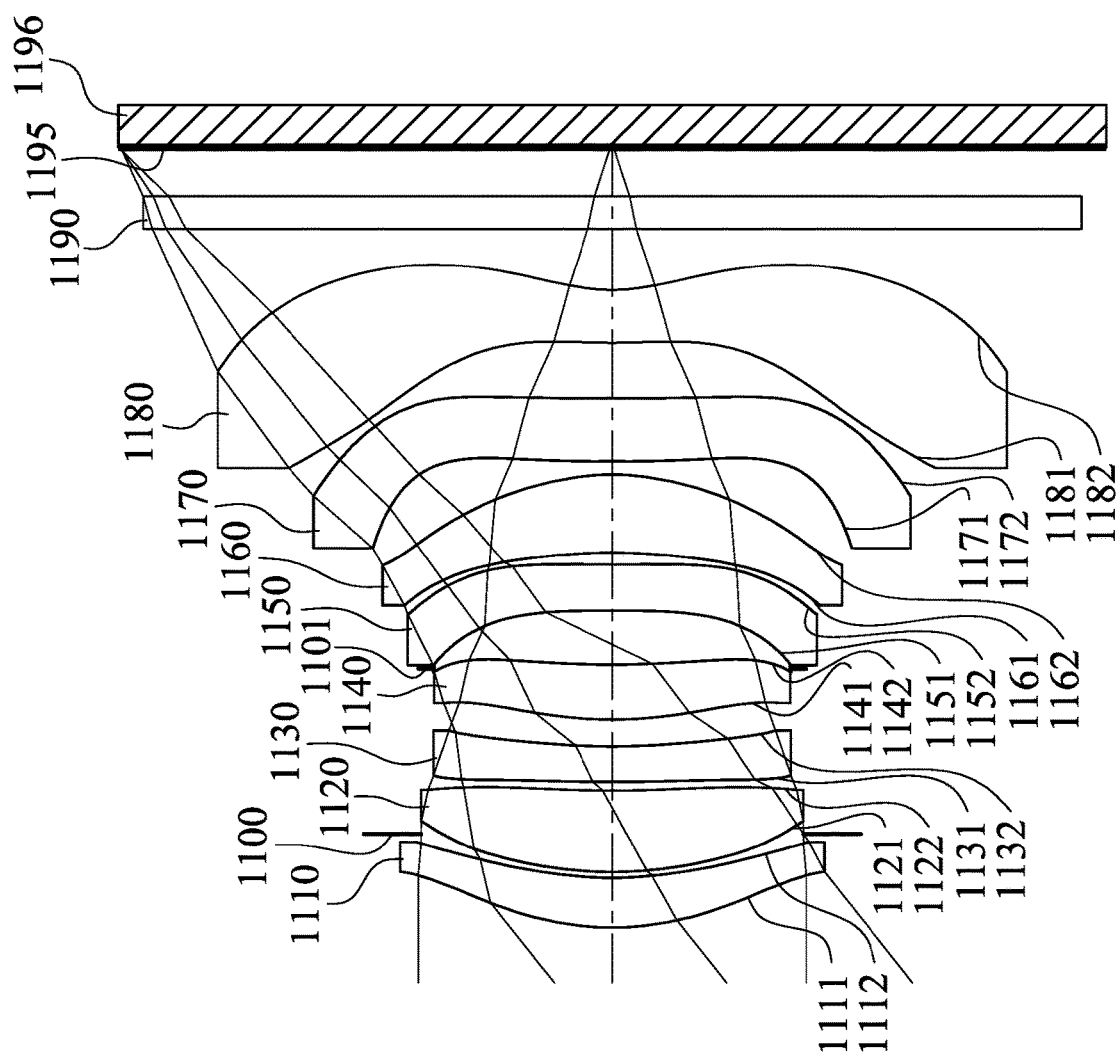
FIG. 21 is a schematic view of an imaging apparatus according to the 11th embodiment of the present disclosure.
Figure 22:
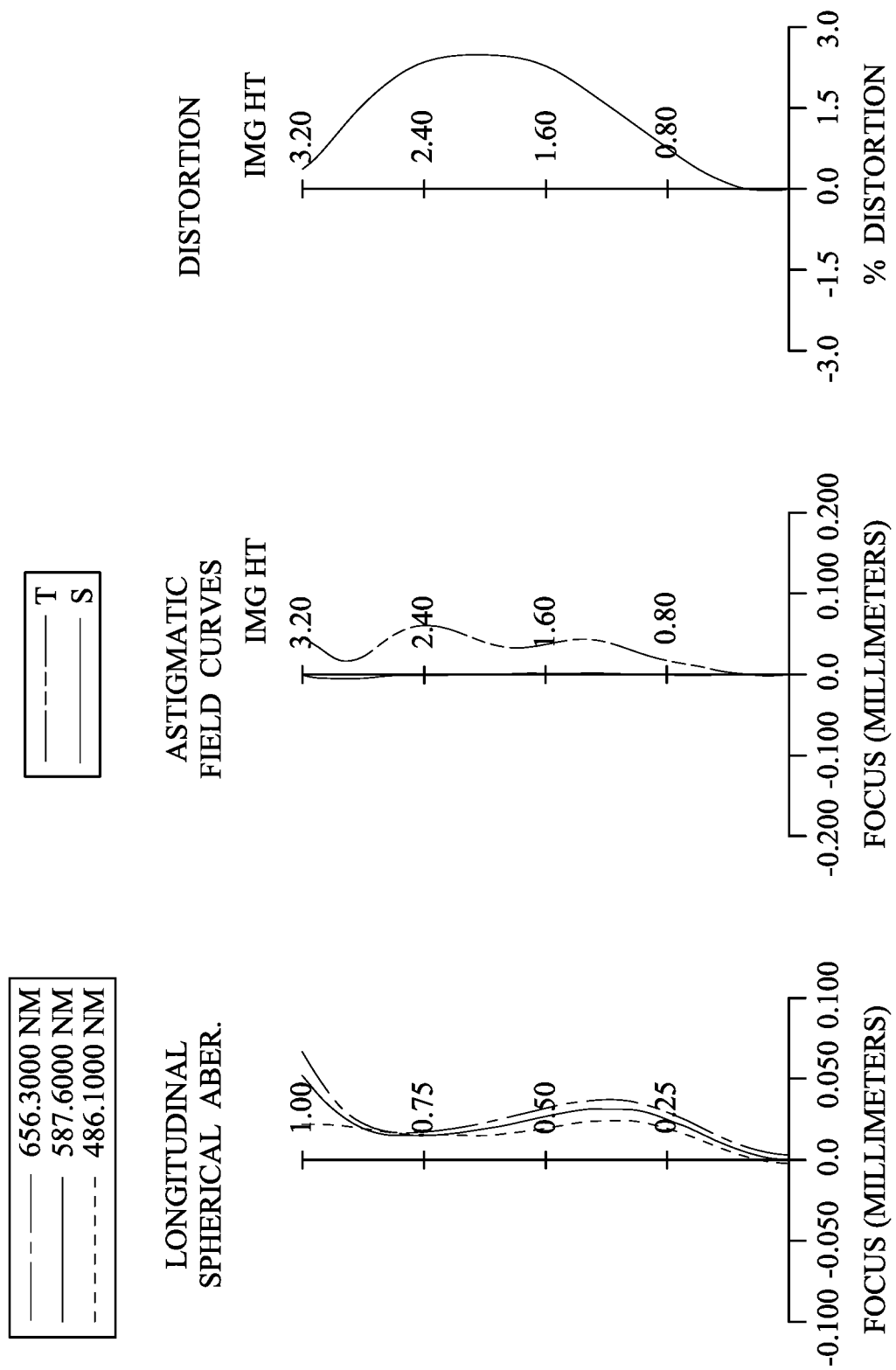
FIG. 22 shows spherical aberration curves, astigmatic field curves and a distortion curve of the imaging apparatus according to the 11th embodiment.

FIG. 21 is a schematic view of an imaging apparatus according to the 11th embodiment of the present disclosure. FIG. 22 shows spherical aberration curves, astigmatic field curves and a distortion curve of the imaging apparatus according to the 11th embodiment. In FIG. 21, the imaging apparatus includes an image capturing optical assembly (its reference numeral is omitted) and an image sensor 1196. The image capturing optical assembly includes, in order from an object side to an image side, a first lens element 1110, an aperture stop 1100, a second lens element 1120, a third lens element 1130, a fourth lens element 1140, a stop 1101, a fifth lens element 1150, a sixth lens element 1160, a seventh lens element 1170, an eighth lens element 1180, a filter 1190 and an image surface 1195, wherein the image sensor 1196 is disposed on the image surface 1195 of the image capturing optical assembly. The image capturing optical assembly includes eight lens elements (1110, 1120, 1130, 1140, 1150, 1160, 1170 and 1180) without additional one or more lens elements inserted between the first lens element 1110 and the eighth lens element 1180, and there is an air gap in a paraxial region between every adjacent lens elements of the image capturing optical assembly. The first lens element 1110 and the second lens element 1120 belong to a first lens group (its reference numeral is omitted). The third lens element 1130, the fourth lens element 1140 and the fifth lens element 1150 belong to a second lens group (its reference numeral is omitted). The sixth lens element 1160, the seventh lens element 1170 and the eighth lens element 1180 belong to a third lens group (its reference numeral is omitted).

The first lens element 1110 with positive refractive power has an object-side surface 1111 being convex and an image-side surface 1112 being concave. The first lens element 1110 is made of a plastic material, and has the object-side surface 1111 and the image-side surface 1112 being both aspheric. Furthermore, each of the object-side surface 1111 and the image-side surface 1112 of the first lens element 1110 includes at least one inflection point.

The second lens element 1120 with positive refractive power has an object-side surface 1121 being convex and an image-side surface 1122 being concave. The second lens element 1120 is made of a plastic material, and has the object-side surface 1121 and the image-side surface 1122 being both aspheric. Furthermore, each of the object-side surface 1121 and the image-side surface 1122 of the second lens element 1120 includes at least one inflection point.

The third lens element 1130 with negative refractive power has an object-side surface 1131 being convex and an image-side surface 1132 being concave. The third lens element 1130 is made of a plastic material, and has the object-side surface 1131 and the image-side surface 1132 being both aspheric. Furthermore, the object-side surface 1131 of the third lens element 1130 includes at least one inflection point.

The fourth lens element 1140 with positive refractive power has an object-side surface 1141 being convex and an image-side surface 1142 being concave. The fourth lens element 1140 is made of a plastic material, and has the object-side surface 1141 and the image-side surface 1142 being both aspheric. Furthermore, each of the object-side surface 1141 and the image-side surface 1142 of the fourth lens element 1140 includes at least one inflection point.

The fifth lens element 1150 with negative refractive power has an object-side surface 1151 being concave and an image-side surface 1152 being concave. The fifth lens element 1150 is made of a plastic material, and has the object-side surface 1151 and the image-side surface 1152 being both aspheric. Furthermore, the image-side surface 1152 of the fifth lens element 1150 includes at least one inflection point.

The sixth lens element 1160 with positive refractive power has an object-side surface 1161 being concave and an image-side surface 1162 being convex. The sixth lens element 1160 is made of a plastic material, and has the object-side surface 1161 and the image-side surface 1162 being both aspheric. Furthermore, the image-side surface 1162 of the sixth lens element 1160 includes at least one inflection point.

The seventh lens element 1170 with positive refractive power has an object-side surface 1171 being concave and an image-side surface 1172 being convex. The seventh lens element 1170 is made of a plastic material, and has the object-side surface 1171 and the image-side surface 1172 being both aspheric. Furthermore, each of the object-side surface 1171 and the image-side surface 1172 of the seventh lens element 1170 includes at least one inflection point and at least one critical point.

The eighth lens element 1180 with negative refractive power has an object-side surface 1181 being convex and an image-side surface 1182 being concave. The eighth lens element 1180 is made of a plastic material, and has the object-side surface 1181 and the image-side surface 1182 being both aspheric. Furthermore, each of the object-side surface 1181 and the image-side surface 1182 of the eighth lens element 1180 includes at least one inflection point and at least one critical point.

The filter 1190 is made of a glass material and located between the eighth lens element 1180 and the image surface 1195, and will not affect the focal length of the image capturing optical assembly.

The detailed optical data of the 11th embodiment are shown in Table 21 and the aspheric surface data are shown in Table 22 below.

TABLE 21

11th Embodiment
f = 3.98 mm, Fno = 1.58, HFOV = 38.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.906 | ASP | 0.324 | Plastic | 1.530 | 55.8 | 10.46 |
| 2 | | 2.733 | ASP | 0.288 | | | | |
| 3 | Ape. Stop | Plano | | −0.250 | | | | |
| 4 | Lens 2 | 2.737 | ASP | 0.532 | Plastic | 1.535 | 56.3 | 6.93 |
| 5 | | 9.751 | ASP | 0.057 | | | | |
| 6 | Lens 3 | 14.266 | ASP | 0.230 | Plastic | 1.671 | 19.5 | −9.98 |
| 7 | | 4.525 | ASP | 0.175 | | | | |
| 8 | Lens 4 | 2.631 | ASP | 0.357 | Plastic | 1.544 | 56.0 | 7.90 |
| 9 | | 6.463 | ASP | −0.027 | | | | |
| 10 | Stop | Plano | | 0.378 | | | | |
| 11 | Lens 5 | −18.515 | ASP | 0.300 | Plastic | 1.660 | 20.4 | −10.21 |
| 12 | | 10.669 | ASP | 0.077 | | | | |
| 13 | Lens 6 | −4.463 | ASP | 0.510 | Plastic | 1.544 | 56.0 | 4.15 |
| 14 | | −1.560 | ASP | 0.087 | | | | |
| 15 | Lens 7 | −886.211 | ASP | 0.409 | Plastic | 1.660 | 20.4 | 100.43 |
| 16 | | −61.679 | ASP | 0.360 | | | | |
| 17 | Lens 8 | 4.254 | ASP | 0.344 | Plastic | 1.535 | 56.3 | −3.16 |
| 18 | | 1.176 | ASP | 0.400 | | | | |
| 19 | Filter | Plano | | 0.210 | Plastic | 1.544 | 56.0 | — |
| 20 | | Plano | | 0.320 | | | | |
| 21 | Image | Plano | | — | | | | |

Reference wavelength is 587.6 nm (d-line).
Effective radius of the stop on Surface 10 is 1.160 mm.

TABLE 22

Aspheric Coefficients

| Surface # | 1 | 2 | 4 | 5 | 6 | 7 |
|---|---|---|---|---|---|---|
| k = | −6.2200E−01 | −1.1154E+00 | 2.0715E+00 | 5.3216E+01 | 7.4686E+01 | −2.0955E+01 |
| A4 = | −7.0102E−03 | 4.8963E−02 | 4.8635E−02 | 3.6335E−02 | 8.8965E−03 | −3.0694E−02 |
| A6 = | −5.5833E−03 | −2.7855E−01 | −2.6057E−01 | −2.0181E−01 | −1.3695E−01 | 1.5561E−03 |
| A8 = | −2.5414E−02 | 3.5390E−01 | 3.4112E−01 | 1.8333E−01 | 1.7252E−01 | 4.8772E−02 |
| A10 = | 2.3810E−02 | −1.8535E−01 | −1.7028E−01 | −7.1143E−02 | −8.5806E−02 | −3.1655E−02 |
| A12 = | −1.2296E−02 | 3.4566E−02 | 2.8099E−02 | 9.0012E−03 | 1.9841E−02 | 1.5027E−03 |
| A14 = | 2.4722E−03 | | | | −3.7080E−04 | 6.2432E−03 |

| Surface # | 8 | 9 | 11 | 12 | 13 | 14 |
|---|---|---|---|---|---|---|
| k = | −1.2251E+01 | −8.2246E−01 | 4.2796E+01 | 3.8977E+01 | 9.2837E+00 | −9.0251E−01 |
| A4 = | 1.2946E−02 | −1.8018E−02 | −2.2280E−01 | −3.4769E−01 | −2.0181E−01 | 1.8893E−01 |
| A6 = | −3.0840E−02 | −1.7519E−02 | 2.3945E−01 | 9.4056E−01 | 1.1466E+00 | −3.4930E−01 |
| A8 = | −4.4962E−02 | −3.3900E−02 | −5.3789E−01 | −2.0253E+00 | −2.5879E+00 | 3.3559E−01 |
| A10 = | 6.9357E−02 | 2.1435E−02 | 6.9227E−01 | 2.2819E+00 | 2.9627E+00 | −1.4887E−01 |
| A12 = | −6.4515E−02 | −2.1916E−02 | −4.7473E−01 | −1.3702E+00 | −1.8320E+00 | 3.6933E−03 |
| A14 = | 2.4185E−02 | 8.6847E−03 | 1.4839E−01 | 4.1327E−01 | 5.8001E−01 | 1.8131E−02 |
| A16 = | | | −1.4158E−02 | −4.8576E−02 | −7.3179E−02 | −3.9946E−03 |

| Surface # | 15 | 16 | 17 | 18 |
|---|---|---|---|---|
| k = | 9.0000E+01 | −9.0000E+01 | −4.6272E+00 | −6.8156E+00 |
| A4 = | 2.6141E−01 | 1.2168E−01 | −4.4110E−01 | −1.8251E−01 |
| A6 = | −6.2028E−01 | −2.0132E−01 | 3.5232E−01 | 1.2979E−01 |
| A8 = | 7.3115E−01 | 1.4629E−01 | −1.9124E−01 | −6.2378E−02 |
| A10 = | −5.9334E−01 | −7.0598E−02 | 5.6078E−02 | 1.8220E−02 |
| A12 = | 3.2180E−01 | 2.0528E−02 | −2.0232E−03 | −2.8624E−03 |
| A14 = | −1.1344E−01 | −3.1916E−03 | −3.6500E−03 | 1.2493E−04 |
| A16 = | 2.3298E−02 | 2.0270E−04 | 1.0660E−03 | 2.9463E−05 |
| A18 = | −2.1203E−03 | | −1.2429E−04 | −4.6422E−06 |
| A20 = | | | 5.4327E−06 | 2.0448E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 3.98 | \|f/fi\|max | 1.26 |
| Fno | 1.58 | (f/f2) + (f/f3) | 0.18 |
| HFOV [deg.] | 38.6 | CTf [mm] | 0.21 |
| Nmax | 1.671 | TL [mm] | 5.08 |
| Nmin | 1.530 | TL/f | 1.28 |
| (V2 + V6)V1 | 2.01 | TL/ImgH | 1.59 |
| \|(V2 − V3)/(V4 − V5)\| | 1.03 | SD/TD | 0.85 |
| (V4 + V5 + V6)/V1 | 2.37 | Y11/Y82 | 0.54 |
| ATmax/CTmin | 1.57 | HFOV × EPD/f | 24.40 |
| ATmax/ImgH | 0.11 | TL/ImgH + f/EPD | 3.17 |
| (R11 − R12)/(R11 + R12) | 0.48 | TL^2/(ImgH × EPD) | 3.20 |
| f/R16 | 3.39 | f/fG1 | 0.93 |
| EPD/ΣCT | 0.84 | f/fG2 | −0.28 |
| EPD/BL | 2.71 | f/fG3 | 0.003 |
| TL/EPD | 2.01 | Yc71/f | 0.01\0.20 |
| f/EPD | 1.58 | Yc72/f | 0.05\0.21 |
| f1/f2 | 1.51 | Yc81/f | 0.10 |
| f/f2 | 0.57 | Yc82/f | 0.29 |

In the image capturing optical assembly according to the 11th embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 1110 through the eighth lens element 1180 is stated in the following table, wherein term definitions of the parameters related to each surface of the lens elements are the same as those of the 1st embodiment. Therefore, an explanation in this regard will not be provided again.

| 11th Embodiment | | | | |
|---|---|---|---|---|
| \|f/Rf\| + \|f/Rr\| | \|f/R1\| + \|f/R2\| | 3.55 | \|f/Rf\| + \|f/Rr\| \|f/R9\| + \|f/R10\| | 0.59 |
| | \|f/R3\| + \|f/R4\| | 1.86 | \|f/R11\| + \|f/R12\| | 3.45 |
| | \|f/R5\| + \|f/R6\| | 1.16 | \|f/R13\| + \|f/R14\| | 0.07 |
| | \|f/R7\| + \|f/R8\| | 2.13 | \|f/R15\| + \|f/R16\| | 4.32 |

In the 11th embodiment, each of three of the first lens element 1110, the second lens element 1120, the third lens element 1130, the fourth lens element 1140, the fifth lens element 1150, the sixth lens element 1160, the seventh lens element 1170, and the eighth lens element 1180 has an Abbe number smaller than 24.0 and 23.0; in detail, the three lens elements are the third lens element 1130, the fifth lens element 1150 and the seventh lens element 1170, wherein the Abbe number of the third lens element 1130 is smaller than 20.

In the 11th embodiment, the numbers of the inflection points of object-side surfaces and image-side surfaces of the first lens element 1110, the second lens element 1120, the third lens element 1130, the fourth lens element 1140, the fifth lens element 1150, the sixth lens element 1160, the seventh lens element 1170 and the eighth lens element 1180 are listed in the table below. Moreover, in the 11th embodiment, a total number of inflection points on the object-side surfaces and the image-side surfaces of all the lens elements of the image capturing optical assembly is Ninf., the following condition is satisfied: Ninf.=19.

| 11th Embodiment - numbers of the inflection points | | | | | | | | |
|---|---|---|---|---|---|---|---|---|
| | 1110 | 1120 | 1130 | 1140 | 1150 | 1160 | 1170 | 1180 |
| Object-side surface | 1 | 1 | 2 | 1 | 0 | 0 | 2 | 2 |
| Image-side surface | 1 | 1 | 0 | 1 | 2 | 2 | 2 | 1 |

12th Embodiment

Figure 23:
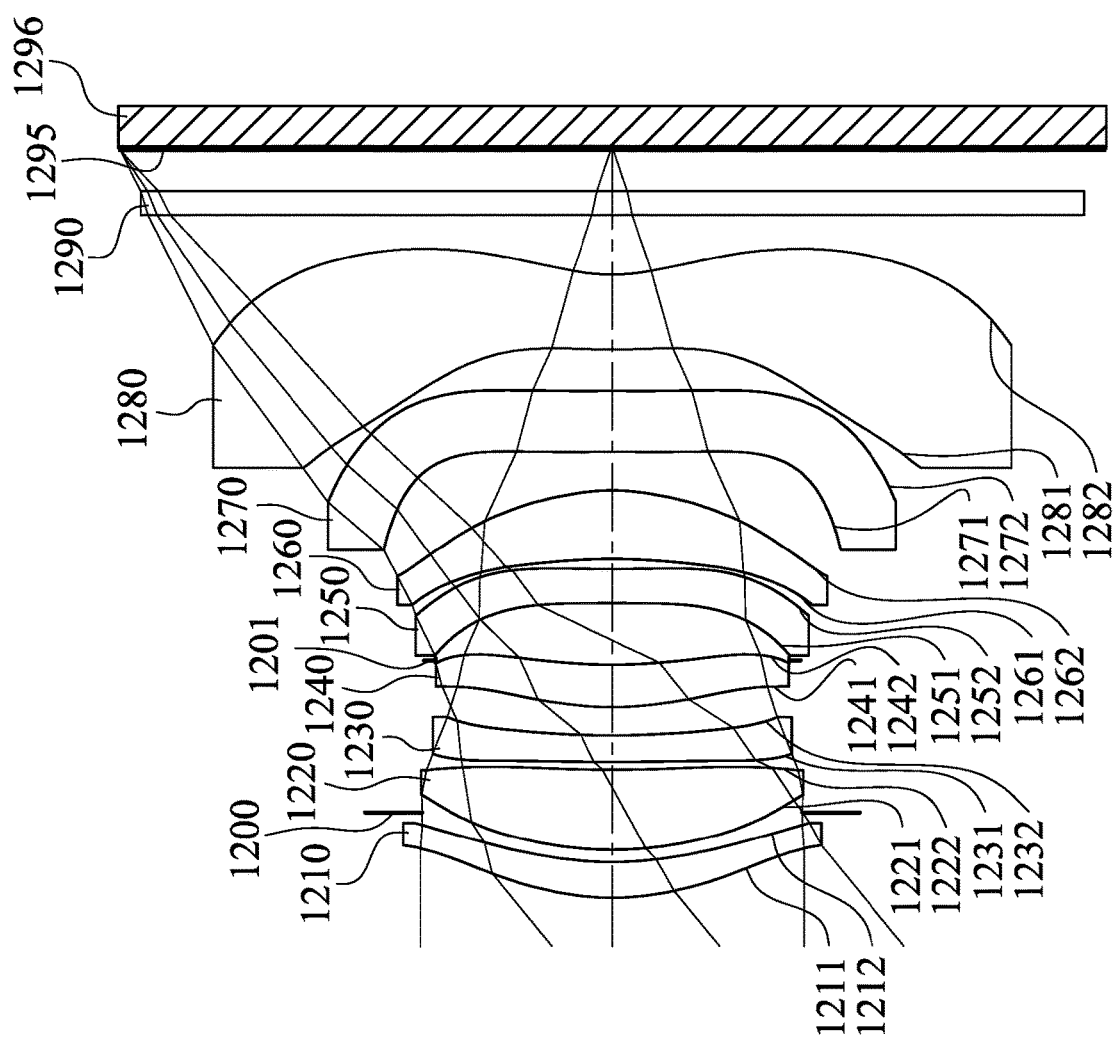
FIG. 23 is a schematic view of an imaging apparatus according to the 12th embodiment of the present disclosure.
Figure 24:
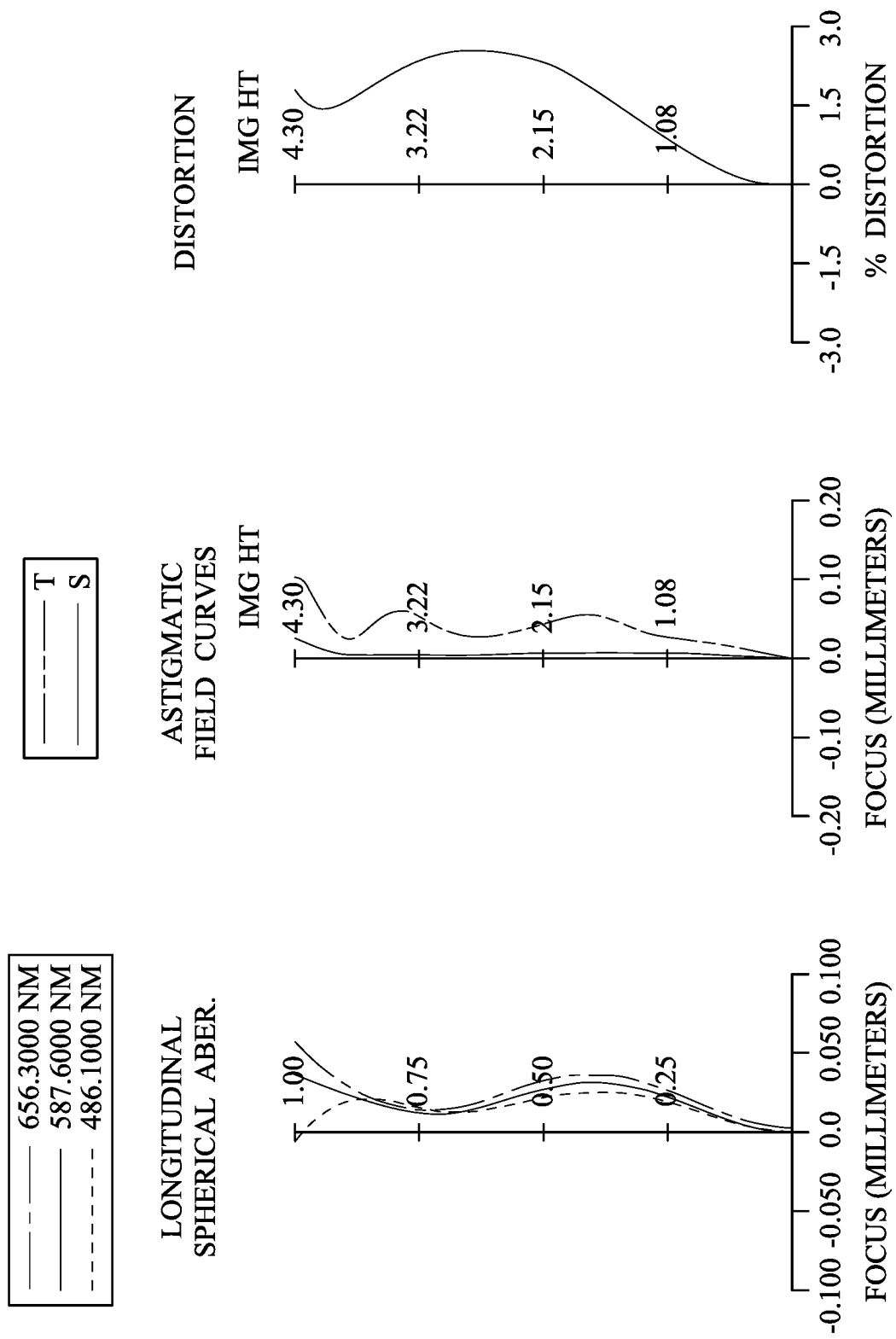
FIG. 24 shows spherical aberration curves, astigmatic field curves and a distortion curve of the imaging apparatus according to the 12th embodiment.

FIG. 23 is a schematic view of an imaging apparatus according to the 12th embodiment of the present disclosure. FIG. 24 shows spherical aberration curves, astigmatic field curves and a distortion curve of the imaging apparatus according to the 12th embodiment. In FIG. 23, the imaging apparatus includes an image capturing optical assembly (its reference numeral is omitted) and an image sensor 1296. The image capturing optical assembly includes, in order from an object side to an image side, a first lens element 1210, an aperture stop 1200, a second lens element 1220, a third lens element 1230, a fourth lens element 1240, a stop 1201, a fifth lens element 1250, a sixth lens element 1260, a seventh lens element 1270, an eighth lens element 1280, a filter 1290 and an image surface 1295, wherein the image sensor 1296 is disposed on the image surface 1295 of the image capturing optical assembly. The image capturing optical assembly includes eight lens elements (1210, 1220, 1230, 1240, 1250, 1260, 1270 and 1280) without additional one or more lens elements inserted between the first lens element 1210 and the eighth lens element 1280, and there is an air gap in a paraxial region between every adjacent lens elements of the image capturing optical assembly. The first lens element 1210 and the second lens element 1220 belong to a first lens group (its reference numeral is omitted). The third lens element 1230, the fourth lens element 1240 and the fifth lens element 1250 belong to a second lens group (its reference numeral is omitted). The sixth lens element 1260, the seventh lens element 1270 and the eighth lens element 1280 belong to a third lens group (its reference numeral is omitted).

The first lens element 1210 with positive refractive power has an object-side surface 1211 being convex and an image-side surface 1212 being concave. The first lens element 1210 is made of a plastic material, and has the object-side surface 1211 and the image-side surface 1212 being both aspheric. Furthermore, each of the object-side surface 1211 and the image-side surface 1212 of the first lens element 1210 includes at least one inflection point.

The second lens element 1220 with positive refractive power has an object-side surface 1221 being convex and an image-side surface 1222 being concave. The second lens element 1220 is made of a plastic material, and has the object-side surface 1221 and the image-side surface 1222 being both aspheric. Furthermore, each of the object-side surface 1221 and the image-side surface 1222 of the second lens element 1220 includes at least one inflection point.

The third lens element 1230 with negative refractive power has an object-side surface 1231 being convex and an image-side surface 1232 being concave. The third lens element 1230 is made of a plastic material, and has the object-side surface 1231 and the image-side surface 1232 being both aspheric. Furthermore, the object-side surface 1231 of the third lens element 1230 includes at least one inflection point.

The fourth lens element 1240 with positive refractive power has an object-side surface 1241 being convex and an image-side surface 1242 being concave. The fourth lens element 1240 is made of a plastic material, and has the object-side surface 1241 and the image-side surface 1242 being both aspheric. Furthermore, each of the object-side surface 1241 and the image-side surface 1242 of the fourth lens element 1240 includes at least one inflection point.

The fifth lens element 1250 with negative refractive power has an object-side surface 1251 being convex and an image-side surface 1252 being concave. The fifth lens element 1250 is made of a plastic material, and has the object-side surface 1251 and the image-side surface 1252 being both aspheric. Furthermore, each of the object-side surface 1251 and the image-side surface 1252 of the fifth lens element 1250 includes at least one inflection point.

The sixth lens element 1260 with positive refractive power has an object-side surface 1261 being concave and an image-side surface 1262 being convex. The sixth lens element 1260 is made of a plastic material, and has the object-side surface 1261 and the image-side surface 1262 being both aspheric. Furthermore, the image-side surface 1262 of the sixth lens element 1260 includes at least one inflection point.

The seventh lens element 1270 with negative refractive power has an object-side surface 1271 being concave and an image-side surface 1272 being convex. The seventh lens element 1270 is made of a plastic material, and has the object-side surface 1271 and the image-side surface 1272 being both aspheric. Furthermore, each of the object-side surface 1271 and the image-side surface 1272 of the seventh lens element 1270 includes at least one inflection point and at least one critical point.

The eighth lens element 1280 with negative refractive power has an object-side surface 1281 being convex and an image-side surface 1282 being concave. The eighth lens element 1280 is made of a plastic material, and has the object-side surface 1281 and the image-side surface 1282 being both aspheric. Furthermore, each of the object-side surface 1281 and the image-side surface 1282 of the eighth lens element 1280 includes at least one inflection point and at least one critical point.

The filter 1290 is made of a glass material and located between the eighth lens element 1280 and the image surface 1295, and will not affect the focal length of the image capturing optical assembly.

The detailed optical data of the 12th embodiment are shown in Table 23 and the aspheric surface data are shown in Table 24 below.

TABLE 23

12th Embodiment
f = 5.15 mm, Fno = 1.54, HFOV = 39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.514 | ASP | 0.313 | Plastic | 1.530 | 55.8 | 16.06 |
| 2 | | 3.413 | ASP | 0.433 | | | | |
| 3 | Ape. Stop | Plano | | −0.325 | | | | |
| 4 | Lens 2 | 3.430 | ASP | 0.700 | Plastic | 1.535 | 56.3 | 8.50 |
| 5 | | 12.995 | ASP | 0.066 | | | | |
| 6 | Lens 3 | 19.991 | ASP | 0.230 | Plastic | 1.671 | 19.5 | −12.82 |
| 7 | | 5.985 | ASP | 0.248 | | | | |
| 8 | Lens 4 | 2.866 | ASP | 0.371 | Plastic | 1.544 | 56.0 | 11.55 |
| 9 | | 5.030 | ASP | 0.036 | | | | |
| 10 | Stop | Plano | | 0.497 | | | | |
| 11 | Lens 5 | 129.455 | ASP | 0.300 | Plastic | 1.660 | 20.4 | −17.77 |
| 12 | | 10.742 | ASP | 0.087 | | | | |
| 13 | Lens 6 | −5.811 | ASP | 0.601 | Plastic | 1.544 | 56.0 | 5.24 |
| 14 | | −1.981 | ASP | 0.337 | | | | |
| 15 | Lens 7 | −15.034 | ASP | 0.530 | Plastic | 1.660 | 20.4 | −27.20 |
| 16 | | −93.901 | ASP | 0.360 | | | | |
| 17 | Lens 8 | 5.423 | ASP | 0.655 | Plastic | 1.535 | 56.3 | −4.78 |
| 18 | | 1.664 | ASP | 0.520 | | | | |
| 19 | Filter | Plano | | 0.210 | Glass | 1.517 | 64.2 | — |
| 20 | | Plano | | 0.373 | | | | |
| 21 | Image | Plano | | — | | | | |

Reference wavelength is 587.6 nm (d-line).
Effective radius of the stop on Surface 10 is 1.540 mm.

TABLE 24

Aspheric Coefficients

| Surface # | 1 | 2 | 4 | 5 | 6 | 7 |
|---|---|---|---|---|---|---|
| k = | −6.6633E−01 | −9.7125E−01 | 2.0543E+00 | 5.3216E+01 | 7.8644E+01 | −2.2575E+01 |
| A4 = | 1.3027E−03 | 1.6921E−02 | 1.4202E−02 | −4.4904E−03 | −2.9366E−02 | −4.2209E−02 |
| A6 = | −1.1392E−02 | −4.8484E−02 | −4.0109E−02 | −1.5007E−02 | 3.1071E−02 | 5.4053E−02 |
| A8 = | 3.1017E−03 | 3.2988E−02 | 2.9848E−02 | 9.9120E−04 | −2.7596E−02 | −3.7235E−02 |
| A10 = | −5.6550E−04 | −9.8515E−03 | −8.5209E−03 | 2.4335E−03 | 1.3292E−02 | 1.6315E−02 |

TABLE 24-continued

| Aspheric Coefficients | | | | | |
|---|---|---|---|---|---|
| A12 = | −7.7201E−05 | 1.0727E−03 | 7.3410E−04 | −6.0622E−04 | −2.4613E−03 | −3.4984E−03 |
| A14 = | 2.7860E−05 | | | | 1.3970E−04 | 3.9498E−04 |

| Surface # | 8 | 9 | 11 | 12 | 13 | 14 |
|---|---|---|---|---|---|---|
| k = | −1.1432E+01 | −5.5570E+00 | 4.2796E+01 | 2.0559E+01 | 9.3510E+00 | −8.7089E−01 |
| A4 = | 7.8521E−03 | −6.0229E−03 | −1.1821E−01 | −1.6205E−01 | −4.2753E−02 | 9.4986E−02 |
| A6 = | −9.7715E−03 | −1.2755E−02 | 7.9211E−02 | 2.5311E−01 | 2.2866E−01 | −9.8505E−02 |
| A8 = | −2.5535E−03 | 9.3099E−03 | −8.3018E−02 | −3.2280E−01 | −3.4620E−01 | 5.4376E−02 |
| A10 = | −6.7212E−04 | −1.1510E−02 | 5.1991E−02 | 2.1519E−01 | 2.4711E−01 | −1.5946E−02 |
| A12 = | 7.9918E−04 | 4.9664E−03 | −1.8492E−02 | −7.6447E−02 | −9.2786E−02 | 1.6380E−03 |
| A14 = | −4.3740E−05 | −7.4607E−04 | 3.2017E−03 | 1.3647E−02 | 1.7678E−02 | 2.1726E−04 |
| A16 = | | | −1.8378E−04 | −9.4854E−04 | −1.3415E−03 | −4.3240E−05 |

| Surface # | 15 | 16 | 17 | 18 |
|---|---|---|---|---|
| k = | −8.2435E+01 | −9.0000E+01 | −3.8430E+00 | −7.7071E+00 |
| A4 = | 1.2690E−01 | 4.5484E−02 | −1.9948E−01 | −5.9989E−02 |
| A6 = | −1.6808E−01 | −5.2025E−02 | 1.0579E−01 | 2.1113E−02 |
| A8 = | 1.1598E−01 | 2.3330E−02 | −5.0978E−02 | −5.1986E−03 |
| A10 = | −5.5977E−02 | −6.6821E−03 | 1.9608E−02 | 7.9856E−04 |
| A12 = | 1.7978E−02 | 1.1420E−03 | −5.1803E−03 | −6.3840E−05 |
| A14 = | −3.7392E−03 | −1.0553E−04 | 8.9321E−04 | 4.5237E−07 |
| A16 = | 4.5524E−04 | 3.9941E−06 | −9.6040E−05 | 3.5257E−07 |
| A18 = | −2.5336E−05 | | 5.8252E−06 | −2.6434E−08 |
| A20 = | | | −1.5148E−07 | 6.2584E−10 |

In the 12th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 5.15 | |f/f1|max | 1.08 |
| Fno | 1.54 | (f/f2) + (f/f3) | 0.20 |
| HFOV [deg.] | 39.3 | CTf [mm] | 0.21 |
| Nmax | 1.671 | TL [mm] | 6.54 |
| Nmin | 1.530 | TL/f | 1.27 |
| (V2 + V6)/V1 | 2.01 | TL/ImgH | 1.52 |
| |(V2 − V3)/(V4 − V5)| | 1.03 | SD/TD | 0.86 |
| (V4 + V5 + V6)/V1 | 2.37 | Y11/Y82 | 0.52 |
| ATmax/CTmin | 2.32 | HFOV × EPD/f | 25.51 |
| ATmax/ImgH | 0.12 | TL/ImgH + f/EPD | 3.06 |
| (R11 − R12)/(R11 + R12) | 0.49 | TL^2/(ImgH × EPD) | 2.98 |
| f/R16 | 3.09 | f/fG1 | 0.90 |
| EPD/ΣCT | 0.90 | f/fG2 | −0.24 |
| EPD/BL | 3.03 | f/fG3 | −0.03 |
| TL/EPD | 1.96 | Yc71/f | 0.08\0.18 |
| f/EPD | 1.54 | Yc72/f | 0.05\0.18 |
| f1/f2 | 1.89 | Yc81/f | 0.10 |
| f/f2 | 0.61 | Yc82/f | 0.32 |

In the image capturing optical assembly according to the 12th embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 1210 through the eighth lens element 1280 is stated in the following table, wherein term definitions of the parameters related to each surface of the lens elements are the same as those of the 1st embodiment. Therefore, an explanation in this regard will not be provided again.

| 12th Embodiment | | | |
|---|---|---|---|
| |f/Rf| + |f/Rr| | |f/R1| + |f/R2| | 3.55 | |f/Rf| + |f/Rr| | |f/R9| + |f/R10| | 0.52 |
| | |f/R3| + |f/R4| | 1.90 | | |f/R11| + |f/R12| | 3.48 |
| | |f/R5| + |f/R6| | 1.12 | | |f/R13| + |f/R14| | 0.40 |
| | |f/R7| + |f/R8| | 2.82 | | |f/R15| + |f/R16| | 4.04 |

In the 12th embodiment, each of three of the first lens element 1210, the second lens element 1220, the third lens element 1230, the fourth lens element 1240, the fifth lens element 1250, the sixth lens element 1260, the seventh lens element 1270, and the eighth lens element 1280 has an Abbe number smaller than 24.0 and 23.0; in detail, the three lens elements are the third lens element 1230, the fifth lens element 1250 and the seventh lens element 1270, wherein the Abbe number of the third lens element 1230 is smaller than 20.

In the 12th embodiment, the numbers of the inflection points of object-side surfaces and image-side surfaces of the first lens element 1210, the second lens element 1220, the third lens element 1230, the fourth lens element 1240, the fifth lens element 1250, the sixth lens element 1260, the seventh lens element 1270 and the eighth lens element 1280 are listed in the table below. Moreover, in the 12th embodiment, a total number of inflection points on the object-side surfaces and the image-side surfaces of all the lens elements of the image capturing optical assembly is Ninf., the following condition is satisfied: Ninf.=24.

| 12th Embodiment - numbers of the inflection points | | | | | | | | |
|---|---|---|---|---|---|---|---|---|
| | 1210 | 1220 | 1230 | 1240 | 1250 | 1260 | 1270 | 1280 |
| Object-side surface | 1 | 2 | 2 | 0 | 0 | 3 | 4 | 4 |
| Image-side surface | 2 | 0 | 1 | 2 | 2 | 4 | 3 | 4 |

13th Embodiment

Figure 25:
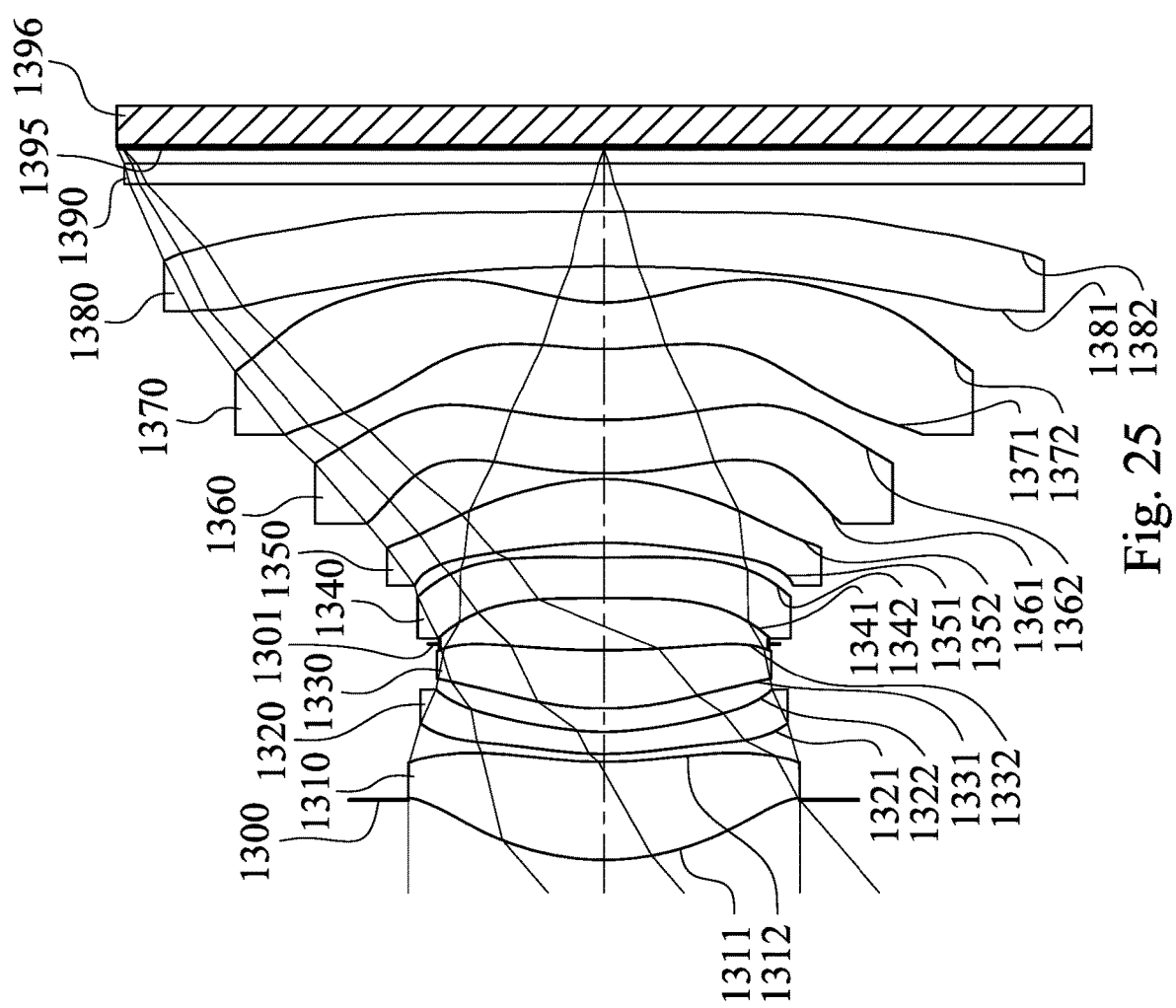
FIG. 25 is a schematic view of an imaging apparatus according to the 13th embodiment of the present disclosure.
Figure 26:
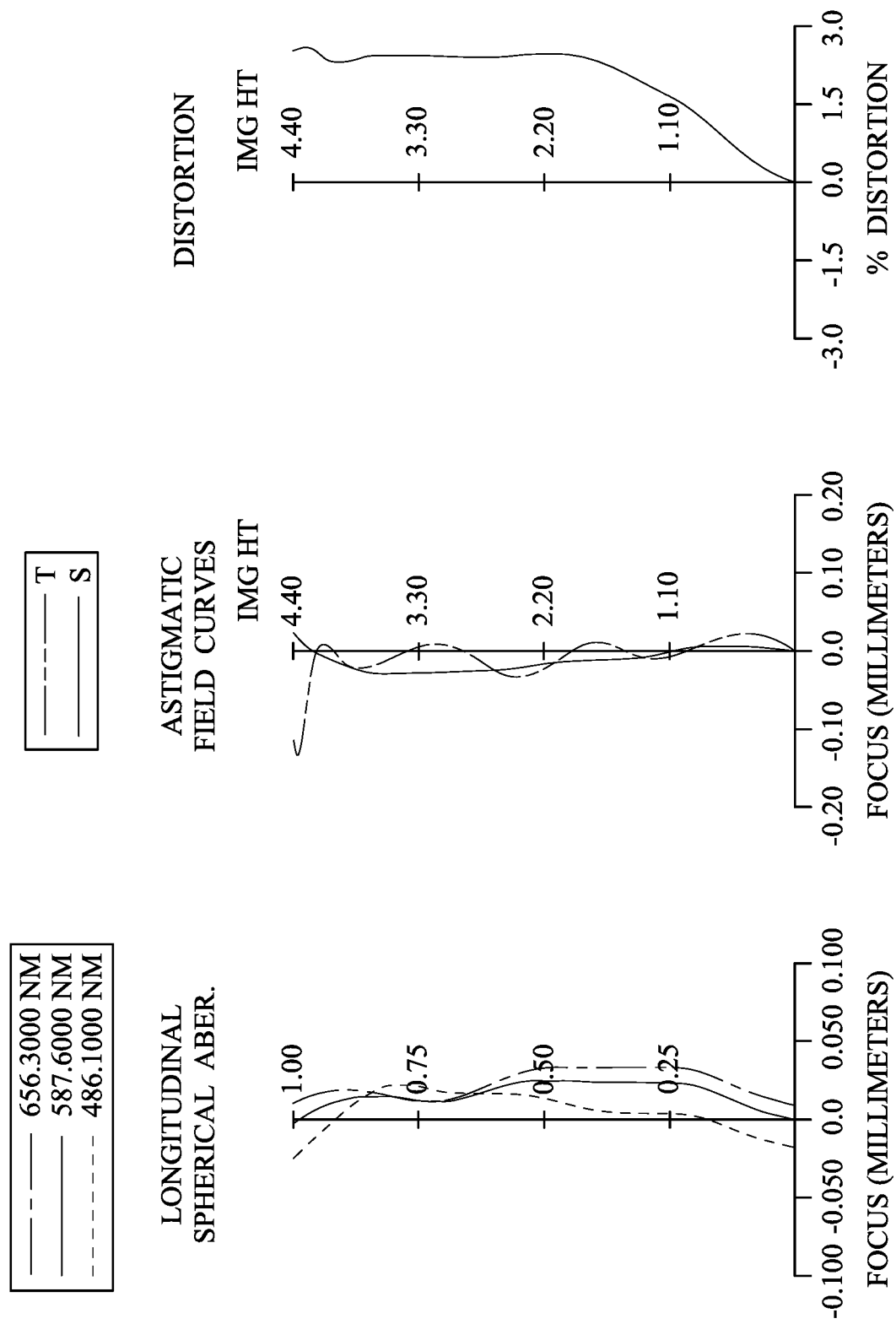
FIG. 26 shows spherical aberration curves, astigmatic field curves and a distortion curve of the imaging apparatus according to the 13th embodiment.

FIG. 25 is a schematic view of an imaging apparatus according to the 13th embodiment of the present disclosure. FIG. 26 shows spherical aberration curves, astigmatic field curves and a distortion curve of the imaging apparatus according to the 13th embodiment. In FIG. 25, the imaging apparatus includes an image capturing optical assembly (its reference numeral is omitted) and an image sensor 1396. The image capturing optical assembly includes, in order from an object side to an image side, an aperture stop 1300, a first lens element 1310, a second lens element 1320, a third lens element 1330, a stop 1301, a fourth lens element 1340, a fifth lens element 1350, a sixth lens element 1360, a seventh lens element 1370, an eighth lens element 1380, a filter 1390 and an image surface 1395, wherein the image sensor 1396 is disposed on the image surface 1395 of the image capturing optical assembly. The image capturing optical assembly includes eight lens elements (1310, 1320, 1330, 1340, 1350, 1360, 1370 and 1380) without additional one or more lens elements inserted between the first lens element 1310 and the eighth lens element 1380, and there is an air gap in a paraxial region between every adjacent lens elements of the image capturing optical assembly. The first lens element 1310 and the second lens element 1320 belong to a first lens group (its reference numeral is omitted). The third lens element 1330, the fourth lens element 1340 and the fifth lens element 1350 belong to a second lens group (its reference numeral is omitted). The sixth lens element 1360, the seventh lens element 1370 and the eighth lens element 1380 belong to a third lens group (its reference numeral is omitted).

The first lens element 1310 with positive refractive power has an object-side surface 1311 being convex and an image-side surface 1312 being concave. The first lens element 1310 is made of a plastic material, and has the object-side surface 1311 and the image-side surface 1312 being both aspheric. Furthermore, each of the object-side surface 1311 and the image-side surface 1312 of the first lens element 1310 includes at least one inflection point.

The second lens element 1320 with negative refractive power has an object-side surface 1321 being convex and an image-side surface 1322 being concave. The second lens element 1320 is made of a plastic material, and has the object-side surface 1321 and the image-side surface 1322 being both aspheric. Furthermore, the object-side surface 1321 of the second lens element 1320 includes at least one inflection point.

The third lens element 1330 with positive refractive power has an object-side surface 1331 being convex and an image-side surface 1332 being concave. The third lens element 1330 is made of a plastic material, and has the object-side surface 1331 and the image-side surface 1332 being both aspheric. Furthermore, each of the object-side surface 1331 and the image-side surface 1332 of the third lens element 1330 includes at least one inflection point.

The fourth lens element 1340 with negative refractive power has an object-side surface 1341 being concave and an image-side surface 1342 being concave. The fourth lens element 1340 is made of a plastic material, and has the object-side surface 1341 and the image-side surface 1342 being both aspheric. Furthermore, the image-side surface 1342 of the fourth lens element 1340 includes at least one inflection point.

The fifth lens element 1350 with positive refractive power has an object-side surface 1351 being concave and an image-side surface 1352 being convex. The fifth lens element 1350 is made of a plastic material, and has the object-side surface 1351 and the image-side surface 1352 being both aspheric. Furthermore, the image-side surface 1352 of the fifth lens element 1350 includes at least one inflection point.

The sixth lens element 1360 with negative refractive power has an object-side surface 1361 being convex and an image-side surface 1362 being concave. The sixth lens element 1360 is made of a plastic material, and has the object-side surface 1361 and the image-side surface 1362 being both aspheric. Furthermore, each of the object-side surface 1361 and the image-side surface 1362 of the sixth lens element 1360 includes at least one inflection point.

The seventh lens element 1370 with negative refractive power has an object-side surface 1371 being convex and an image-side surface 1372 being concave. The seventh lens element 1370 is made of a plastic material, and has the object-side surface 1371 and the image-side surface 1372 being both aspheric. Furthermore, each of the object-side surface 1371 and the image-side surface 1372 of the seventh lens element 1370 includes at least one inflection point and at least one critical point.

The eighth lens element 1380 with negative refractive power has an object-side surface 1381 being concave and an image-side surface 1382 being convex. The eighth lens element 1380 is made of a plastic material, and has the object-side surface 1381 and the image-side surface 1382 being both aspheric. Furthermore, each of the object-side surface 1381 and the image-side surface 1382 of the eighth lens element 1380 includes at least one inflection point.

The filter 1390 is made of a glass material and located between the eighth lens element 1380 and the image surface 1395, and will not affect the focal length of the image capturing optical assembly.

The detailed optical data of the 13th embodiment are shown in Table 25 and the aspheric surface data are shown in Table 26 below.

TABLE 25

13th Embodiment
f = 4.96 mm, Fno = 1.39, HFOV = 40.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.547 | | | | |
| 2 | Lens 1 | 2.446 | ASP | 0.897 | Plastic | 1.535 | 55.8 | 8.39 |
| 3 | | 4.691 | ASP | 0.072 | | | | |
| 4 | Lens 2 | 3.395 | ASP | 0.200 | Plastic | 1.660 | 20.4 | −18.60 |
| 5 | | 2.597 | ASP | 0.214 | | | | |
| 6 | Lens 3 | 2.855 | ASP | 0.535 | Plastic | 1.544 | 56.0 | 8.12 |

TABLE 25-continued

13th Embodiment
f = 4.96 mm, Fno = 1.39, HFOV = 40.8 deg.

| Surface # | | Curvature Radius | | Thickness | Material | Index | Abbe # | Focal Length |
|---|---|---|---|---|---|---|---|---|
| 7 | | 7.530 | ASP | 0.057 | | | | |
| 8 | Stop | Plano | | 0.418 | | | | |
| 9 | Lens 4 | −115.559 | ASP | 0.372 | Plastic | 1.660 | 20.4 | −17.84 |
| 10 | | 13.126 | ASP | 0.134 | | | | |
| 11 | Lens 5 | −5.593 | ASP | 0.581 | Plastic | 1.544 | 56.0 | 6.02 |
| 12 | | −2.140 | ASP | 0.056 | | | | |
| 13 | Lens 6 | 5.706 | ASP | 0.484 | Plastic | 1.639 | 23.5 | −44.62 |
| 14 | | 4.597 | ASP | 0.651 | | | | |
| 15 | Lens 7 | 3.036 | ASP | 0.425 | Plastic | 1.535 | 55.8 | −7.66 |
| 16 | | 1.658 | ASP | 0.328 | | | | |
| 17 | Lens 8 | −24.870 | ASP | 0.500 | Plastic | 1.535 | 55.8 | −50.73 |
| 18 | | −299.471 | ASP | 0.250 | | | | |
| 19 | Filter | Plano | | 0.190 | Glass | 1.517 | 64.2 | — |
| 20 | | Plano | | 0.148 | | | | |
| 21 | Image | Plano | | — | | | | |

Reference wavelength is 587.6 nm (d-line).
Effective radius of the stop on Surface 8 is 1.500 mm.

TABLE 26

Aspheric Coefficients

| Surface # | 2 | 3 | 4 | 5 | 6 | 7 |
|---|---|---|---|---|---|---|
| k = | −1.0945E−01 | −1.0561E+00 | −3.3831E+01 | −1.1974E+01 | −7.6708E+00 | 9.4532E+00 |
| A4 = | 1.4287E−03 | −1.0312E−02 | 3.4384E−02 | 3.2438E−03 | 1.1063E−02 | −1.3664E−02 |
| A6 = | −2.8614E−03 | −3.9103E−02 | −9.9611E−02 | −2.5075E−02 | −7.4225E−03 | 3.6719E−03 |
| A8 = | −6.6898E−04 | 2.2185E−02 | 8.3065E−02 | 2.5946E−02 | −3.3831E−03 | −1.4047E−02 |
| A10 = | 1.2461E−03 | −5.3361E−03 | −3.2881E−02 | −5.2001E−03 | 4.3835E−03 | 8.4231E−03 |
| A12 = | −7.7013E−04 | 4.6294E−04 | 7.0643E−03 | −1.3625E−03 | −2.4311E−03 | −3.0067E−03 |
| A14 = | 1.0669E−04 | | −6.4050E−04 | 5.6365E−04 | 5.1549E−04 | 4.2951E−04 |

| Surface # | 9 | 10 | 11 | 12 | 13 | 14 |
|---|---|---|---|---|---|---|
| k = | −9.0000E+01 | 5.1885E+01 | 9.3261E+00 | −1.1112E+00 | 1.4104E+00 | −5.4455E+00 |
| A4 = | −8.1596E−02 | −1.5310E−01 | −1.2662E−01 | 7.2869E−02 | 1.0282E−01 | 3.4953E−02 |
| A6 = | 3.6332E−02 | 2.5493E−01 | 4.1664E−01 | −6.5701E−02 | −1.6673E−01 | −5.3413E−02 |
| A8 = | −5.6980E−02 | −3.2282E−01 | −5.3134E−01 | 3.6398E−02 | 1.1659E−01 | 2.3595E−02 |
| A10 = | 4.0396E−02 | 2.1508E−01 | 3.7202E−01 | −1.1207E−02 | −5.5997E−02 | −6.6379E−03 |
| A12 = | −1.0501E−02 | −7.6516E−02 | −1.5372E−01 | 1.4547E−03 | 1.7962E−02 | 1.1459E−03 |
| A14 = | −3.5338E−04 | 1.3636E−02 | 3.7755E−02 | 7.8266E−05 | −3.7406E−03 | −1.0549E−04 |
| A16 = | 3.8684E−04 | −9.4590E−04 | −5.2127E−03 | −2.7057E−05 | 4.5628E−04 | 3.9184E−06 |
| A18 = | | −1.0182E−06 | 3.2041E−04 | | −2.4215E−05 | |

| Surface # | 15 | 16 | 17 | 18 |
|---|---|---|---|---|
| k = | −9.2287E+00 | −4.5896E+00 | −9.0000E+01 | 5.8557E+01 |
| A4 = | −1.3299E−01 | −9.5422E−02 | −1.2459E−02 | 3.1037E−03 |
| A6 = | 5.5330E−02 | 4.3221E−02 | 8.6885E−03 | −5.6622E−03 |
| A8 = | −3.0776E−02 | −1.8071E−02 | −3.6215E−03 | 3.0212E−03 |
| A10 = | 1.3296E−02 | 5.3414E−03 | 8.2781E−04 | −8.7741E−04 |
| A12 = | −3.4432E−03 | −9.9563E−04 | −1.0822E−04 | 1.4427E−04 |
| A14 = | 5.3473E−04 | 1.1505E−04 | 8.2471E−06 | −1.3809E−05 |
| A16 = | −4.9282E−05 | −8.0684E−06 | −3.5809E−07 | 7.6308E−07 |
| A18 = | 2.4899E−06 | 3.1694E−07 | 8.1113E−09 | −2.2572E−08 |
| A20 = | −5.3142E−08 | −5.3772E−09 | −7.3741E−11 | 2.7652E−10 |

In the 13th embodiment, the equation of the aspheric surface profiles of the aforementioned lens elements is the same as the equation of the 1st embodiment. Also, the definitions of these parameters shown in the following table are the same as those stated in the 1st embodiment and the 2nd embodiment with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 4.96 | |f/fi|max | 0.83 |
| Fno | 1.39 | (f/f2) + (f/f3) | 0.34 |
| HFOV [deg.] | 40.8 | CTf [mm] | 0.19 |
| Nmax | 1.660 | TL [mm] | 6.51 |
| Nmin | 1.535 | TL/f | 1.31 |
| (V2 + V6)/V1 | 0.79 | TL/ImgH | 1.48 |
| |(V2 − V3)/(V4 − V5)| | 1.00 | SD/TD | 0.91 |
| (V4 + V5 + V6)/V1 | 1.79 | Y11/Y82 | 0.44 |
| ATmax/CTmin | 3.26 | HFOV × EPD/f | 29.32 |

-continued

| 13th Embodiment | | | |
|---|---|---|---|
| ATmax/ImgH | 0.15 | TL/ImgH + f/EPD | 2.87 |
| (R11 − R12)/(R11 + R12) | 0.11 | TL^2/(ImgH × EPD) | 2.70 |
| f/R16 | −0.02 | f/fG1 | 0.38 |
| EPD/ΣCT | 0.89 | f/fG2 | 1.03 |
| EPD/BL | 6.07 | f/fG3 | −0.85 |
| TL/EPD | 1.82 | Yc71/f | 0.17 |
| f/EPD | 1.39 | Yc72/f | 0.28 |
| f1/f2 | −0.45 | Yc81/f | — |
| f/f2 | −0.27 | Yc82/f | — |

In the image capturing optical assembly according to the 13th embodiment, the focal length of the image capturing optical assembly is f, a curvature radius of an object-side surface of one of the lens elements of the image capturing optical assembly is Rf, and a curvature radius of an image-side surface of the lens element of the image capturing optical assembly is Rr, and the value of the condition |f/Rf|+|f/Rr| corresponding to each of the first lens element 1310 through the eighth lens element 1380 is stated in the following table, wherein term definitions of the parameters related to each surface of the lens elements are the same as those of the 1st embodiment. Therefore, an explanation in this regard will not be provided again.

| 13th Embodiment | | | | | |
|---|---|---|---|---|---|
| |f/Rf| + |f/Rr| | |f/R1| + |f/R2| | 3.09 | |f/Rf| + |f/Rr| | |f/R9| + |f/R10| | 3.21 |
| | |f/R3| + |f/R4| | 3.37 | | |f/R11| + |f/R12| | 1.95 |
| | |f/R5| + |f/R6| | 2.40 | | |f/R13| + |f/R14| | 4.63 |
| | |f/R7| + |f/R8| | 0.42 | | |f/R15| + |f/R16| | 0.22 |

In the 13th embodiment, each of three of the first lens element 1310, the second lens element 1320, the third lens element 1330, the fourth lens element 1340, the fifth lens element 1350, the sixth lens element 1360, the seventh lens element 1370, and the eighth lens element 1380 has an Abbe number smaller than 24.0; in detail, the three lens elements are the second lens element 1320, the fourth lens element 1340 and the sixth lens element 1360, wherein each of the Abbe numbers of the second lens element 1320 and the fourth lens element 1340 is smaller than 23.0.

In the 13th embodiment, the numbers of the inflection points of object-side surfaces and image-side surfaces of the first lens element 1310, the second lens element 1320, the third lens element 1330, the fourth lens element 1340, the fifth lens element 1350, the sixth lens element 1360, the seventh lens element 1370, and the eighth lens element 1380 are listed in the table below. Moreover, in the 13th embodiment, a total number of inflection points on the object-side surfaces and the image-side surfaces of all the lens elements of the image capturing optical assembly is Ninf., the following condition is satisfied: Ninf.=33.

| 13th Embodiment - numbers of the inflection points | | | | | | | | |
|---|---|---|---|---|---|---|---|---|
| | 1310 | 1320 | 1330 | 1340 | 1350 | 1360 | 1370 | 1380 |
| Object-side surface | 1 | 2 | 2 | 0 | 0 | 3 | 4 | 4 |
| Image-side surface | 1 | 0 | 1 | 2 | 2 | 4 | 3 | 4 |

14th Embodiment

Figure 29:
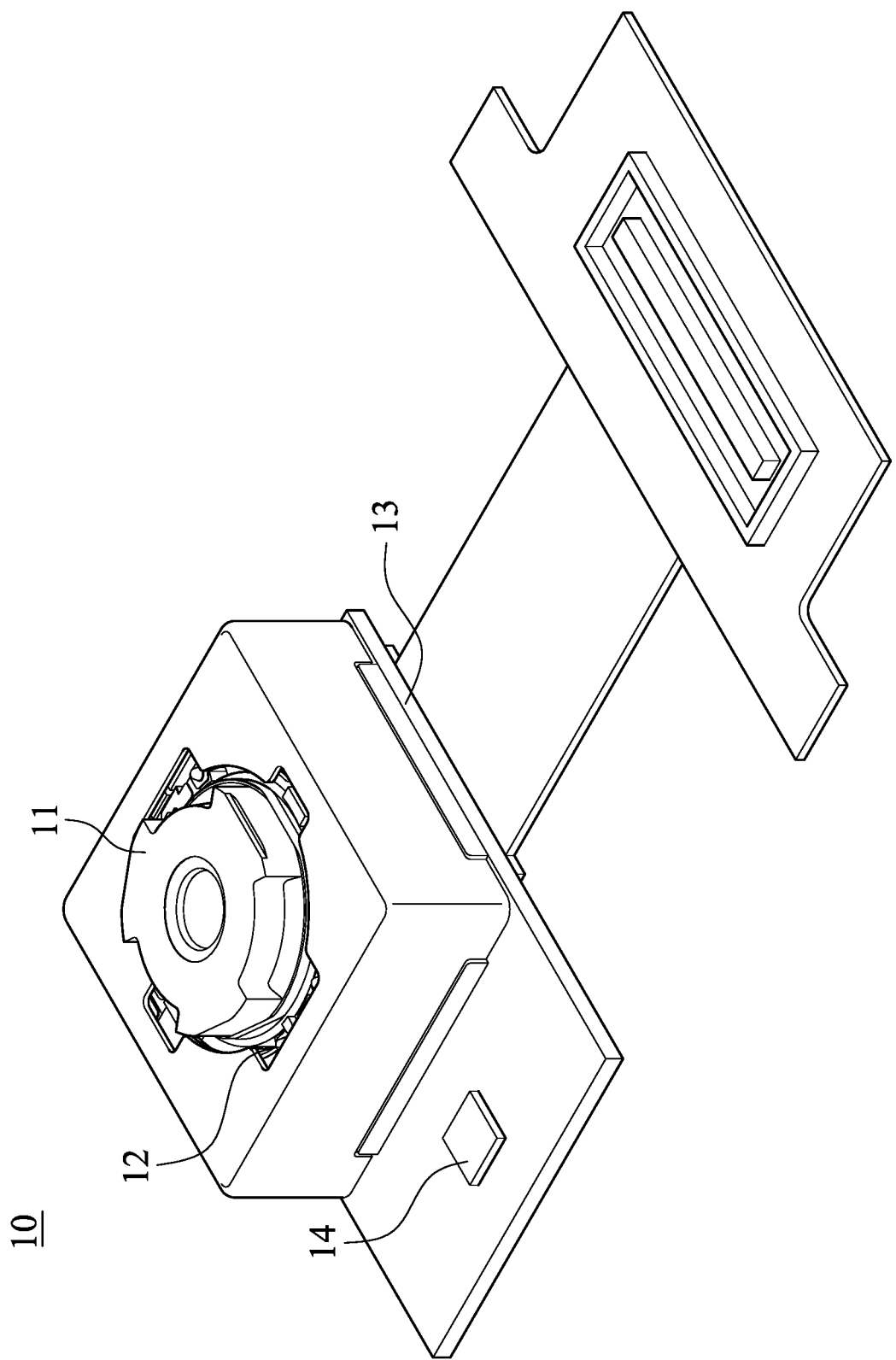
FIG. 29 is a three-dimensional schematic view of an imaging apparatus according to the 14th embodiment of the present disclosure.

FIG. 29 is a three-dimensional schematic view of an imaging apparatus according to the 14th embodiment of the present disclosure. In FIG. 29, the imaging apparatus 10 of the 14th embodiment is a camera module, the imaging apparatus 10 includes an imaging lens assembly 11, a driving apparatus 12 and an image sensor 13, wherein the imaging lens assembly 11 includes the image capturing optical assembly of the 1st embodiment and a lens barrel (not shown in drawings) for carrying the image capturing optical assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The image capturing optical assembly can obtain a favorable imaging position by the driving apparatus 12 so as to capture clear images when the imaged object is disposed at different object distances.

The imaging apparatus 10 can include the image sensor 13 located on the image surface of the image capturing optical assembly, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 14th embodiment, the image stabilization module 14 is a gyro sensor, but is not limited thereto. Therefore, the variation of different axial directions of the image capturing optical assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

15th Embodiment

Figure 30A:
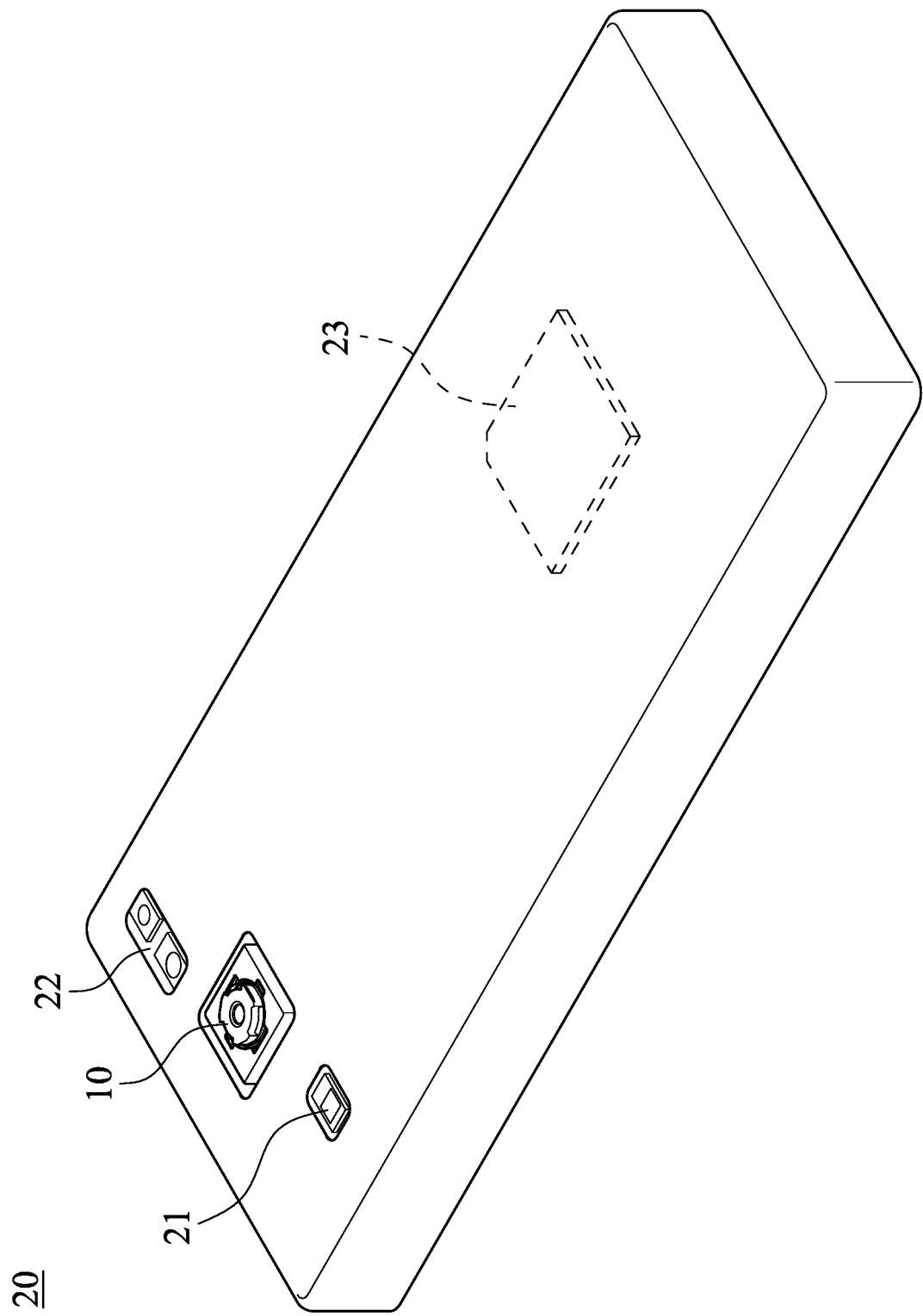
FIG. 30A is a schematic view of one side of an electronic device 20 according to the 15th embodiment of the present disclosure.
Figure 30B:
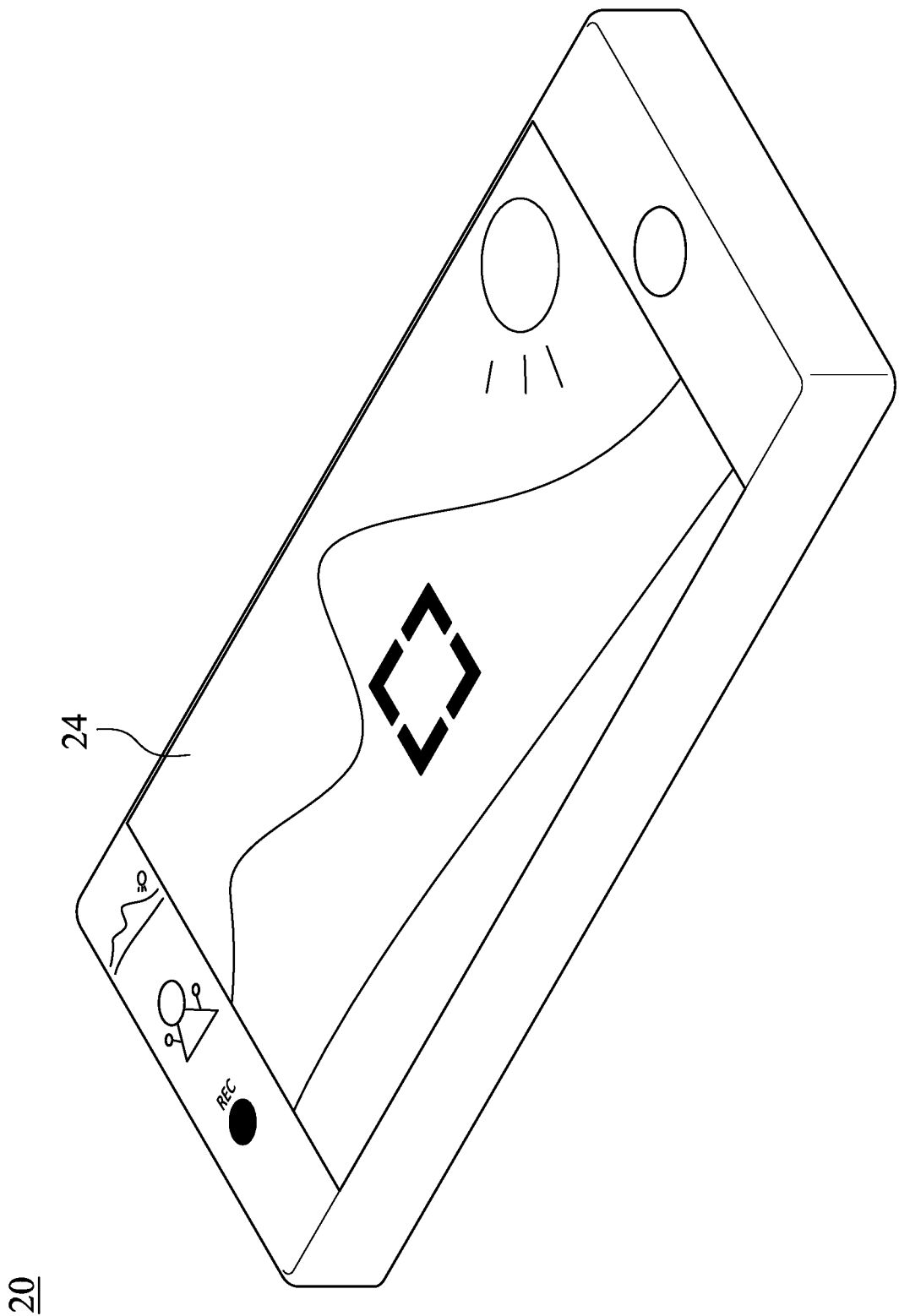
FIG. 30B is a schematic view of another side of the electronic device 20 of FIG. 30A.
Figure 30C:
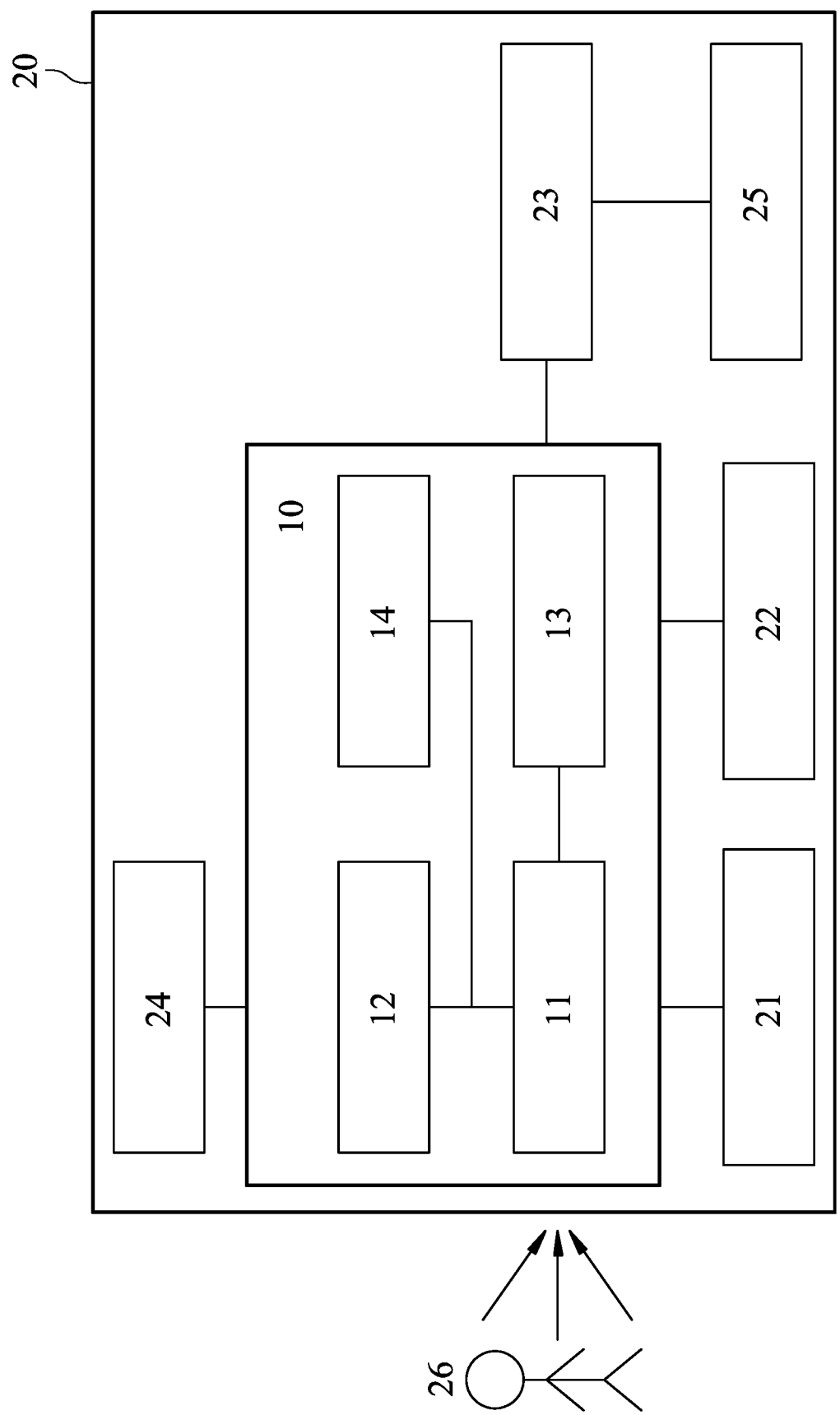
FIG. 30C is a system schematic view of the electronic device of FIG. 30A.

FIG. 30A is a schematic view of one side of an electronic device 20 according to the 15th embodiment of the present disclosure. FIG. 30B is a schematic view of another side of the electronic device 20 of FIG. 30A. FIG. 30C is a system schematic view of the electronic device 20 of FIG. 30A. In FIGS. 30A, 30B and 30C, the electronic device 20 according to the 15th embodiment is a smartphone, wherein the electronic device 20 includes the imaging apparatus 10, a flash module 21, a focusing assisting module 22, an image signal processor 23, a user interface 24 and an image software processor 25. When the user captures images of an imaged object 26 via the user interface 24, the electronic device 20 focuses and generates an image via the imaging apparatus 10 while compensating for low illumination via the flash module 21 when necessary. Then, the electronic device 20 quickly focuses on the imaged object according to its object distance information provided by the focusing assisting module 22, and optimizes the image via the image signal processor 23 (ISP) and the image software processor 25. Thus, the image quality can be further enhanced. The focusing assisting module 22 can adopt conventional infrared or laser for obtaining quick focusing, and the user interface 24 can utilize a touch screen or a physical button for capturing the image with various functions of the image processing software.

The imaging apparatus 10 according to the 15th embodiment is the same as the imaging apparatus 10 according to the 14th embodiment, and will not describe again herein.

16th Embodiment

Figure 31:
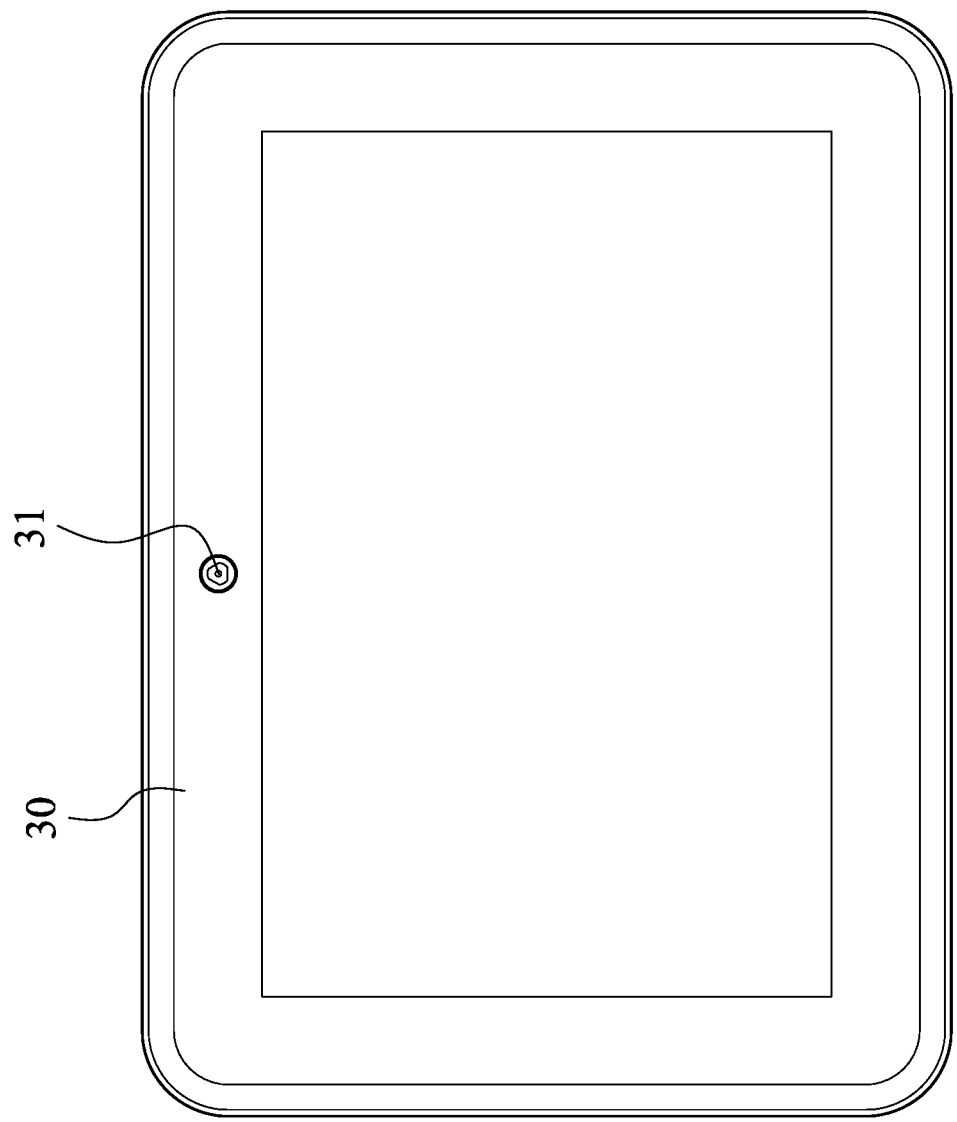
FIG. 31 is a schematic view of an electronic device according to the 16th embodiment of the present disclosure.

FIG. 31 is a schematic view of an electronic device 30 according to the 16th embodiment of the present disclosure. The electronic device 30 of the 16th embodiment is a tablet personal computer, wherein the electronic device includes an imaging apparatus 31, wherein the imaging apparatus 31 is the same as stated in the 14th embodiment, and will not describe again herein.

17th Embodiment

Figure 32:
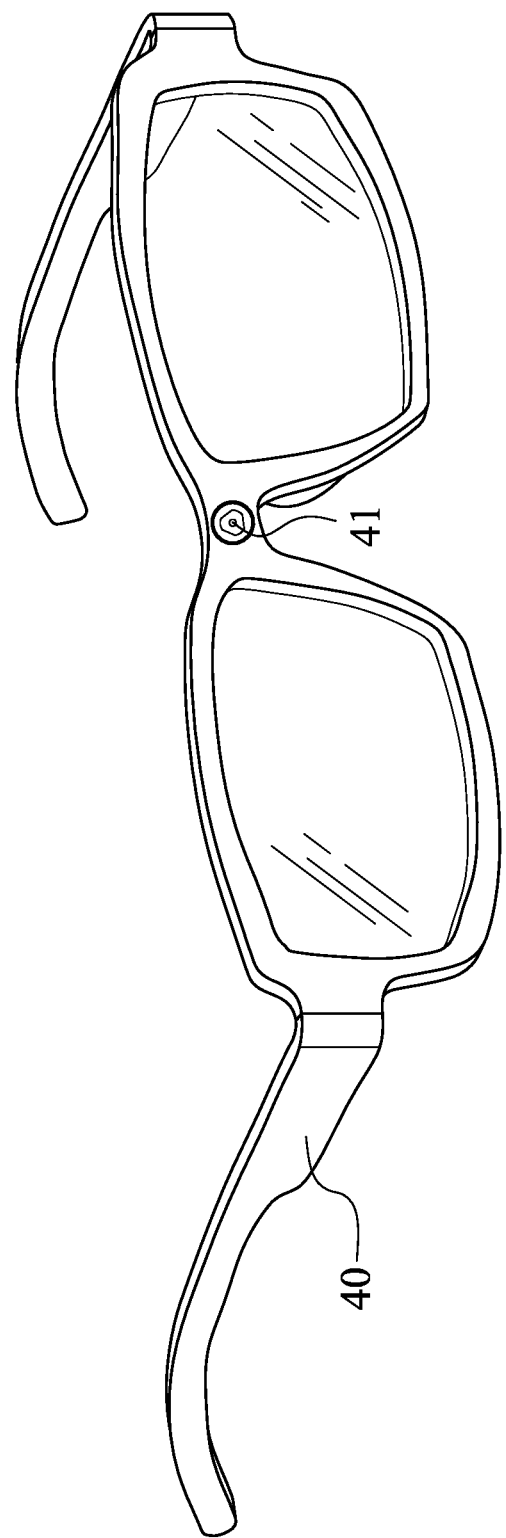
FIG. 32 is a schematic view of an electronic device according to the 17th embodiment of the present disclosure.

FIG. 32 is a schematic view of an electronic device 40 according to the 17th embodiment of the present disclosure. The electronic device 40 of the 17th embodiment is a wearable device, wherein the electronic device 40 includes an imaging apparatus 41, wherein the imaging apparatus 41 is the same as stated in the 14th embodiment, and will not describe again herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical assembly comprising, in order from an object side to an image side:
a first lens group, a second lens group and a third lens group;
wherein the first lens group comprises, in order from the object side to the image side, a first lens element and a second lens element; the second lens group comprises, in order from the object side to the image side, a third lens element, a fourth lens element and a fifth lens element; and the third lens group comprises, in order from the object side to the image side, a sixth lens element, a seventh lens element and an eighth lens element;
wherein each of the first lens element, the second lens element, the third lens element, the fourth lens element, the fifth lens element, the sixth lens element, the seventh lens element and the eighth lens element has an object-side surface facing towards the object side and an image-side surface facing towards the image side;
wherein at least one surface of at least one of the lens elements of the first lens group is aspheric, at least one surface of at least one of the lens elements of the second lens group is aspheric, and at least one surface of at least one of the lens elements of the third lens group is aspheric;
wherein at least one surface of the first lens element, the second lens element, the third lens element, the fourth lens element, the fifth lens element, the sixth lens element, the seventh lens element and the eighth lens element comprises at least one inflection point;
wherein each of at least two of the eight lens elements has an Abbe number smaller than 23.0;
wherein at least one of the first lens element, the second lens element, the third lens element, the fourth lens element, the fifth lens element, the sixth lens element, the seventh lens element and the eighth lens element has an Abbe number smaller than 20;
wherein a maximum of refractive indexes of all the lens elements of the image capturing optical assembly is Nmax, a minimum of refractive indexes of all the lens elements of the image capturing optical assembly is Nmin, a focal length of the image capturing optical assembly is f, an entrance pupil diameter of the image capturing optical assembly is EPD, and the following conditions are satisfied:

$1.30 < Nmax < 1.75;$ $1.20 < Nmin < 1.60;$ and $1.0 < f/EPD < 1.70.$

2. The image capturing optical assembly of claim 1, wherein the object-side surface of the first lens element comprises at least one inflection point, and the eighth lens element has negative refractive power.

3. The image capturing optical assembly of claim 1, wherein each of the first lens element, the second lens element, the third lens element, the fourth lens element, the fifth lens element, the sixth lens element, the seventh lens element and the eighth lens element is made of a plastic material, and there is an air gap in a paraxial region between every adjacent lens elements of the image capturing optical assembly;
wherein the image capturing optical assembly further comprises an aperture stop, an axial distance between the aperture stop and the image-side surface of the eighth lens element is SD, an axial distance between the object-side surface of the first lens element and the image-side surface of the eighth lens element is TD, and the following condition is satisfied:

$0.70 < SD/TD < 1.10.$

4. The image capturing optical assembly of claim 1, wherein an Abbe number of the first lens element is V1, an Abbe number of the second lens element is V2, an Abbe number of the sixth lens element is V6, and the following condition is satisfied:

$(V2+V6)/V1 < 1.0.$

5. The image capturing optical assembly of claim 1, wherein the maximum of refractive indexes of all the lens elements of the image capturing optical assembly is Nmax, the minimum of refractive indexes of all the lens elements of the image capturing optical assembly is Nmin, and the following conditions are satisfied:

$1.55 < Nmax < 1.70;$ and $1.35 < Nmin < 1.58.$

6. The image capturing optical assembly of claim 1, wherein the focal length of the image capturing optical assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, a focal length of i-th lens element is fi, a maximum of |f/fi| is |f/fi|max, and the following condition is satisfied:

|f/fi|max<1.50, wherein i=1~8.

7. The image capturing optical assembly of claim 1, wherein the focal length of the image capturing optical assembly is f, a curvature radius of an object-side surface of one of the lens elements of the image capturing optical assembly is Rf, a curvature radius of an image-side surface of the lens element of the image capturing optical assembly is Rr, and at least one of the lens elements satisfies the following condition:

|f/Rf|+|f/Rr|<0.60.

8. The image capturing optical assembly of claim 1, wherein an axial distance between the object-side surface of the first lens element and an image surface is TL, a half of a maximum field of view of the image capturing optical assembly is HFOV, and the following conditions are satisfied:

TL<12.0 mm; and 30.0 degrees<HFOV<50.0 degrees.

9. The image capturing optical assembly of claim 1, wherein an axial distance between the object-side surface of the first lens element and an image surface is TL, a maximum image height of the image capturing optical assembly is ImgH, the focal length of the image capturing optical assembly is f, the entrance pupil diameter of the image capturing optical assembly is EPD, and the following condition is satisfied:

2.0<TL/ImgH+f/EPD≤3.20.

10. The image capturing optical assembly of claim 1, wherein a total number of inflection points on the object-side surfaces and the image-side surfaces of all the lens elements of the image capturing optical assembly is Ninf., an axial distance between the object-side surface of the first lens element and an image surface is TL, a maximum image height of the image capturing optical assembly is ImgH, and the following conditions are satisfied:

20<Ninf.<55; and 0.80<TL/ImgH<1.65.

11. The image capturing optical assembly of claim 1, wherein a maximum of axial distances between every adjacent lens elements of the image capturing optical assembly is ATmax, a maximum image height of the image capturing optical assembly is ImgH, the focal length of the image capturing optical assembly is f, a focal length of the second lens element is f2, a focal length of the third lens element is f3, and the following conditions are satisfied:

ATmax/ImgH<0.30; and 0.05<(f/f2)+(f/f3)<0.50.

12. An image capturing optical assembly comprising, in order from an object side to an image side:
a first lens group, a second lens group and a third lens group;
wherein the first lens group comprises, in order from the object side to the image side, a first lens element and a second lens element, the second lens group comprises, in order from the object side to the image side, a third lens element, a fourth lens element and a fifth lens element, and the third lens group comprises, in order from the object side to the image side, a sixth lens element, a seventh lens element and an eighth lens element;
wherein each of the first lens element, the second lens element, the third lens element, the fourth lens element, the fifth lens element, the sixth lens element, the seventh lens element and the eighth lens element has an object-side surface facing towards the object side and an image-side surface facing towards the image side;
wherein at least one surface of at least one of the lens elements of the first lens group is aspheric, at least one surface of at least one of the lens elements of the second lens group is aspheric, and at least one surface of at least one of the lens elements of the third lens group is aspheric;
wherein at least one surface of the first lens element, the second lens element, the third lens element, the fourth lens element, the fifth lens element, the sixth lens element, the seventh lens element and the eighth lens element comprises at least one inflection point;
wherein at least one of the first lens element, the second lens element, the third lens element, the fourth lens element, the fifth lens element, the sixth lens element, the seventh lens element and the eighth lens element has an Abbe number smaller than 20;
wherein a maximum of refractive indexes of all the lens elements of the image capturing optical assembly is Nmax, a minimum of refractive indexes of all the lens elements of the image capturing optical assembly is Nmin, a focal length of the image capturing optical assembly is f, an entrance pupil diameter of the image capturing optical assembly is EPD, an axial distance between the object-side surface of the first lens element and an image surface is TL, and the following conditions are satisfied:

1.30<Nmax<1.95;

1.20<Nmin<1.60;

1.0<f/EPD1.63; and

TL/f<1.60.

13. The image capturing optical assembly of claim 12, wherein the second lens element with negative refractive power has the object-side surface being convex and the image-side surface being concave.

14. The image capturing optical assembly of claim 12, wherein a half of a maximum field of view of the image capturing optical assembly is HFOV, the focal length of the image capturing optical assembly is f, the entrance pupil diameter of the image capturing optical assembly is EPD, and the following condition is satisfied:

24.0<HFOV×EPD/f<35.0.

15. The image capturing optical assembly of claim 12, wherein the entrance pupil diameter of the image capturing optical assembly is EPD, a sum of central thicknesses of all the lens elements of the image capturing optical assembly is ΣCT, and the following condition is satisfied:

$0.80 < EPD/\Sigma CT < 2.0$.

16. The image capturing optical assembly of claim 12, wherein a curvature radius of the object-side surface of the sixth lens element is R11, a curvature radius of the image-side surface of the sixth lens element is R12, the focal length of the image capturing optical assembly is f, a focal length of the second lens element is f2, and the following conditions are satisfied:

$0 < (R11-R12)/(R11+R12) < 0.80$; and $-0.55 < f/f2 < 0.55$.

17. The image capturing optical assembly of claim 12, wherein the axial distance between the object-side surface of the first lens element and the image surface is TL, a maximum image height of the image capturing optical assembly is ImgH, the entrance pupil diameter of the image capturing optical assembly is EPD, and the following condition is satisfied:

$TL^2/(ImgH \times EPD) < 3.40$.

18. The image capturing optical assembly of claim 12, wherein each of relative distances between every adjacent lens elements of the first lens element, the second lens element, the third lens element, the fourth lens element, the fifth lens element, the sixth lens element, the seventh lens element and the eighth lens element is a constant value, the entrance pupil diameter of the image capturing optical assembly is EPD, an axial distance between the image-side surface of the eighth lens element and the image surface is BL, and the following condition is satisfied:

$2.0 < EPD/BL < 6.2$.

19. The image capturing optical assembly of claim 12, further comprising:
   an aperture stop disposed at the object side in the first lens group, a maximum optical effective radius of the object-side surface of the first lens element is Y11, a maximum optical effective radius of the image-side surface of the eighth lens element is Y82, and the following condition is satisfied:

$0.20 < Y11/Y82 < 0.70$.

20. The image capturing optical assembly of claim 12, wherein the focal length of the image capturing optical assembly is f, at least one of the object-side surface and the image-side surface of the eighth lens element comprises at least one critical point, a vertical distance of the critical point on the object-side surface of the eighth lens element and an optical axis is Yc81, a vertical distance of the critical point on the image-side surface of the eighth lens element and the optical axis is Yc82, and at least one of the following conditions is satisfied:

$0.01 < Yc81/f < 0.90$; and $0.01 < Yc82/f < 0.90$.

21. An image capturing optical assembly comprising, in order from an object side to an image side:
   a first lens group, a second lens group and a third lens group;
   wherein the first lens group comprises, in order from the object side to the image side, a first lens element and a second lens element; the second lens group comprises, in order from the object side to the image side, a third lens element, a fourth lens element and a fifth lens element; and the third lens group comprises, in order from the object side to the image side, a sixth lens element, a seventh lens element and an eighth lens element;
   wherein each of the first lens element, the second lens element, the third lens element, the fourth lens element, the fifth lens element, the sixth lens element, the seventh lens element and the eighth lens element has an object-side surface facing towards the object side and an image-side surface facing towards the image side;
   wherein at least one surface of at least one of the lens elements of the first lens group is aspheric, at least one surface of at least one of the lens elements of the second lens group is aspheric, and at least one surface of at least one of the lens elements of the third lens group is aspheric;
   wherein at least one of the seventh lens element and the eighth lens element comprises at least one inflection point;
   wherein at least one of the fourth lens element, the fifth lens element, the sixth lens element, the seventh lens element and the eighth lens element has an Abbe number smaller than 23.0;
   wherein at least one of the first lens element, the second lens element, the third lens element, the fourth lens element, the fifth lens element, the sixth lens element, the seventh lens element and the eighth lens element has an Abbe number smaller than 20;
   wherein a maximum of refractive indexes of all the lens elements of the image capturing optical assembly is Nmax, a minimum of refractive indexes of all the lens elements of the image capturing optical assembly is Nmin, an entrance pupil diameter of the image capturing optical assembly is EPD, an axial distance between the object-side surface of the first lens element and an image surface is TL, and the following conditions are satisfied:

$1.30 < Nmax < 1.95$;

$1.20 < Nmin < 1.60$; and $1.0 < TL/EPD < 2.27$.

22. The image capturing optical assembly of claim 21, wherein the object-side surface of the seventh lens element is convex, the image-side surface of the seventh lens element is concave.

23. The image capturing optical assembly of claim 21, wherein an Abbe number of the first lens element is V1, an Abbe number of the fourth lens element is V4, an Abbe number of the fifth lens element is V5, an Abbe number of the sixth lens element is V6, and the following condition is satisfied:

$1.0 < (V4+V5+V6)/V1 < 2.80$.

24. The image capturing optical assembly of claim 21, wherein a focal length of the image capturing optical assembly is f, a curvature radius of the image-side surface of the eighth lens element is R16, and the following condition is satisfied:

$0.3 < f/R16 < 5.0$.

25. The image capturing optical assembly of claim 21, wherein the seventh lens element has negative refractive power, the eighth lens element has negative refractive power, a maximum of axial distances between every adjacent lens elements of the image capturing optical assembly is ATmax, a minimum of central thicknesses of all the lens elements of the image capturing optical assembly is CTmin, and the following condition is satisfied:

$0.1 < ATmax/CTmin < 5.0$.

26. The image capturing optical assembly of claim 21, wherein the axial distance between the object-side surface of the first lens element and the image surface is TL, a maximum image height of the image capturing optical assembly is ImgH, the entrance pupil diameter of the image capturing optical assembly is EPD, and the following condition is satisfied:

$TL^2/(ImgH \times EPD) < 3.40$.

27. The image capturing optical assembly of claim 21, wherein a focal length of the image capturing optical assembly is f, a focal length of the first lens group is fG1, a focal length of the second lens group is fG2, a focal length of the third lens group is fG3, and the following conditions are satisfied:

$0.1 < f/fG1 < 1.5$;

$-0.4 < f/fG2 < 1.5$; and $-1.5 < f/fG3 < 0.5$.

28. The image capturing optical assembly of claim 21, wherein at least one of the object-side surface and the image-side surface of the seventh lens element comprises at least one critical point, a vertical distance of the critical point on the object-side surface of the seventh lens element and an optical axis is Yc71, a vertical distance of the critical point on the image-side surface of the seventh lens element and the optical axis is Yc72, and at least one of the following conditions is satisfied:

$0.01 < Yc71/f < 0.90$; and $0.01 < Yc72/f < 0.90$.

29. The image capturing optical assembly of claim 21, wherein at least one surface of at least one of the lens elements of the first lens group comprises at least one inflection point, at least one surface of at least one of the lens elements of the second lens group comprises at least one inflection point, and at least one surface of at least one of the lens elements of the third lens group comprises at least one inflection point.

30. The image capturing optical assembly of claim 21, wherein the first lens group has positive refractive power, the second lens group has positive refractive power, and the third lens group has negative refractive power.

31. The image capturing optical assembly of claim 21, further comprising:
a filter disposed between the eighth lens element and an image surface, wherein a central thickness of the filter is CTf, an Abbe number of the second lens element is V2, an Abbe number of the third lens element is V3, an Abbe number of the fourth lens element is V4, an Abbe number of the fifth lens element is V5, a focal length of the first lens element is f1, a focal length of the second lens element is f2, and the following conditions are satisfied:

$CTf < 0.25$ mm;

$0.01 < |(V2-V3)/(V4-V5)|$; and $-0.65 < f1/f2 < 2.0$.

32. An imaging apparatus, comprising:
the image capturing optical assembly of claim 21; and
an image sensor disposed on the image surface of the image capturing optical assembly.

33. An electronic device, comprising:
the imaging apparatus of claim 32.

* * * * *